United States Patent
Lee et al.

(10) Patent No.: US 10,190,247 B2
(45) Date of Patent: Jan. 29, 2019

(54) WALL-MOUNTED DRUM WASHING MACHINE AND METHOD FOR SENSING MOUNTING ABNORMALITY AND FALL THEREOF

(71) Applicant: Dongbu Daewoo Electronics Corporation, Seoul (KR)

(72) Inventors: Ju Dong Lee, Incheon (KR); Ui Kun Hwang, Bucheon-si (KR); Jae Min Lee, Incheon (KR); Sang Ill Bae, Incheon (KR); Sang Ok Lee, Incheon (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 1547 days.

(21) Appl. No.: 14/019,500

(22) Filed: Sep. 5, 2013

(65) Prior Publication Data

US 2014/0077624 A1    Mar. 20, 2014

(30) Foreign Application Priority Data

Sep. 14, 2012 (KR) .................. 10-2012-0101978
Sep. 14, 2012 (KR) .................. 10-2012-0101981
Sep. 14, 2012 (KR) .................. 10-2012-0101982
Sep. 14, 2012 (KR) .................. 10-2012-0101983

(51) Int. Cl.
| | |
|---|---|
| *D06F 37/00* | (2006.01) |
| *D06F 33/02* | (2006.01) |
| *D06F 35/00* | (2006.01) |
| *G01B 5/24* | (2006.01) |
| *G01P 15/00* | (2006.01) |
| *D06F 39/12* | (2006.01) |
| *D06F 39/14* | (2006.01) |

(Continued)

(52) U.S. Cl.
CPC ............ *D06F 33/02* (2013.01); *D06F 35/005* (2013.01); *D06F 35/007* (2013.01); *G01B 5/24* (2013.01); *G01P 15/00* (2013.01); *D06F 37/02* (2013.01); *D06F 37/267* (2013.01); *D06F 39/12* (2013.01); *D06F 39/14* (2013.01); *D06F 2202/085* (2013.01); *D06F 2202/12* (2013.01); *D06F 2204/10* (2013.01); *D06F 2210/00* (2013.01); *D06F 2222/00* (2013.01); *Y10T 307/766* (2015.04)

(58) Field of Classification Search
CPC .................................. H02H 5/10; D06F 37/00
USPC ........................................................ 307/116
See application file for complete search history.

(56) References Cited

U.S. PATENT DOCUMENTS

| | | | | |
|---|---|---|---|---|
| 2007/0074592 | A1* | 4/2007 | Santos | G01D 11/30 73/866.5 |
| 2012/0233873 | A1* | 9/2012 | Del Pos | D06F 39/125 34/108 |
| 2013/0241479 | A1* | 9/2013 | Wright, Jr. | H02H 5/10 320/109 |

* cited by examiner

*Primary Examiner* — Rexford Barnie
*Assistant Examiner* — Joseph Inge

(57) ABSTRACT

Provided is a wall-mounted drum washing machine which includes a rear panel having a buffer member interposed between a through-hole and a wall surface and mounted on the wall surface through a fastening member inserted through the through-hole, a tub containing wash water and supported by the rear panel, and a box unit coupled to the rear panel so as to surround the tub. The wall-mounted drum washing machine includes a sensor configured to sense a contact state between the rear panel and the wall surface, a control unit configured to determine a mounting abnormality of the drum washing machine based on the sensed contact (Continued)

state, and a power supply unit configured to control power supply according to the determination result of the control unit.

7 Claims, 44 Drawing Sheets

(51) Int. Cl.
*D06F 37/02* (2006.01)
*D06F 37/26* (2006.01)

WALL-MOUNTED DRUM WASHING MACHINE AND METHOD FOR SENSING MOUNTING ABNORMALITY AND FALL THEREOF

CROSS-REFERENCES TO RELATED APPLICATIONS

The present application claims priority to Korean application numbers 10-2012-0101978, 10-2012-0101981, 10-2012-0101982 and 10-2012-0101983, filed on Sep. 14, 2012, which is incorporated by reference in its entirety.

BACKGROUND OF THE INVENTION

The present invention relates to a wall-mounted drum washing machine and a method for sensing a mounting abnormality and fall thereof, and more particularly, to a wall-mounted drum washing machine and a method for sensing a mounting abnormality and fall of the wall-mounted drum washing machine, which are capable of preventing an accident which may occur when the wall-mounted drum washing machine falls on a floor.

In a general wall-mounted drum washing machine, a washing drum driven by a forward/reverse motor is built in a washing tub integrated with an installation plate, and a water supply pipe and a drain pipe which are provided with a solenoid valve are laid in the washing tub.

The washing tub includes a water level sensor to sense a water level, a hot air blower to supply hot air to the washing tub, an air blower to discharge internal air of the washing tub, a plurality of manipulation buttons for selecting washing, spin-drying, rising, and drying, and a control panel to control the respective units.

The forward/reverse motor to drive the washing drum and the hot air blower to supply hot air to the washing tub are installed over the installation plate, and the water level sensor and a ventilation pipe communicating with the bottom of the washing tub and having an upper end coupled to the air blower are installed at the rear side of the installation plate.

A plurality of silicon anti-vibration rubbers each having a bolt buried at both sides thereof are fixed to the front side of the installation plate and coupled to anti-vibration rubber receiving grooves of an intermediate case having a washing tub insertion hole, a forward/reverse motor insertion hole, and a hot air blower insertion hole.

A ring rim having the same diameter as the washing tub is formed at the front side of the intermediate case, and the intermediate case is coupled to a front case through stay bolts. The front case is opened/closed by a door having tempered glass coupled to the inside of a frame, and has an input hole in which a silicon packing is formed.

A rear case having a ring formed in the upper and lower portions thereof is fixed to the rear side of the intermediate case through a bolt, and the ring is coupled to a bracket having an insertion piece formed to protrude between both fixing pieces fixed to the wall.

The related art of the present invention is disclosed in Utility Model Registration Notification No. 20-0305578 published on Feb. 26, 2003 and titled "Wall-mounted Small Drum Washing Machine".

When the conventional wall-mounted drum washing machine unexpectedly falls on a floor surface due to an installation defect or the like, the wall-mounted drum washing machine may come in contact with water staying on the floor surface. In this case, a user may get an electric shock. Thus, there is a demand for a structure capable of solving such a problem.

SUMMARY OF THE INVENTION

Embodiments of the present invention are directed to a wall-mounted drum washing machine which is capable of sensing and immediately reporting an abnormality which may occur in a mounting state of the wall-mounted drum washing machine when the wall-mounted drum washing machine is not normally mounted or due to vibrations generated during a washing operation.

Embodiments of the present invention are directed to a wall-mounted drum washing machine capable of sensing a mounting abnormality of the wall-mounted drum washing machine and a risk of fall of the wall-mounted drum washing machine, based on a mounting angle of the wall-mounted drum washing machine mounted on a wall surface.

Embodiments of the present invention are directed to a wall-mounted drum washing machine capable of sensing an acceleration change and impulse when the wall-mounted drum washing machine mounted on a wall surface falls, thereby cutting off power supply to the wall-mounted drum washing machine.

Embodiments of the present invention are directed to a wall-mounted drum washing machine capable of automatically cutting off power supply to the wall-mounted drum washing machine when the wall-mounted drum washing machine falls, thereby preventing a safety accident.

In one embodiment, there is provided a wall-mounted drum washing machine which includes a buffer member interposed between a through-hole and a wall surface, a rear panel mounted on the wall surface through a fastening member inserted through the through-hole, a tub containing wash water and supported by the rear panel, and a box unit coupled to the rear panel and surrounding the tub. The wall-mounted drum washing machine includes: a sensor configured to sense a contact state between the rear panel and the wall surface; a control unit configured to determine a mounting abnormality of the drum washing machine, based on the sensed contact state; and a power supply unit configured to control power supply according to the determination result of the control unit.

The sensor may sense a contact state between the rear panel and the wall surface when a nut member coupled to the fastening member for fixing the rear panel to the wall surface is loosened and moved.

The sensor may sense a contact state between the buffer member and the wall surface.

In another embodiment, a wall-mounted drum washing machine includes: a mounting state sensing unit configured to sense a mounting state of the wall-mounted drum washing machine; and a control unit configured to calculate a mounting angle of the wall-mounted drum washing machine, based on the mounting state inputted from the mounting state sensing unit, and compare the mounting angle to an initial mounting angle so as to determine whether or not the wall-mounted drum washing machine is normally mounted.

The mounting state sensing unit may include a three-axis acceleration sensor configured to measure acceleration in x, y, and z-axis directions.

In another embodiment, a wall-mounted drum washing machine includes: a fall sensing unit configured to sense a displacement of the wall-mounted drum washing machine; a shock sensor configured to sense an impulse applied to the wall-mounted drum washing machine; and a control unit configured to determine whether or not the wall-mounted drum washing machine fell, based on the displacement sensed by the fall sensing unit and the impulse sensed by the shock sensor.

The fall sensing unit may include a three-axis acceleration sensor.

The wall-mounted drum washing machine may further include a power supply unit configured to cut off power supply to the wall-mounted drum washing machine according to the determination result of the control unit.

In another embodiment, a wall-mounted drum washing machine includes: a rear panel mounted on a wall surface; a tub supported by the rear panel and containing wash water; a front panel having an opening formed therein and installed on the tub; a drum rotatably installed in the tub; a driving unit providing power to the drum; a box unit installed on the tub so as to surround the drum; a cover unit coupled to the box unit so as to cover the front panel; and a power cutoff unit connected to a power line extended from a control block mounted in the box unit and configured to cut off power supply to the control block when the tub falls.

The power cutoff unit may include: a connection plug portion connected to an end of the power line; a connection socket portion into which the connection plug portion is detachably inserted and which is electrically connected to the connection plug portion when the connection plug portion is inserted; and a power plug portion connected to the connection socket portion through a connection power line and receiving power from an external power supply source.

The power cutoff unit may further include a safety pin installed to pass through the connection plug portion and the connection socket portion when the connection plug portion is inserted into the connection socket portion.

In another embodiment, there is provided a method for sensing a mounting abnormality of a wall-mounted drum washing machine which includes a buffer member interposed between a through-hole and a wall surface, a rear panel mounted on the wall surface through a fastening member inserted through the through-hole, a tub containing wash water and supported by the rear panel, and a box unit coupled to the rear panel and surrounding the tub. The method includes: receiving, by a control unit, a contact state between the rear panel and the wall surface from a sensor provided on a rear panel of the wall-mounted drum washing machine; determining whether or not a contact between the rear panel and the wall surface is released, based on the received contact state; and stopping power supply to the drum washing machine, when it is determined that the contact between the rear panel and the wall surface is released.

The sensor may sense a contact state between the rear panel and the wall surface when a nut member coupled to the fastening member for fixing the rear panel to the wall surface is loosened and moved, or senses a contact between the buffer member and the wall surface.

The method may further include outputting a warning sound or transmitting a text to a previously-stored contact number, when it is determined that the contact between the rear panel and the wall surface is released.

In another embodiment, a method for sensing a mounting abnormality of a wall-mounted drum washing machine includes: receiving, by a control unit, a mounting state of the wall-mounted drum washing machine from a mounting state sensing unit and calculating a mounting angle of the wall-mounted drum washing machine; and comparing, by the control unit, the mounting angle to an initial mounting angle, and determining whether or not the wall-mounted drum washing machine is normally mounted.

The method may further include cutting off, by the control unit, power supplied to the wall-mounted drum washing machine when it is determined that the wall-mounted drum washing machine is abnormally mounted.

The method may further include transmitting, by the control unit, a message indicating a mounting abnormality to a user's terminal when it is determined that the wall-mounted drum washing machine is abnormally mounted.

In another embodiment, a method for sensing a fall of a wall-mounted drum washing machine includes: receiving, by a control unit, a displacement and impulse of the wall-mounted drum washing machine from a fall sensing unit and a shock sensor; calculating a z-axis displacement based on the displacement; and determining whether or not the wall-mounted drum washing machine fell, by comparing the z-axis displacement and the impulse to a reference displacement and reference impulse.

In the determining of whether or not the wall-mounted drum washing machine fell, when the z-axis displacement is larger than the reference displacement and the impulse is larger than the reference impulse, the control unit may determine that the wall-mounted drum washing machine fell.

The method may further include cutting off, by the control unit, power supplied to the wall-mounted drum washing machine when it is determined that the wall-mounted drum washing machine fell.

DESCRIPTION OF SPECIFIC EMBODIMENTS

Hereinafter, a wall-mounted drum washing machine and a method for sensing a mounting abnormality and fall thereof in accordance with exemplary embodiments of the present invention will be described in detail with reference to the accompanying drawings.

The drawings are not necessarily to scale and in some instances, proportions may have been exaggerated in order to clearly illustrate features of the embodiments.

Furthermore, terms to be used in this disclosure are defined in consideration of functions in the present invention, and may be defined differently depending on the intention or practice of a user or operator. Thus, the terms must be defined on the basis of the overall content of the disclosure.

Figure 1:
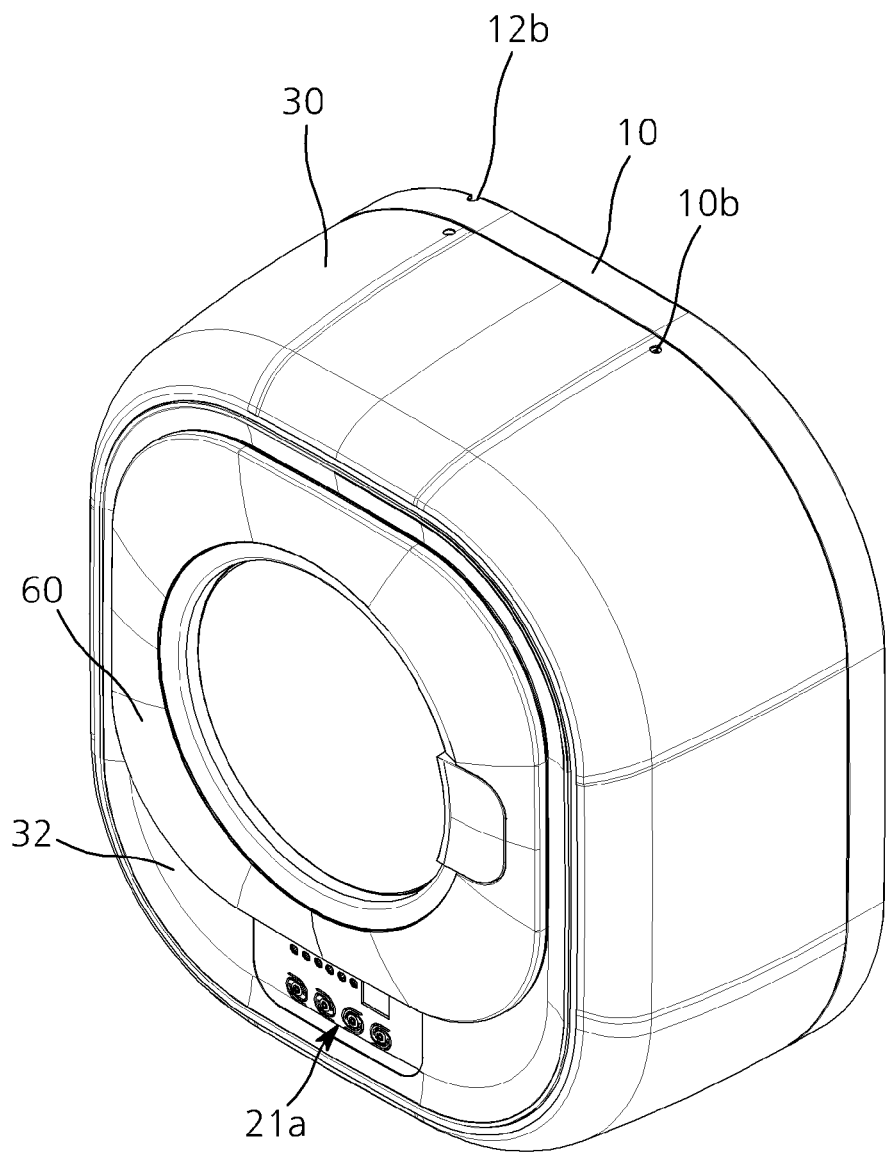
FIG. 1 is a perspective view of a wall-mounted drum washing machine in accordance with an embodiment of the present invention.
Figure 2:
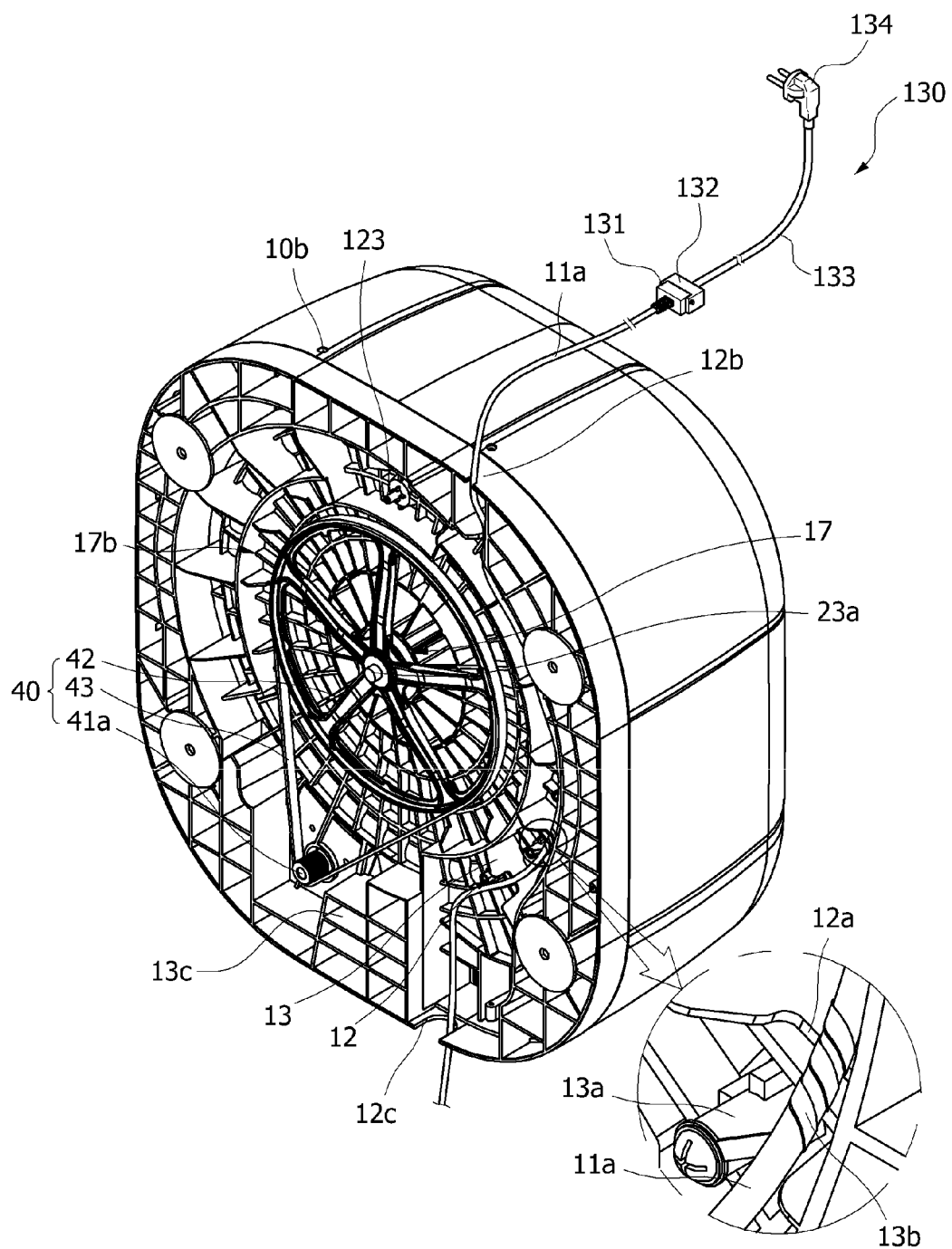
FIG. 2 is a rear perspective view of the wall-mounted drum washing machine in accordance with the embodiment of the present invention.
Figure 3:
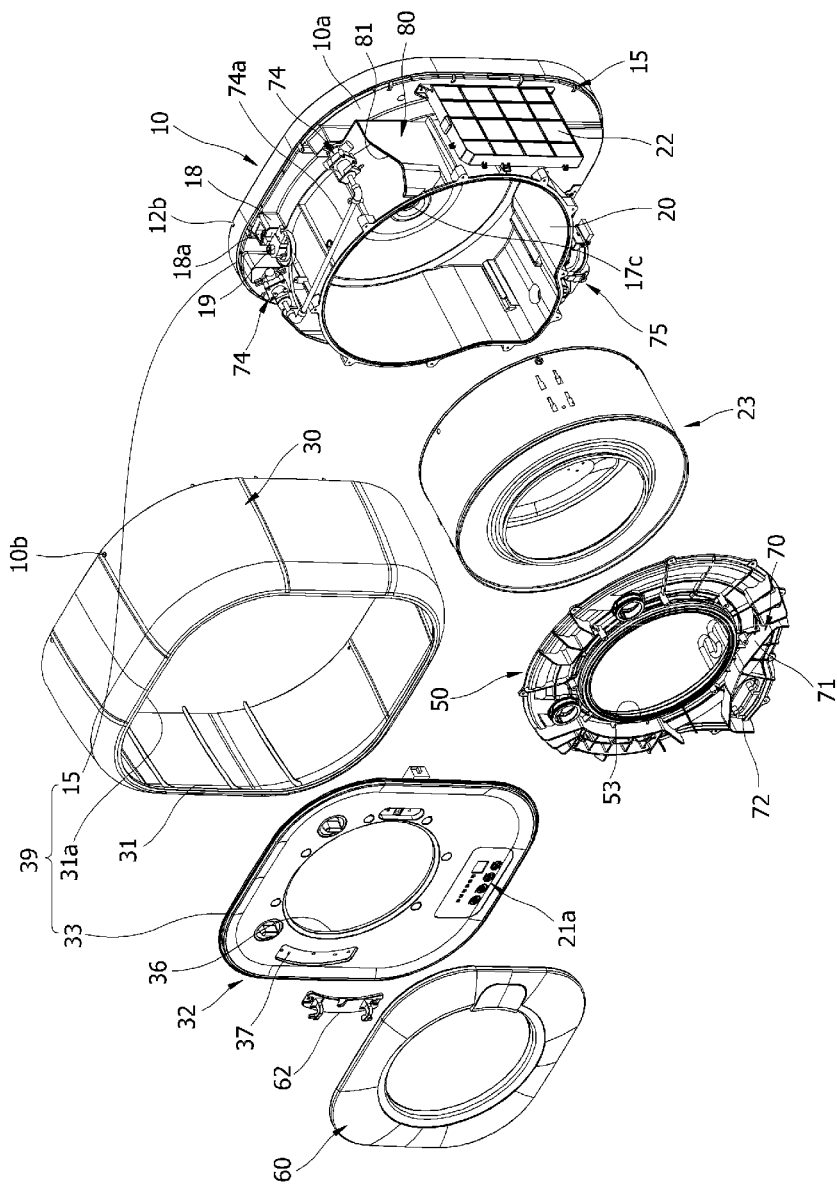
FIG. 3 is an exploded perspective view of the wall-mounted drum washing machine in accordance with the embodiment of the present invention.
Figure 4:
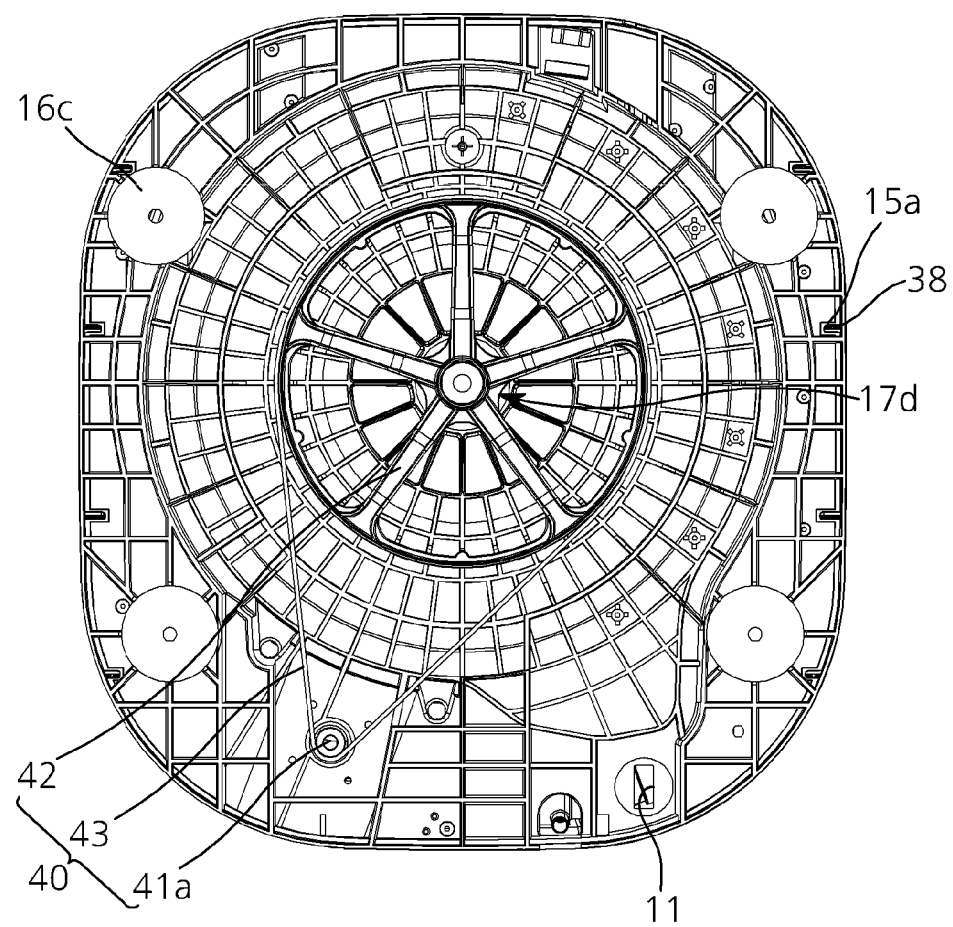
FIG. 4 is a rear view of the wall-mounted drum washing machine in accordance with the embodiment of the present invention.

FIG. 1 is a perspective view of a wall-mounted drum washing machine in accordance with an embodiment of the present invention. FIG. 2 is a rear perspective view of the wall-mounted drum washing machine in accordance with the embodiment of the present invention. FIG. 3 is an exploded perspective view of the wall-mounted drum washing machine in accordance with the embodiment of the present invention. FIG. 4 is a rear view of the wall-mounted drum washing machine in accordance with the embodiment of the present invention.

Referring to FIGS. 1 to 4, the wall-mounted drum washing machine in accordance with the embodiment of the present invention includes a rear panel 10 mounted on a wall surface, a tub 20 containing wash water therein and supported by the rear panel 10, a drum 23 rotatably installed in the tub 20 and housing laundry therein, a driving unit 40 providing power to rotate the drum 23, a water supply device 74 and 74a supplying wash water to the tub 20, and a drain device 75 discharging wash water from the tub 20 to the outside.

A front panel 50 having an opening 54 formed therein is installed on the tub 20, and a box unit 30 is installed on the rear panel 10 so as to surround the tub 20. A cover unit 32 is installed at the front side of the box unit 30 so as to cover the front panel 50.

The front panel 50 is covered by the cover unit 32, the cover unit 32 is elastically coupled and reliably fixed to the box unit 30, and the box unit 30 is coupled to the rear panel 10 mounted on the wall surface W through a fastening member or the like. Thus, a damper or damping spring for supporting the front side of the tub 20 does not need to be separately provided unlike the conventional wall-mounted drum washing machine, but the front side of the tub 20 may be supported while vibrations at the front side of the tub 20 are reduced.

Figure 17:
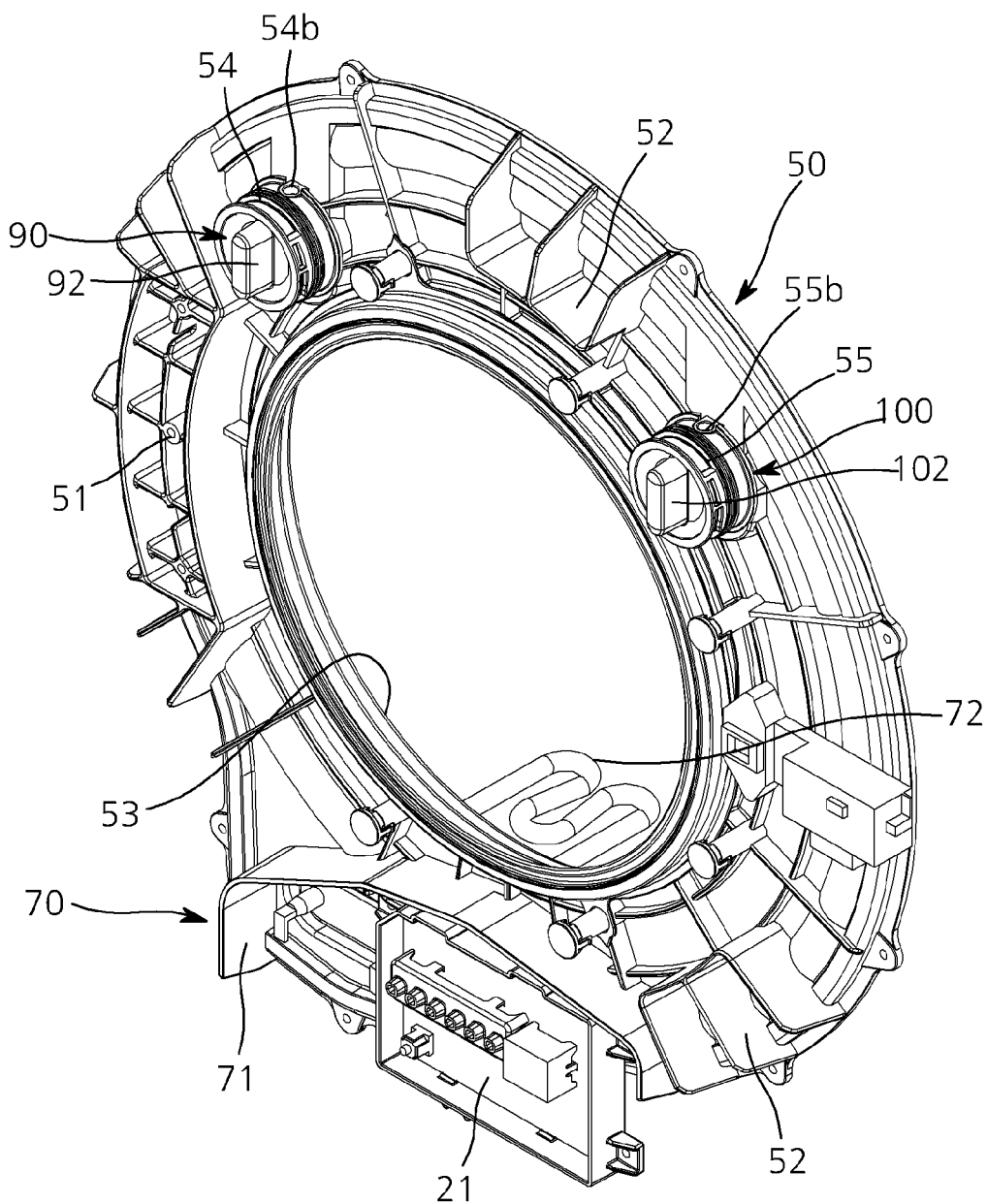
FIG. 17 is a perspective view of the front panel including the bypass unit of the wall-mounted drum washing machine in accordance with the embodiment of the present invention.

The cover unit 32 includes a door 60 installed to open and close, and the front panel 50 includes a detergent box 90 and a conditioner box 100, which are detachably installed therein (refer to FIG. 17).

When a user wants to perform a washing operation, the user opens the door 60 from the cover unit 32 of the drum washing machine installed on the wall surface W (refer to FIG. 8), and puts laundry into the drum 23.

Then, the user separates the detergent box 90 and the conditioner box 100 mounted on the front panel 50, puts detergent and fabric conditioner into the detergent box 90 and the conditioner box 100, respectively, and then inserts the detergent box 90 and the conditioner box 100 into the front panel 50.

When the user closes the door 60 and operates a manipulation unit 21a, wash water is supplied into the tub 20 by the water supply device 74 or 74a, and power is applied to the driving unit 40. Then, the drum 23 is rotated to start the washing operation.

After the washing operation is completed, the wash water is discharged to the outside of the box unit 30 according to operation of the drain device 75.

In the present embodiment, since the small drum 23 having a weight of 2~4 kg is installed in the rear panel 10 mounted on the wall surface, baby clothes, underwear, and Y-shirts, which need to be frequently washed, may be easily washed without a burden.

Thus, although a user has a small amount of laundry, the user may perform a washing operation without worrying about consuming wash water and electricity. That is, whenever a user has a small amount of laundry, the user may perform a washing operation without a burden.

Furthermore, the wall-mounted drum washing machine in accordance with the embodiment of the present invention includes a control block 22, a power line 11a, and a guide unit 12. The control block 22 is installed on the rear panel 10, the power line 11a is extended from the control block 22 to the outside of the rear panel 10, and the guide unit 12 is provided on the rear surface of the rear panel 10, guides the power line 11a to the outside of the rear panel 10, and fixes the power line 11a.

In the present embodiment, since the rear panel 10 includes the guide unit 12, the power line 11a may be extended along a side of the rear panel 10. Thus, the rear panel 10 may be easily mounted on the wall surface.

The power line 11a of the wall-mounted drum washing machine in accordance with the embodiment of the present invention is fixed along the guide unit 12 formed on the rear panel 10 so as to be extended in the circumferential direction of the rear panel 10, and exposed to the outside of the rear panel 10.

The power line 11a extended from the control block 22 is extended toward the guide unit 12 through the rear panel 10.

The rear panel 10 has a through-hole 11 through which the power line 11a passes, and the control block 22 is installed on a front surface 10a of the rear panel 10.

The power line 11a extended from the control block 22 is extended toward the rear surface of the rear panel 10 through the through-hole 11, and guided along the guide unit 12 provided on the rear surface of the rear panel 10 in the circumferential direction of the rear panel 10.

Thus, since the power line 11a is exposed to the outside in the lateral direction of the rear panel 10, a part of the power line 11a, exposed to the outside of the drum washing machine, is disposed adjacent to the wall surface W. Therefore, the power line 11a may be disposed to be closely attached to the wall surface W.

Since the power line 11a is extended to the rear surface of the rear panel 10 and then exposed to the outside at the top or bottom side of the rear panel 10, the exterior of the wall-mounted drum washing machine may be elegantly finished.

The guide unit 12 includes a fixing portion 12a which guides the power line 11a extended through the through-hole 11 to one side of the rear panel 10 and fixes the power line 11a.

The fixing portion 12a is formed on the rear surface of the rear panel 10, and fixes the power line 11a in a space between the rear panel 10 and the wall surface W.

Thus, the power line 11a extended to the rear surface of the rear panel 10 is not moved by vibrations generated during a washing operation, but fixed at a predetermined position.

The rear panel 10 includes a plurality of reinforcement ribs 13a formed on the rear surface thereof and a plurality of radial ribs 13 formed radially from the center of the rear panel.

The fixing portion 12a is formed by cutting a part of the radial rib 13. The plurality of radial ribs 13 are disposed at a predetermined interval from each other, thereby forming a space in which the power line 11a is disposed.

The rear panel 10 is formed in a substantially rectangular shape of which the corners are rounded. Furthermore, the rear panel 10 may be formed in various shapes such as circular shape and elliptical shape, and the present invention is not limited to the above-described shape of the rear panel 10.

Since the circumference of the rear panel 10 is bent toward the wall, a space is formed between the rear panel 10 and the wall (refer to FIG. 2).

As the space is formed, the plurality of reinforcement ribs 13c and radial ribs 13 may be formed on the rear surface of the rear panel 10 without interfering with the wall surface W.

Thus, since the strength of the rear panel 10 is reinforced by the reinforcement ribs 13c and the radial ribs 13, it is possible to prevent the rear panel 10 from being deformed or broken by vibrations generated through the rotations of the drum 23.

The through-hole 11 is formed at the bottom of the rear panel 10, and a plurality of fixing portions 12a formed by cutting the radial ribs 13 form a path through which the power line 11a passes.

That is, the plurality of fixing portions 12a are successively formed so that the power line 11a may be extended to the top of the rear panel 10 while forming a curve close to a semicircular shape.

As the plurality of fixing portions 12a are arranged at a predetermined interval to the top of the rear panel 10, the power line 11a inserted into the fixing portions 12a may be guided from the bottom to the top of the rear panel 10.

Between the respective radial ribs 13, an installation hole portion 13a is formed, and a cable member 13b wound around the power line 11a is fixed to the installation hole portion 13a by a fastening member.

The cable member 13b may be formed of a wire which maintains a shape deformed by an external force or a material having a similar property to the wire.

Thus, when the power line 11a is surrounded by the cable member 13b and the cable member 13b is fixed to the installation hole portion 13a through the fastening member, it is possible to prevent the power line 11a from moving to the outside of the fixing portion 12a.

The rear panel 10 has a first through-groove 12b formed in the circumference thereof such that the power line 11a guided along the fixing portions 12a is exposed to the outside at the top of the rear panel 10.

Thus, the power line 11a is exposed to the outside at the top of the rear panel 10 through the first through-groove 12b.

The rear panel 10 has a second through-groove 12c formed in the bottom circumference thereof such that the power line 11a extended from the through-hole portion 11 is exposed to the outside at the bottom of the rear panel 10.

Thus, when the power line 11a is extended toward the bottom of the rear panel 10, the power line 11a is exposed to the outside of the rear panel 10 through the second through-groove 12c.

Figure 5:
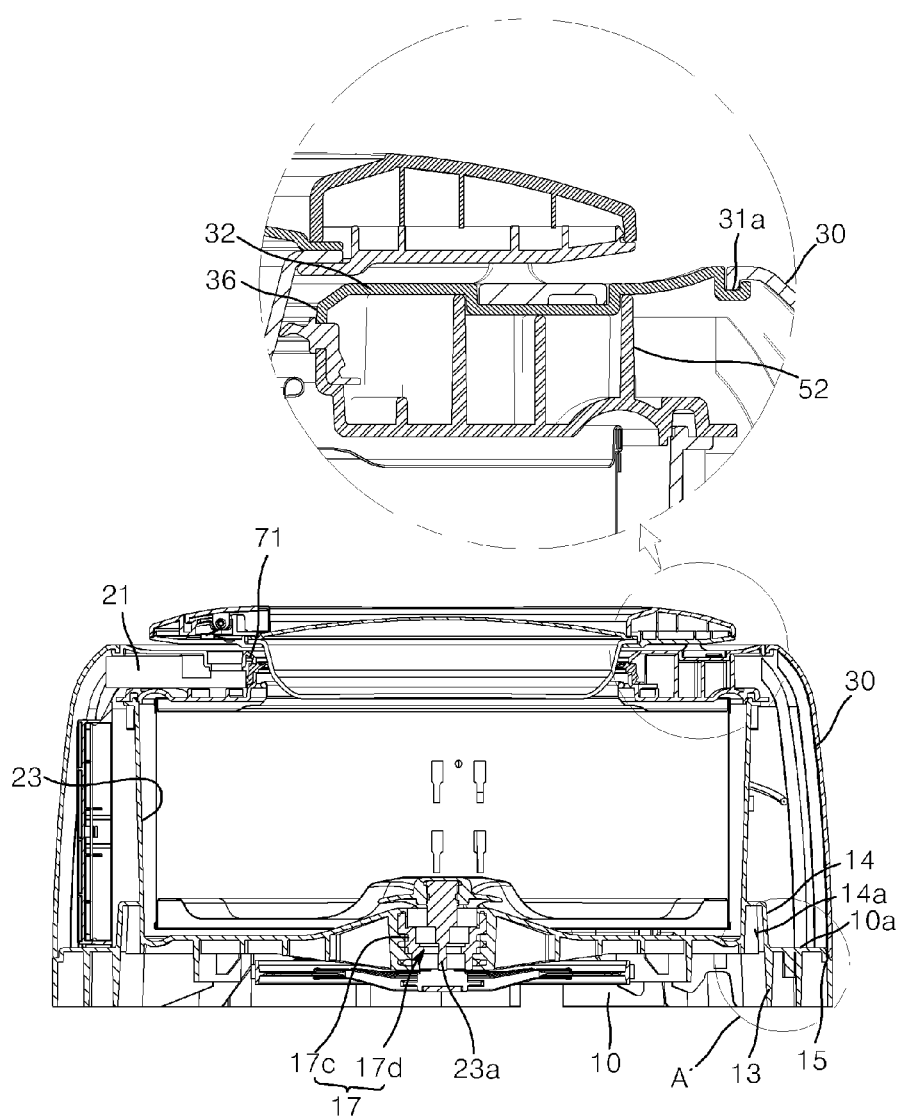
FIG. 5 is a cross-sectional view of the wall-mounted drum washing machine in accordance with the embodiment of the present invention.
Figure 6:
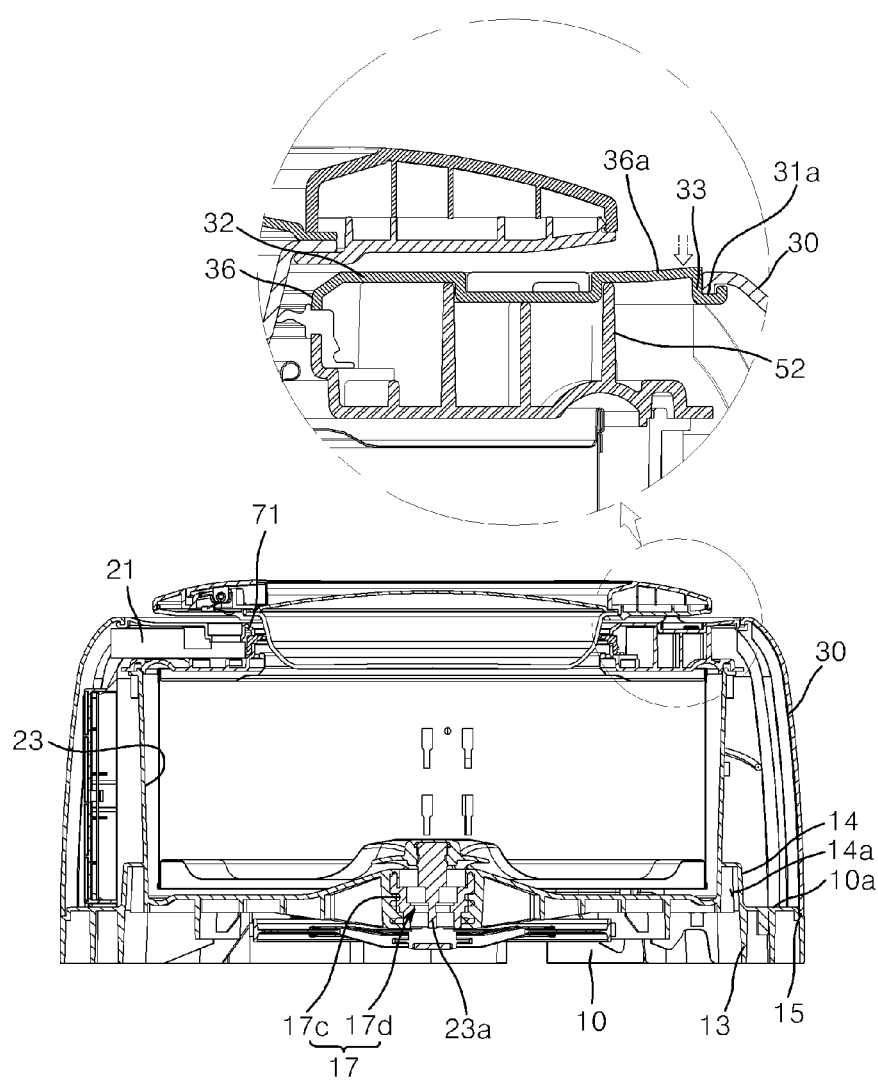
FIG. 6 is an operation state diagram illustrating an elastic assembly unit of the wall-mounted drum washing machine in accordance with the embodiment of the present invention.
Figure 7:
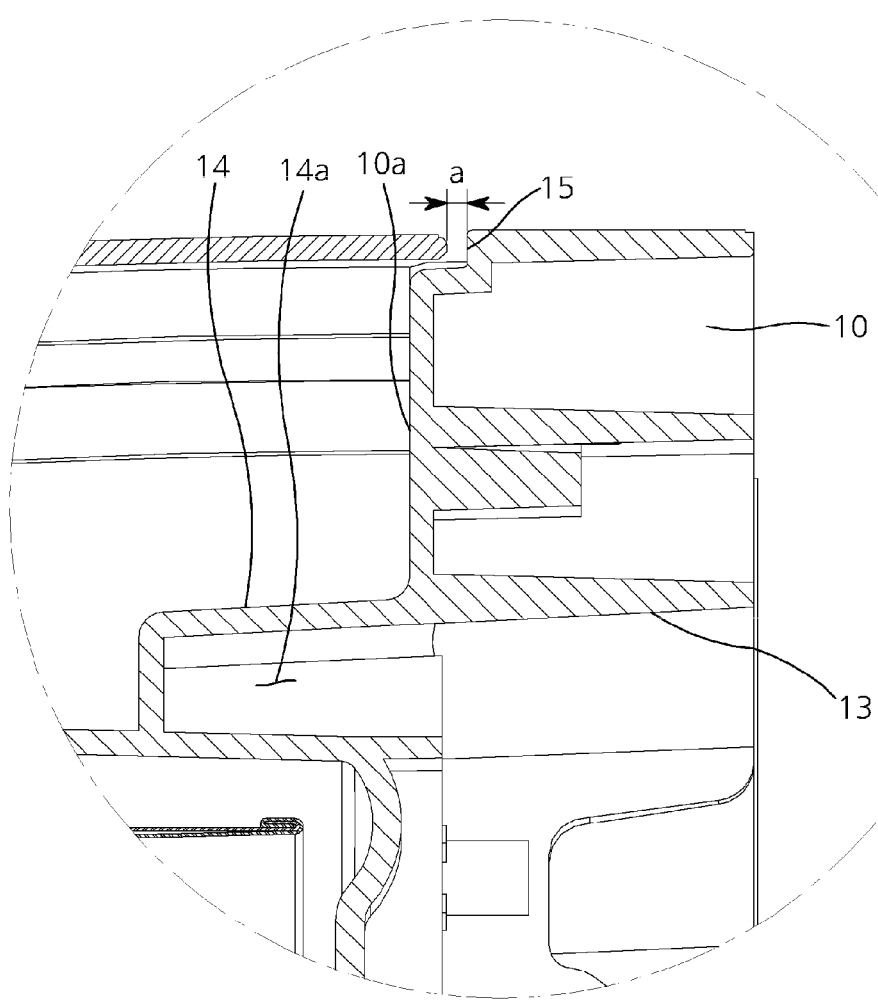
FIG. 7 is an expanded view of a portion A illustrated in FIG. 5.
Figure 8:
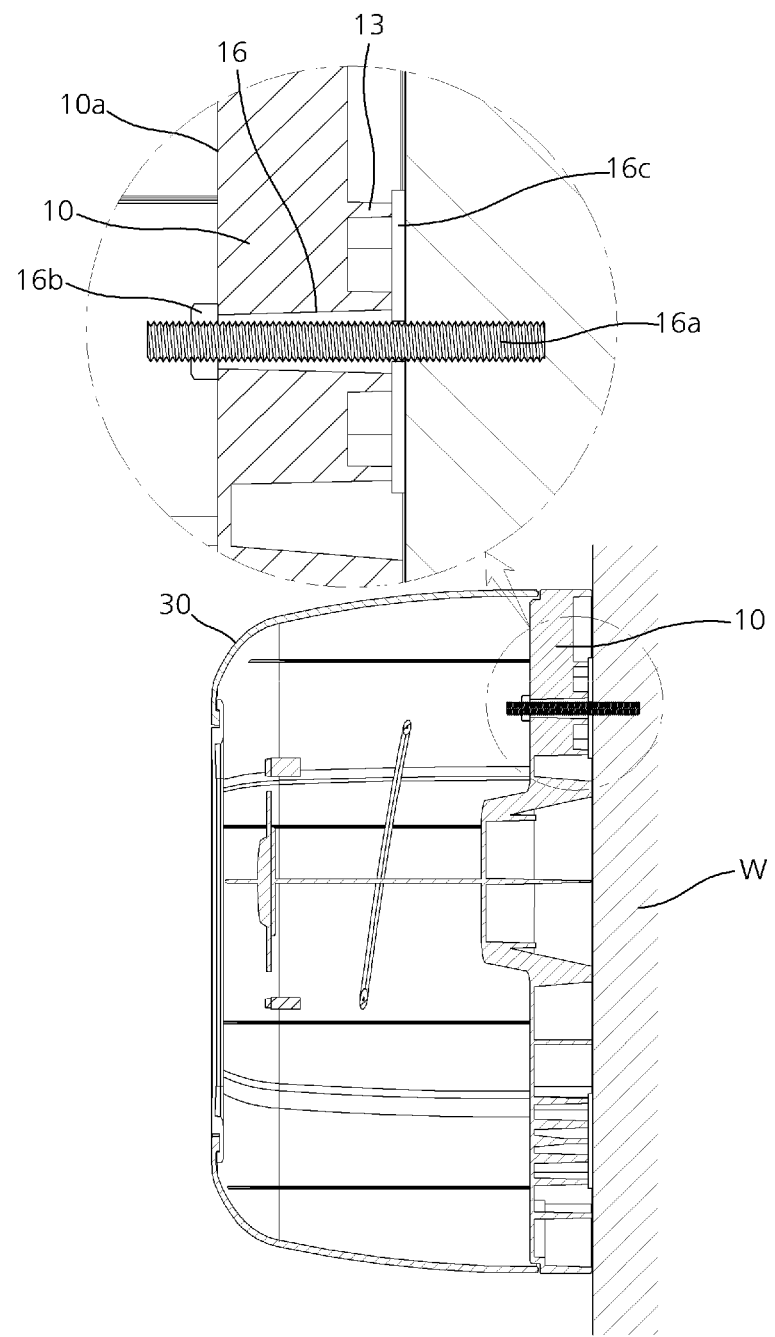
FIG. 8 is a cross-sectional view of a mounting structure of the wall-mounted drum washing machine in accordance with the embodiment of the present invention.

FIG. 5 is a cross-sectional view of the wall-mounted drum washing machine in accordance with the embodiment of the present invention. FIG. 6 is an operation state diagram illustrating an elastic assembly unit of the wall-mounted drum washing machine in accordance with the embodiment of the present invention. FIG. 7 is an expanded view of a portion A illustrated in FIG. 5. FIG. 8 is a cross-sectional view of a mounting structure of the wall-mounted drum washing machine in accordance with the embodiment of the present invention.

Referring to FIGS. 5 to 8, the wall-mounted drum washing machine in accordance with the embodiment of the present invention further includes a reinforcement portion 14 connecting the tub 20 and the rear panel 10 and surrounding the tub 20.

The rear panel 10 is formed in a panel shape and mounted on the wall surface W, and the cylindrical tub 20 is formed to protrude to the front side from the front surface 10a of the rear panel 10.

The reinforcement portion 14 formed at connection between the tub 20 and the rear panel 10 surrounds an inner end portion of the tub 20 in a ring shape.

Since the reinforcement portion 14 surrounds the inner end portion of the tub 20, a load applied to the connection between the tub 20 and the rear panel 10 is distributed.

Thus, it is possible to prevent the inner end portion of the tub 20 from being deformed or broken.

Furthermore, since the plurality of radial ribs 13 and reinforcement ribs 13c are formed on the rear surface of the rear panel 10, the strength of the rear panel 10 is improved. Therefore, the rear panel 10 may be prevented from being deformed or broken.

Since the reinforcement portion 14 is integrated with the reinforcement rib 13c, the reinforcement portion 14 may prevent the deformation of the inner end portion of the tub 20, and the reinforcement rib 13c may prevent the deformation of the rear panel 10.

Thus, the strength of the connection between the tub 20 and the rear panel 10 is improved.

The tub 20 is formed to protrude to the front side from the rear panel 10, and the reinforcement ribs 13 are formed to protrude to the rear side from the rear panel 10.

Since the reinforcement portion 14 protrudes to the front side from the rear panel 10 and is integrally connected to the tub 20, the reinforcement portion 14 may surround the inner end portion of the tub 20, and connects the tub 20 and the rear panel 10 at a position protruding from the front surface 10a.

The top of the reinforcement portion 14 is bent to be integrally connected to the tub 20. As the top of the reinforcement portion 14 is bent, a space 14a is formed between the tub 20 and the bottom of the reinforcement portion 14.

Furthermore, a front end portion of the reinforcement portion 14 and the front surface 10a of the rear panel 10 form a stair shape.

Figure 11:
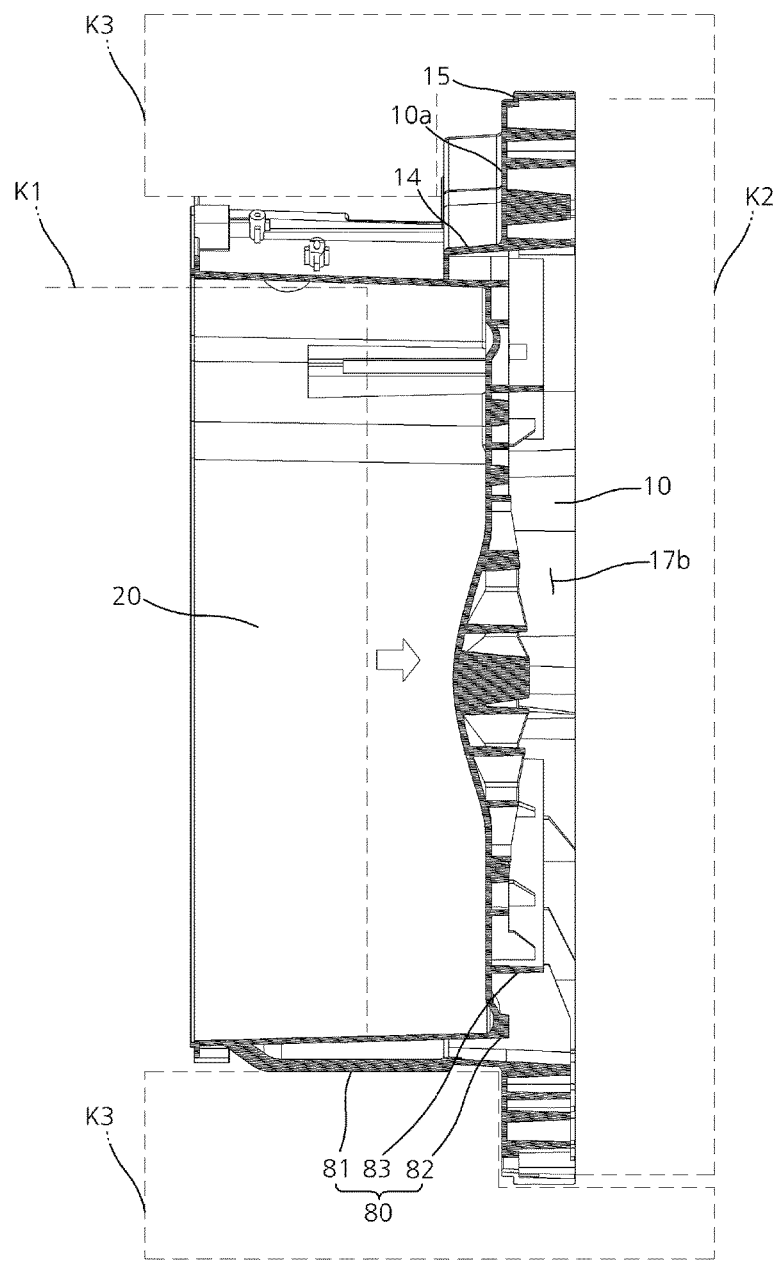
FIG. 11 is a cross-sectional view of the drain unit of the wall-mounted drum washing machine in accordance with the embodiment of the present invention.

Thus, the rear panel 10 having the tub 20 integrated therein may be manufactured through a first mold K1 disposed at the front surface 10a of the rear panel 10, a second mold K2 disposed at the rear surface of the rear panel 10, and a third mold K3 disposed at a side surface of the rear panel 10 and the tub 20 (refer to FIG. 11).

Through the above-described mold process, the rear panel 10, the tub 20, and the reinforcement portion 14 are integrally formed.

The rear panel 10 has a receiving portion 15 formed on the circumference thereof, to which the box unit 30 is coupled.

Thus, when the rear panel 10 and the box unit 30 are assembled to each other, an end portion of the box unit 30 may be precisely received on the receiving portion 15 formed on the circumference of the rear panel 10.

The receiving portion 15 is disposed at the rear side from the front surface 10a of the rear panel 10, and the reinforcement portion 14, the front surface 10a, and the receiving portion 15 are disposed to form a stair shape.

Therefore, when the box unit 30 and the rear panel 10 are assembled, the end portion of the box unit 30 may be precisely disposed on the receiving portion 15 through a step portion formed between the receiving portion 15 and the front surface 10a.

Furthermore, since the inner end portion of the tub 20 is surrounded by the reinforcement portion 14 protruding from the front surface 10a, the strength of the connection between the tub 20 and the rear panel 10 may be improved.

The reinforcement portion 14, the front surface 10a, and the receiving portion 15 form a stair shape protruding to the front side toward the reinforcement portion 14 from the receiving portion 15.

Therefore, after the rear panel 10 integrated with the tub 20 is completely manufactured, the mold disposed at the side of the rear panel 10 and the tub 20 may be easily separated.

Furthermore, since the reinforcement portion 14, the front surface 10a, and the receiving portion 15 form a stair shape protruding to the front side toward the tub 20, the reinforcement portion 14, the front surface 10a, and the receiving portion 15 are prevented from interfering with the mold for forming the stair shape, when the mold is retreated toward the outside.

The rear panel 10 has a through-hole 16 into which a fastening member 16a is inserted to be coupled to the wall surface W, and a buffer member 16c is interposed between the through-hole 16 and the wall surface W.

The front side of the rear panel 10 has a rectangular shape or a similar shape to the rectangular shape, and the rear panel 10 includes a plurality of through-holes 16 formed at four corners thereof, respectively (refer to FIG. 8).

The plurality of radial ribs 13 and reinforcement ribs 13c are formed on the rear surface of the rear panel 10 having the through-holes 16 formed therein.

The radial ribs 13 are successively formed to be spaced at a predetermined interval from the through-holes 16, and the reinforcement ribs 13c are formed to connect the respective radial ribs 13.

The fastening member 16a is inserted into the through-hole 16 so as to be coupled to the wall surface W, and a nut member 16b is coupled to the fastening member 16a so as to be closely attached to the front surface 10a of the rear panel 10.

The vibrations generated during the washing operation are transmitted by the nut member 16b which closely attaches the fastening member 16a to the rear panel 10.

In the wall-mounted drum washing machine in accordance with the embodiment of the present invention, since the nut member 16b is positioned on the front surface 10a, a gap is formed between the nut member 16b and the wall surface W, and the reinforcement ribs 13 and the buffer member 16c are interposed in the gap so as to suppress the vibrations of the drum 23 from being transmitted to the wall surface W.

Figure 9:
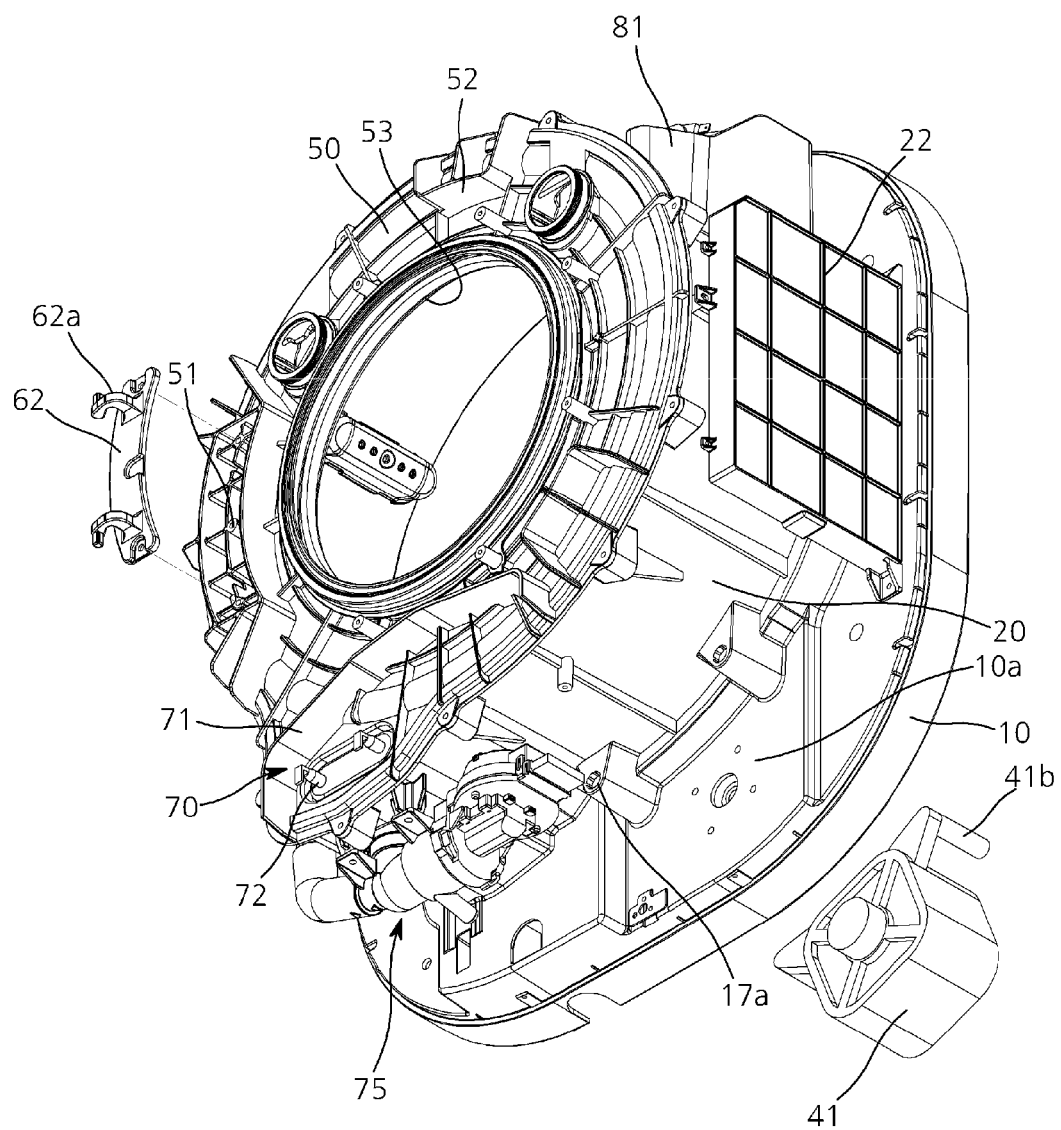
FIG. 9 is a perspective view of a front panel mounting structure of the wall-mounted drum washing machine in accordance with the embodiment of the present invention.
Figure 10:
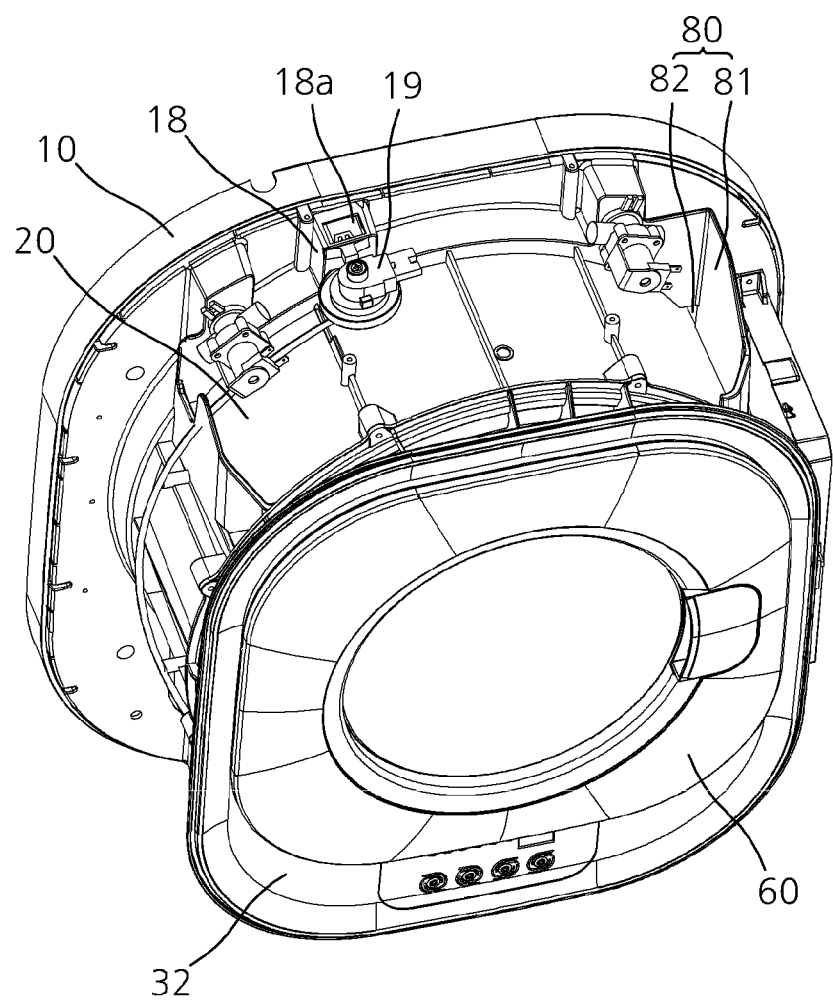
FIG. 10 is a perspective view of a water level sensor mounting structure and a drain unit of the wall-mounted drum washing machine in accordance with the embodiment of the present invention.
Figure 12:
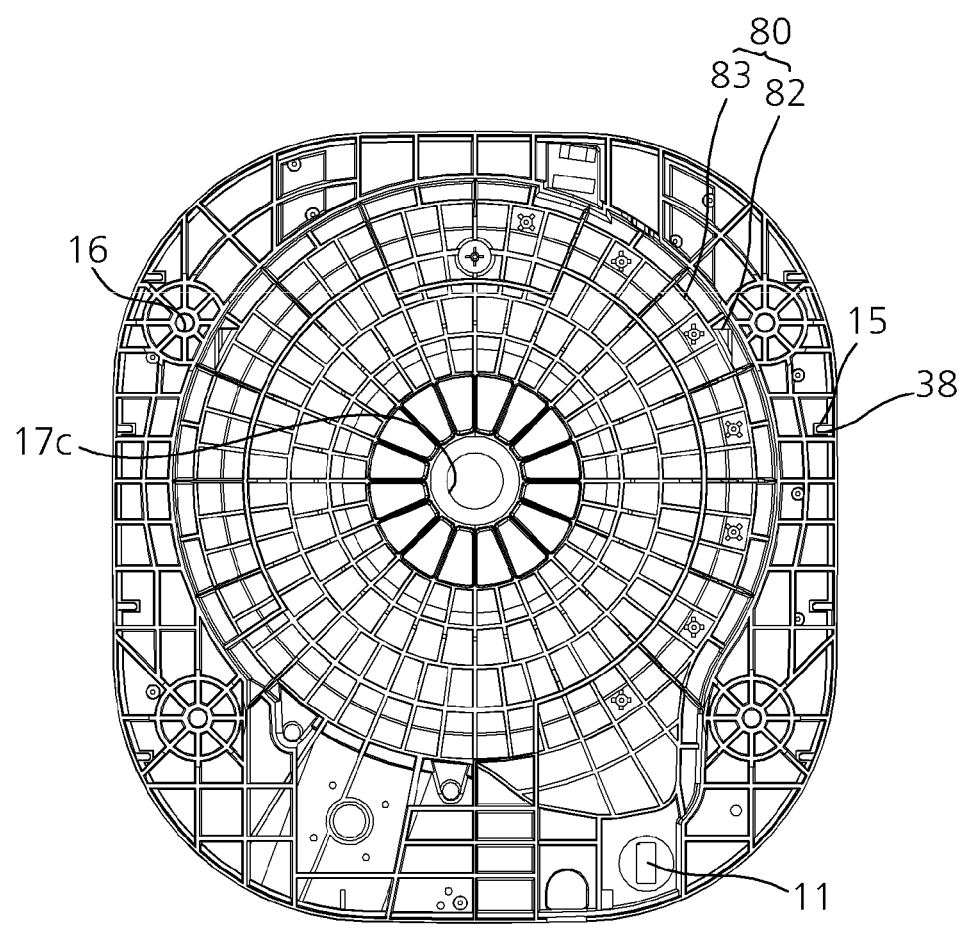
FIG. 12 is a rear view of a rear panel of the wall-mounted drum washing machine in accordance with the embodiment of the present invention.

FIG. 9 is a perspective view of a front panel mounting structure of the wall-mounted drum washing machine in accordance with the embodiment of the present invention. FIG. 10 is a perspective view of a water level sensor mounting structure and a drain unit of the wall-mounted drum washing machine in accordance with the embodiment of the present invention. FIG. 11 is a cross-sectional view of the drain unit of the wall-mounted drum washing machine in accordance with the embodiment of the present invention. FIG. 12 is a rear view of the rear panel of the wall-mounted drum washing machine in accordance with the embodiment of the present invention.

Referring to FIGS. 9 to 12, the wall-mounted drum washing machine in accordance with the embodiment of the present invention further includes a coupling unit 17 (refer to FIG. 5) and a disposition portion 17b. The coupling unit 17 is provided in the rear panel 10 such that a driving shaft 23a of the drum 23 is rotatably installed. The disposition portion 17b serves to prevent the driving unit 40 (refer to FIG. 2) connected to the driving shaft 23a from interfering with the wall surface W.

Since the coupling unit 17 is provided in the center of the rear panel 10 and connects the driving unit 40 to the drum 23 installed in the tub 20, the power provided by the driving unit 40 is transmitted to the drum 23.

The disposition portion 17b is formed by concaving the rear surface of the rear panel 10 to the front side. Since the driving unit 40 is positioned inside the disposition portion 17b, a driving wheel 42 rotated by the operation of the driving unit 40 is prevented from interfering with the rear panel 10 and the wall surface W.

The driving unit 40 includes a motor 41 to provide power to rotate the drum 23, the driving wheel 42 connected to the driving shaft 23a, and a belt 43 to transmit the power of the motor 41 to the driving wheel 42.

The motor 41 is installed on the front surface 10a of the rear panel 10, and has a rotating shaft 41a extended to the rear surface of the rear panel 10 through the rear panel 10.

The driving wheel 42 is positioned inside the disposition portion 17b formed at the rear surface of the rear panel 10, and connected to the driving shaft 23a.

The belt 43 is installed to interconnect the rotating shaft 41a of the motor 41a and the driving wheel 42.

Thus, when the power of the motor 41 is transmitted to the driving wheel 42 by the belt 43 so as to rotate the driving wheel 42, the drum 23 connected to the driving shaft 23a is rotated to perform a washing operation.

The coupling unit 17 (refer to FIG. 5) includes a rotation hole 17c formed in the rear panel 10 and a bearing 17d installed in the rotation hole 17c so as to rotatably support the driving shaft 23a.

The driving shaft 23a is rotatably installed in the rear panel 10 through the bearing 17d installed in the rotation hole 17c.

The drum 23 is installed at the front end of the driving shaft 23a, and the driving wheel 42 is installed at the rear end of the driving shaft 23a.

The disposition portion 17b is formed by concaving the rear surface of the rear panel 10 to the front side such that the driving unit 40 is disposed in the disposition portion 17b.

Specifically, the disposition portion 17b is formed by concaving the central portion of the rear panel 10, where the driving wheel 42 is positioned, to the front side.

Thus, the driving wheel 42 positioned in the disposition portion 17b may be rotated without interfering with the rear panel 10 and the wall surface W.

The motor 41 may be positioned on the rear surface of the rear panel 10 so as to be directly connected to the driving shaft 23a. That is, a direct connection-type motor may be installed, instead of the driving unit 40 described in the present embodiment of the present invention.

This structure may be easily understood by those skilled in the art to which the present invention pertains, and thus the detailed descriptions of other embodiments are omitted herein.

The motor 41 has a pair of fixing hole portions 41b formed therein, and the rear panel 10 has a pair of boss portions 17a formed to protrude to the front side. The fixing hole portions 41b are inserted into the boss portions 17a.

The fixing hole portions 41b protrude from both side surfaces of the motor 41 in the lateral direction, and are then bent in the downward direction.

The boss portions 17a protrude to the front side from the front surface 10a of the rear panel 10, and the fixing hole portions 41b are inserted into the boss portions 17a.

Thus, when the fixing hole portions 41b of the motor 41 are inserted into the boss portions 17a, the motor 41 is primarily assembled at a precise position.

The motor 41 is installed at the bottom of the front surface 10a of the rear panel 10, and disposed between the pair of boss portions 17a so as to be primarily assembled. Then, the motor 41 and the front surface 10a are coupled through a fastening member.

The motor 41 is primarily coupled to the rear panel 10 by the fixing hole portions 41b and the boss portions 17a, and secondarily coupled to the rear panel 10 by the separate fastening member 16a.

Therefore, it is possible to prevent a gap from being formed between the motor 41 and the rear panel 10 due to the vibrations generated when the motor 41 is driven.

Furthermore, the fastening member may be inserted into the fixing hole portions 41b, thereby further increasing the coupling force between the fixing hole portions 41b and the boss portions 17a.

The rear panel 10 includes a protrusion 18 installed thereon, where the water level sensor 19 is installed. The protrusion 18 has an attachment/detachment hole 18a for separating the water level sensor 19.

The water level sensor 19 is a pressure sensor installed in a separate pipe diverging from a drain pipe connected to the bottom of the tub 20.

The water level sensor 19 serves to sense the internal pressure of the tub 20 and determine the amount of wash water contained in the tub 20.

The water level sensor 19 is disposed at the top of the tub 20, and installed on the protrusion 18 protruding to the front side from the rear panel 10.

The protrusion 18 protrudes to the front side from the rear panel 10, the attachment/detachment hole 18a is formed on the top surface of the protrusion 18, and the water level sensor 19 is installed on the front surface of the protrusion 18.

The water level sensor 19 has a hook formed thereon. When the hook is inserted through the front surface of the protrusion 18, the water level sensor 19 is mounted while the hook is inserted into the protrusion 18.

When the water level sensor 19 needs to be replaced because of a long-term washing operation, an operator inserts a tool into the attachment/detachment hole 18a to push the hook to the outside of the protrusion 18. Then, the water level sensor 19 may be easily separated.

The front panel 50 having the opening 53 formed therein is installed on the tub 20, and a hinge portion 62 to connect the door 60 which opens/closes the opening 53 is supported by the front panel 50.

The hinge portion 62 is formed at one side of the opening 53 and has a curved panel shape extended in a vertical direction, and supports 62a protruding from the upper and lower parts of the hinge portion 62 are rotatably connected to the upper and lower parts of the door 60.

The rear panel 10 includes the box unit 30 to surround the tub 20, and the box unit 30 includes the cover unit 32 to cover the front panel 50.

Figure 13:
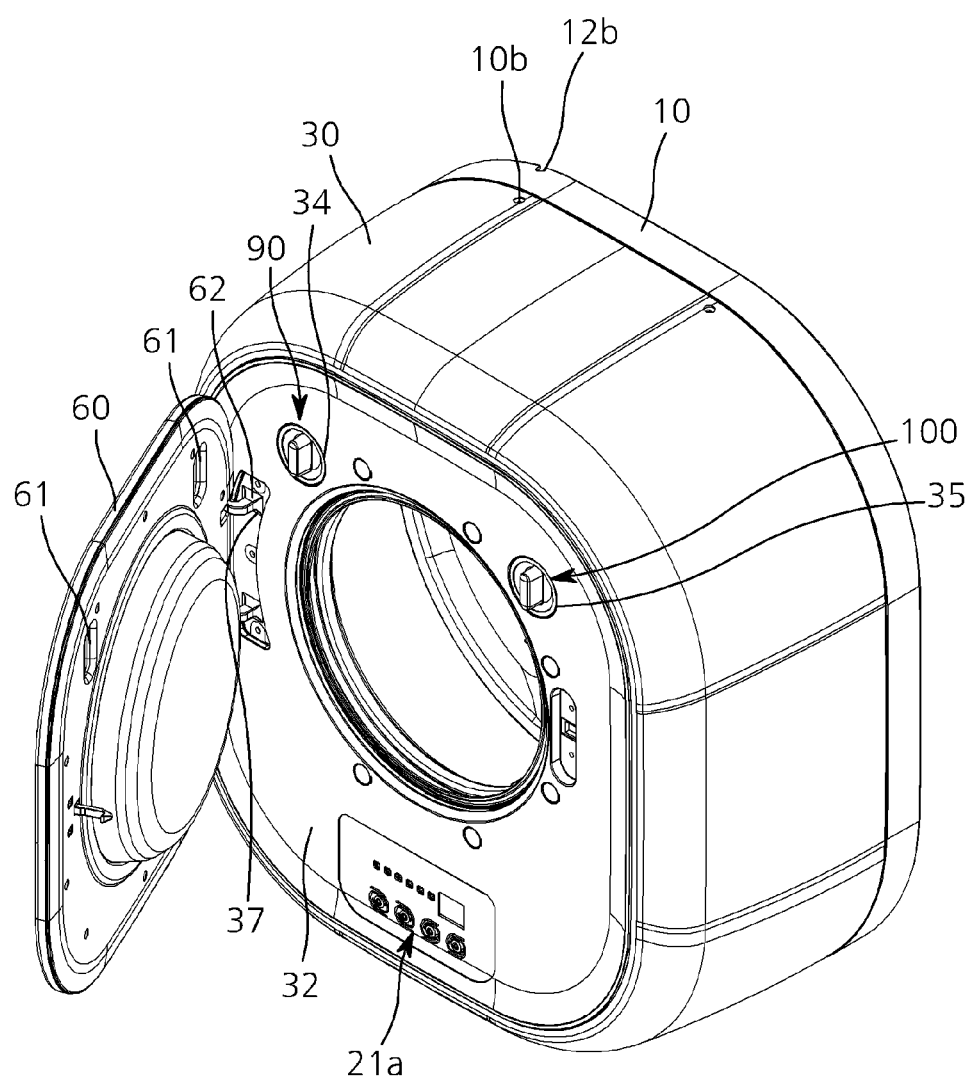
FIG. 13 is a perspective view illustrating a state in which the door of the wall-mounted drum washing machine in accordance with the embodiment of the present invention is opened.

The hinge portion 62 connected to the door 60 is supported by the fastening member coupled to the front panel 50 through the cover unit 32 (refer to FIG. 13).

The front panel 50 has a larger thickness than the cover unit 32, and includes a plurality of reinforcement ribs formed on the front surface thereof. Thus, a support force to support the door 60 may be improved.

Figure 14:
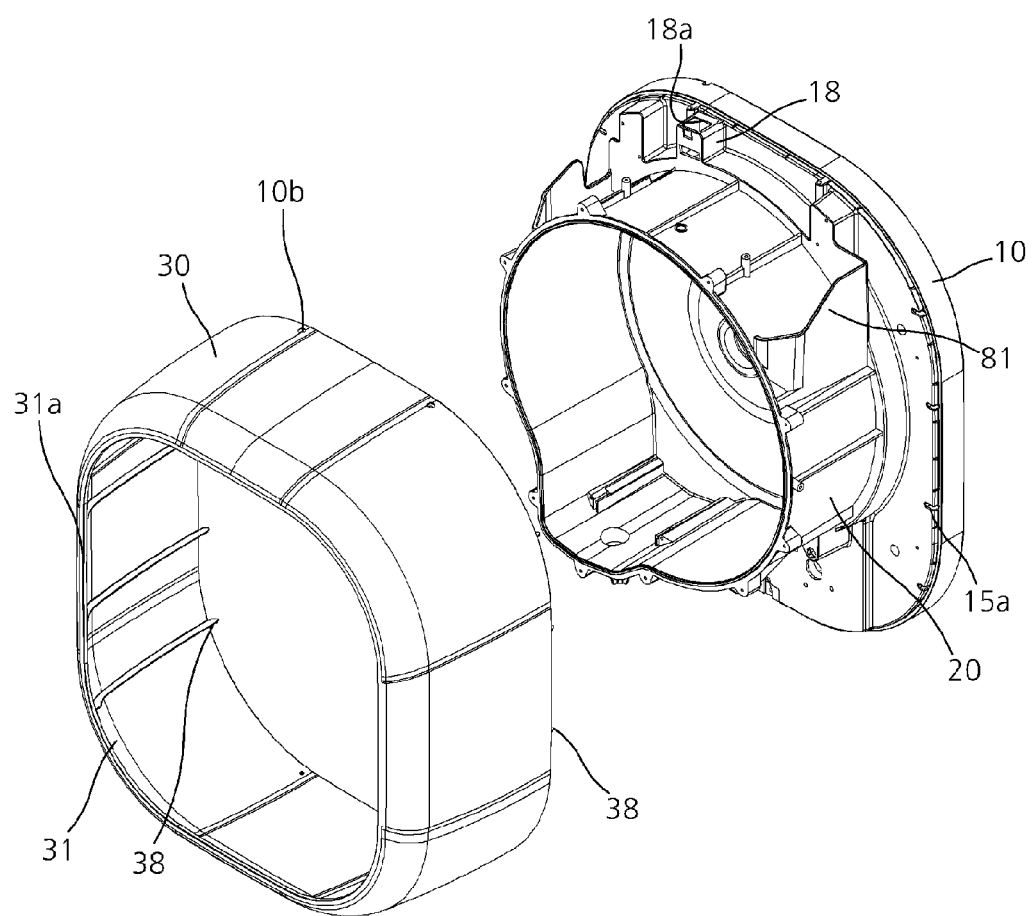
FIG. 14 is an exploded perspective view of a box unit mounting structure of the wall-mounted drum washing machine in accordance with the embodiment of the present invention.
Figure 15:
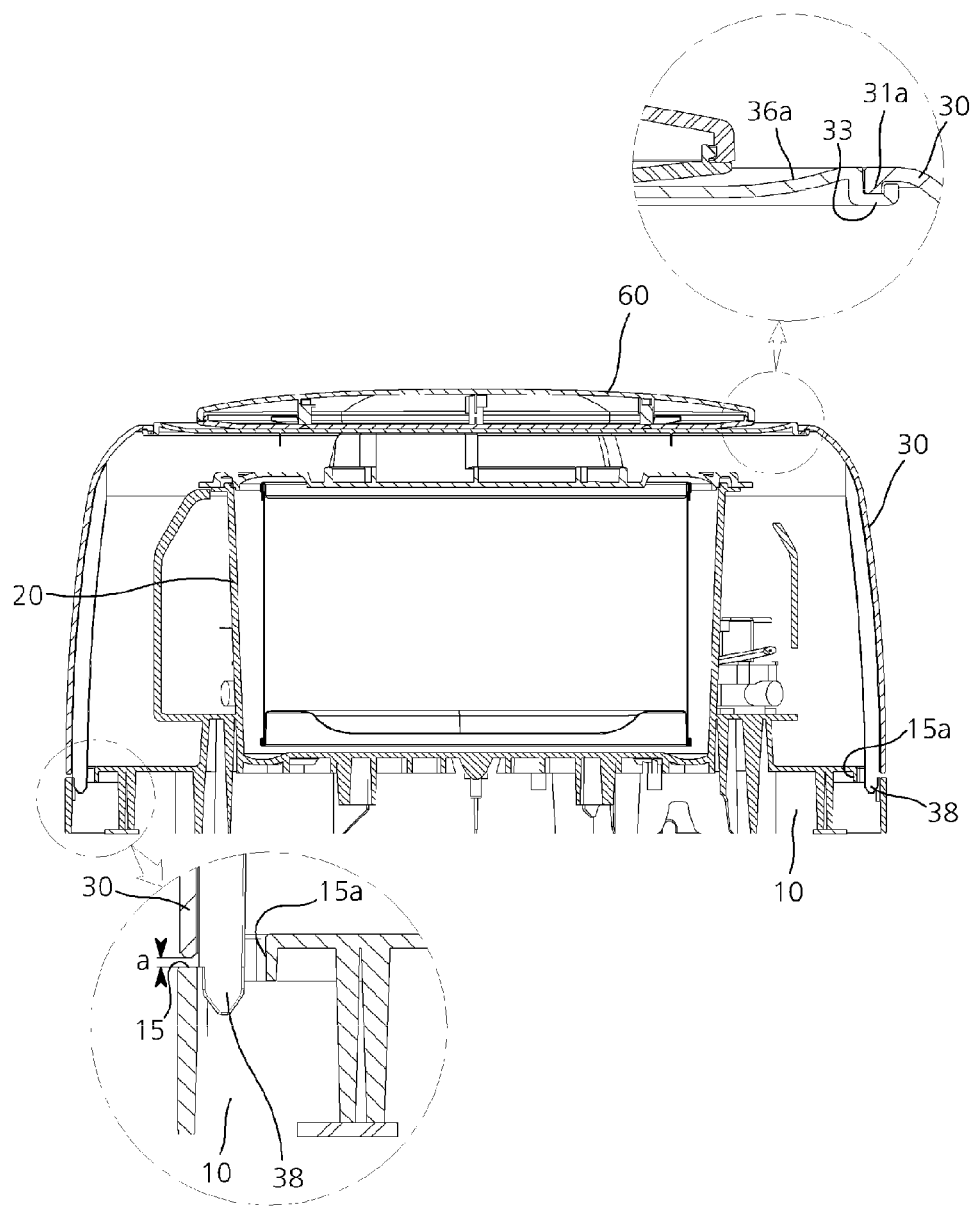
FIG. 15 is a cross-sectional view of a connection structure between guide protrusions and guide grooves of the wall-mounted drum washing machine in accordance with the embodiment of the present invention.

FIG. 13 is a perspective view illustrating a state in which the door of the wall-mounted drum washing machine in accordance with the embodiment of the present invention is opened. FIG. 14 is an exploded perspective view of a box unit mounting structure of the wall-mounted drum washing machine in accordance with the embodiment of the present invention. FIG. 15 is a cross-sectional view of a connection structure between guide protrusions and guide grooves of the wall-mounted drum washing machine in accordance with the embodiment of the present invention.

Figure 16:
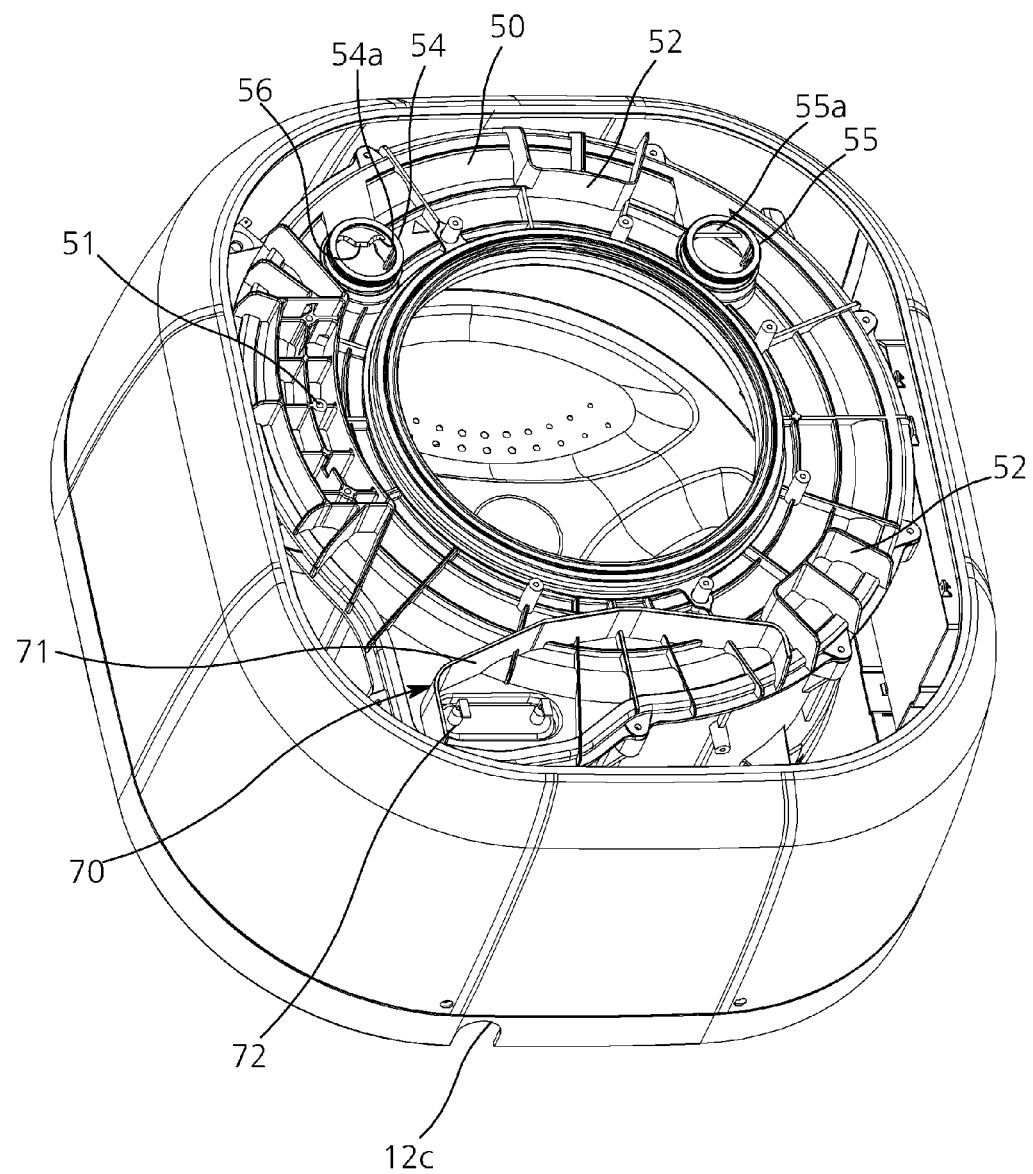
FIG. 16 is a perspective view of a bypass unit of the wall-mounted drum washing machine in accordance with the embodiment of the present invention.

FIG. 16 is a perspective view of a bypass unit of the wall-mounted drum washing machine in accordance with the embodiment of the present invention. FIG. 17 is a perspective view of the front panel including the bypass unit of the wall-mounted drum washing machine in accordance with the embodiment of the present invention.

Referring to FIGS. 13 to 17, the wall-mounted drum washing machine in accordance with the embodiment of the present invention further includes a control unit 21 installed on the front panel 50 and a bypass unit 70 to bypass wash water dropping toward the control unit 21.

The control unit 21 is installed at the bottom of the front surface of the front panel 50 so as to be connected to the manipulation unit 21a installed on the cover unit 32.

The bypass unit 70 is disposed over the control unit 21. Thus, the wash water flowing downward along the tub 20 drops in the lateral directions of the tub 20 along the bypass unit 70.

Therefore, it is possible to prevent a malfunction and damage of the drum washing machine, which may occur when water is introduced into the control unit 21.

The bypass unit 70 includes a bypass rib 71 disposed between the control unit 21 and the opening 53.

The wash water flowing downward along the tub 20 is guided toward the edge of the tub 20 along the bypass rib 71, which makes it possible to prevent the wash water from dropping toward the control unit 21.

The bypass rib 71 is formed to be elongated in the side-to-side direction, and both ends of the bypass rib 71 are bent while forming a curved surface in the downward direction.

Therefore, the wash water dropping onto the top surface of the bypass rib 71 flows toward both ends of the bypass rib 71.

Inside the bypass rib 71, a heater 72 is installed to heat wash water.

The heater 72 is connected to an electric device which provides power to heat wash water contained in the tub 20. The electric device of the heater 72 is not contacted with wash water because of the bypass rib 71.

The water supply device 74 and 74a (refer to FIG. 3) is connected to the top of the rear panel 10, and the rear panel 10 includes the drain unit 80 (refer to FIGS. 9 and 10) which prevents wash water dropping from the water supply device 74 and 74a from flowing toward the control unit 21.

The water supply device 74 and 74a includes a plurality of water supply valves 74 (refer to FIG. 3) installed in the rear panel 10 and a water supply pipe 74a connecting the water supply valves 74 to the tub 20 and connecting the water supply valves 74 to a water supply source.

The water supply pipe 74a is inserted into the rear surface of the rear panel 10 through the second through-groove 12c (refer to FIG. 2) formed at the bottom of the rear panel 10, and extended to the top of the rear panel 10 along the circumferential surface of the tub 20 so as to be connected to the water supply valves 74.

When the water supply valve 74 malfunctions or is broken, wash water supplied along the water supply pipe 74a may flow downward along the circumferential surface of the tub 20.

In the wall-mounted drum washing machine in accordance with the embodiment of the present invention, the wash water flowing toward the bottom of the tub 20 is discharged to the outside of the rear panel 10 through the drain unit 80.

The drain unit 80 includes a blocking rib 81, a drain hole 82, and a guide rib 83. The blocking rib 81 protrudes from the tub 20. The drain hole 82 is formed in the rear panel 10 so as to face the blocking rib 81. The guide rib 83 guides wash water flowing through the drain hole 82 toward the circumference of the rear panel 10.

The blocking rib 81 is formed in a funnel shape over both sides of the tub 20, and integrated with the circumferential surface of the tub 20.

Thus, the wash water flowing along the tub 20 is contained in the blocking rib 81.

The drain hole 82 is formed at the bottom of the funnel-shaped space formed by the blocking rib 81 and the circumferential surface of the tub 20, and formed through the rear panel 10 such that the front surface 10a and the rear surface of the rear panel 10 communicate with each other.

Therefore, the wash water flowing along the circumferential surface of the tub 20 from the water supply valves 74 is collected by the blocking rib 81, and moved toward the rear surface of the rear panel 10 through the drain hole 82.

The guide rib 83 is formed in a ring shape on the rear surface of the rear panel 10, and the drain hole 82 is disposed outside the guide rib 83 and formed through the front and rear surfaces of the rear panel 10.

The wash water flowing along the circumferential surface of the tub 20 is collected by the blocking rib 81, moves toward the rear surface of the rear panel 10 along the drain hole 82, and then moves toward the circumference of the rear panel 10 along the guide rib 83. Then, the wash water drops downward.

The wall-mounted drum washing machine in accordance with the embodiment of the present invention further includes an elastic assembly unit 39 (refer to FIG. 3) which connects the box unit 30 and the rear panel 10 such that an elastic force is generated between the cover unit 32 and the box unit 30.

The box unit 30 and the cover unit 32 form the outer wall of the wall-mounted drum washing machine, and provide an elastic force to each other.

Therefore, the box unit 30 and the cover unit 32 are assembled by applying an external force in a reverse direction of the elastic force generated by the box unit 30 and the cover unit 32.

Even after the box unit 30 and the cover unit 32 are assembled, an elastic force to restore the box unit 30 and the cover unit 32 to the original state still exists.

Thus, the coupling force among the box unit 30, the cover unit 32, and the rear panel 10 is improved by the elastic force.

The elastic assembly unit 39 includes a ring portion 31a, a lock groove portion 33, and the receiving portion 15. The ring portion 31a is formed in the connection hole 31. The lock groove portion 33 is formed in the cover unit 32 such that the ring portion 31a is inserted into the lock groove portion 33. The receiving portion 15 is formed in the rear panel 10 so as to receive the box unit 30.

The box unit 30 has the connection hole 31 formed at the front side thereof, and the cover unit 32 is installed in the connection hole 31. The ring portion 31a formed in the connection hole 31 is inserted into the lock groove portion 33 formed on the circumference of the cover unit 32.

The receiving portion 15 is disposed at the rear side from the end of the box unit 30 such that a gap (a) is formed between the end of the box unit 30 and the receiving portion 15 when the box unit 30 having the cover unit 32 assembled thereto is received on the rear panel 10 (refer to FIG. 7).

Therefore, when the box unit 30 and the cover unit 32 are received on the rear panel 10 having the front panel 50 installed thereon after the box unit 30 and the cover unit 32 are assembled, the end of the box unit 30 is disposed with the gap (a) from the receiving portion 15.

When the box unit 30 and the rear panel 10 are assembled, an operator presses the front surface of the box unit 30 toward the receiving portion 15 such that the end of the box unit 30 is closely attached to the receiving portion 15 while the cover unit 32 and the box unit 30 are deformed. Then, the box unit 30 and the rear panel 10 are coupled to each other.

The box unit 30 and the rear panel 10 have a plurality of assembling holes 10b formed at the top and bottom thereof and coupled to the coupling members. Specifically, two assembling holes 10b are formed at the top of the box unit 30 and the rear panel 10, and two assembling holes 10b are formed at the bottom of the box unit 30 and the rear panel 10.

Thus, even after the box unit 30 is completely assembled, the fastening members are not exposed to the front surface of the cover unit 32 and the box unit 30.

The receiving portion 15 has guide grooves 15a formed therein, and the box unit 30 has guide protrusions 38 formed to be inserted into the guide grooves 15a.

Therefore, when the box unit 30 is received on the receiving portion 15, the box unit 30 may be disposed in such a manner that the guide protrusions 38 are inserted into the guide grooves 15a. Then, the box unit 30 may be assembled at a precise position of the rear panel 10.

The cover unit 32 includes a mounting hole 36 and a curved surface portion 36a. The door 60 is installed in the mounting hole 36, and the curved surface portion 36a is inclined to the outside of the box unit 30 from the mounting hole 36 toward the lock groove portion 33 (refer to FIG. 5).

The circumference of the cover unit 32 has a shape to protrude to the front side, due to the curved surface portion 36a.

Therefore, when the box unit 30 is pressurized toward the receiving portion 15 in a state where the cover unit 32 and the box unit 30 are coupled to each other, the end of the box unit 30 is moved toward the receiving portion 15 while the curved surface portion 36a is straightened.

The cover unit 32 includes a mounting groove 37 formed between the mounting hole 36 and the curved surface portion 36a, and the hinge portion 62 of the door 60 passes through the mounting groove 37.

After the hinge portion 62 is received in the mounting groove 37, the fastening member is coupled to the front panel 50 through the hinge portion 62 and the mounting groove 37.

Therefore, although the hinge portion 62 seems to be coupled to the cover unit 32, the hinge portion 62 is supported by the front panel 50.

The front panel 50 includes first and second supports 51 and 52 integrated therein. The first support 51 is coupled to the hinge portion 62, and the second support 52 supports the cover unit 32.

The coupling member passing through the hinge portion 62 and the mounting groove 37 is coupled to the first support portion 51.

When the cover unit 32 and the box unit 30 are pressurized toward the receiving portion 15, the second support 52 serves as a lever. Therefore, as the curved surface portion 36a of the cover unit 32 is straightened, the end of the box unit 30 is moved toward the receiving portion 15.

Figure 18:
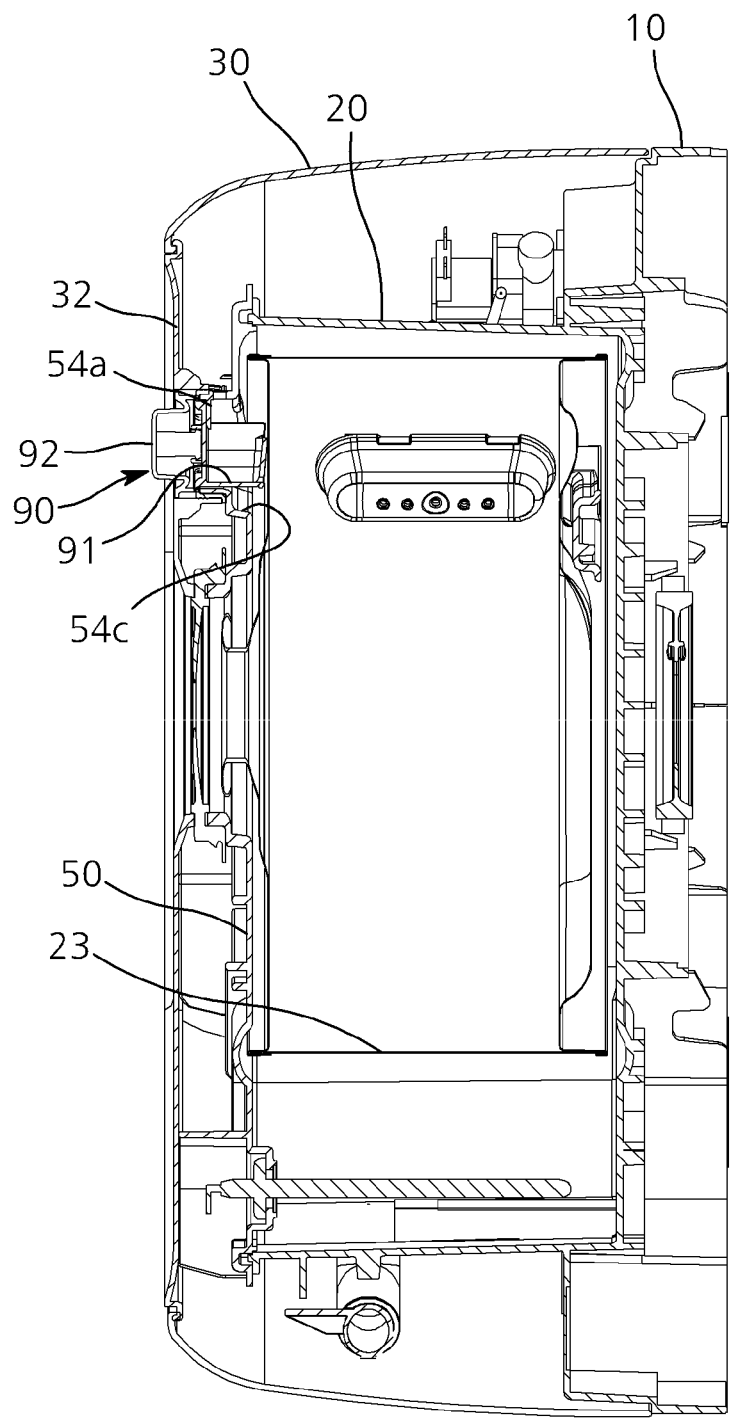
FIG. 18 is a cross-sectional view of a detergent box mounting structure of the wall-mounted drum washing machine in accordance with the embodiment of the present invention.
Figure 19:
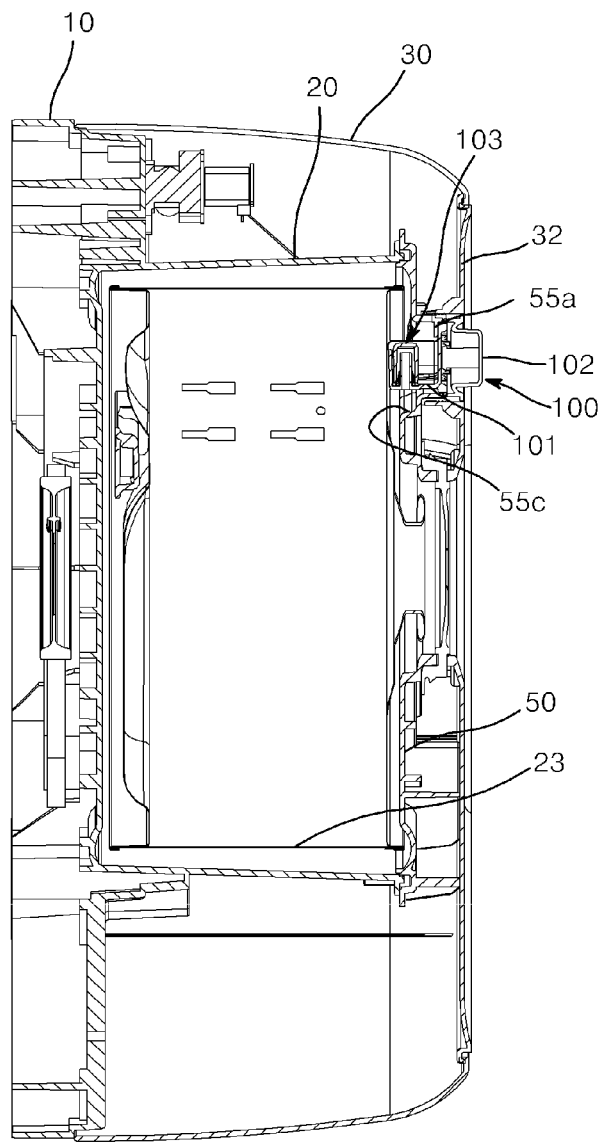
FIG. 19 is a cross-sectional view of a conditioner box mounting structure of the wall-mounted drum washing machine in accordance with the embodiment of the present invention.
Figure 20:
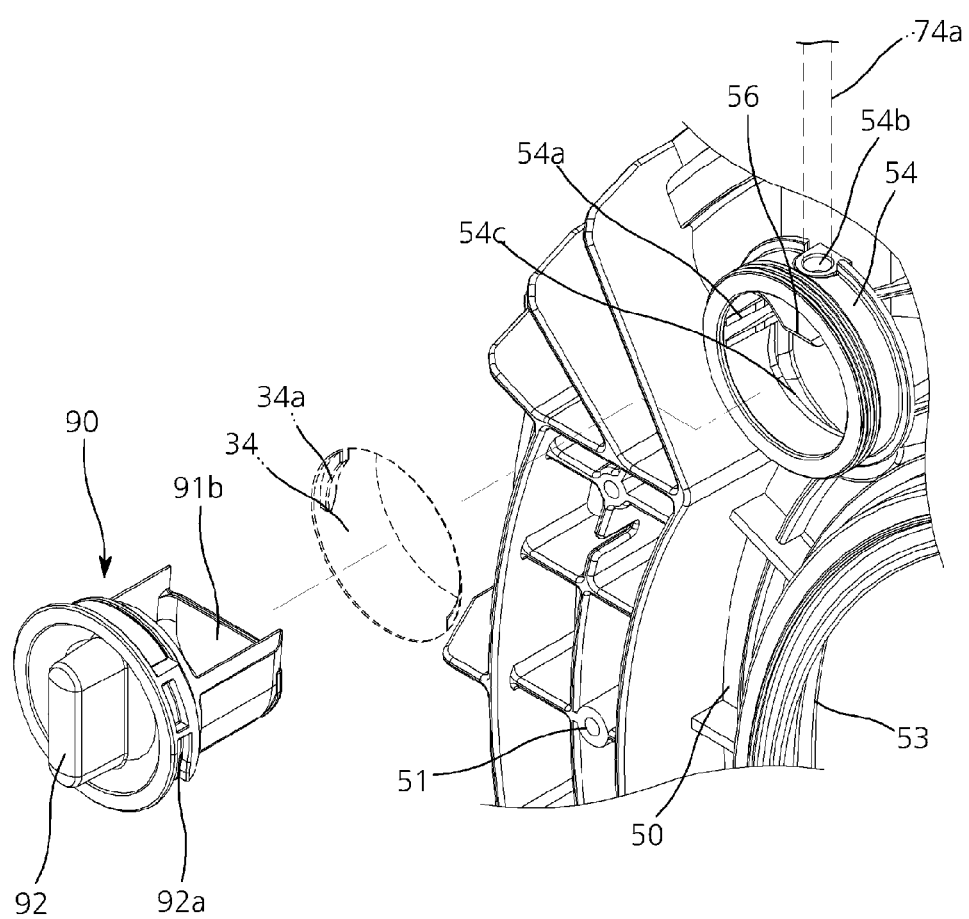
FIG. 20 is an exploded perspective view of the detergent box mounting structure of the wall-mounted drum washing machine in accordance with the embodiment of the present invention.
Figure 21:
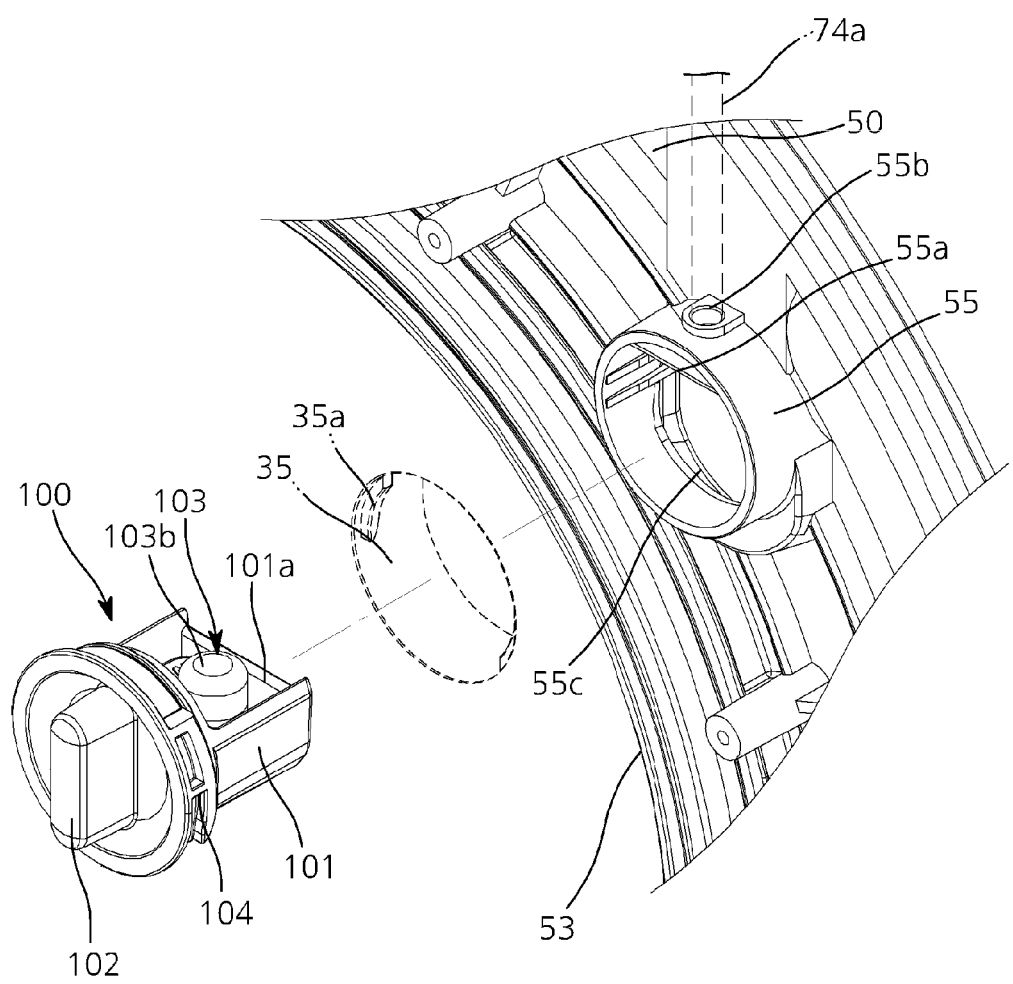
FIG. 21 is an exploded perspective view of the conditioner box mounting structure of the wall-mounted drum washing machine in accordance with the embodiment of the present invention.

FIG. 18 is a cross-sectional view of a detergent box mounting structure of the wall-mounted drum washing machine in accordance with the embodiment of the present invention. FIG. 19 is a cross-sectional view of a conditioner box mounting structure of the wall-mounted drum washing machine in accordance with the embodiment of the present invention. FIG. 20 is an exploded perspective view of the detergent box mounting structure of the wall-mounted drum washing machine in accordance with the embodiment of the present invention. FIG. 21 is an exploded perspective view of the conditioner box mounting structure of the wall-mounted drum washing machine in accordance with the embodiment of the present invention.

Figure 22:
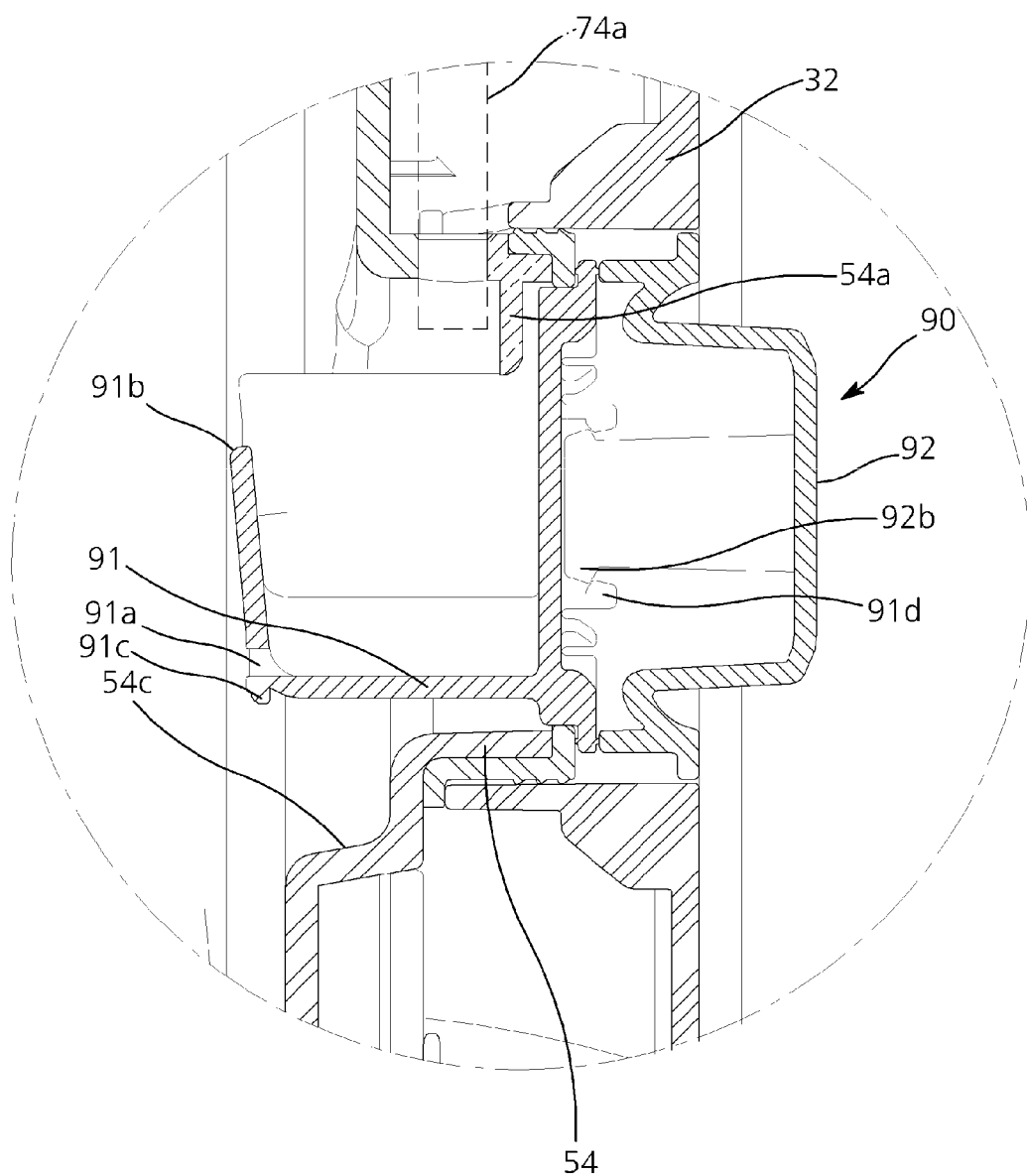
FIG. 22 is an expanded cross-sectional view of the detergent box mounting structure of the wall-mounted drum washing machine in accordance with the embodiment of the present invention.
Figure 23:
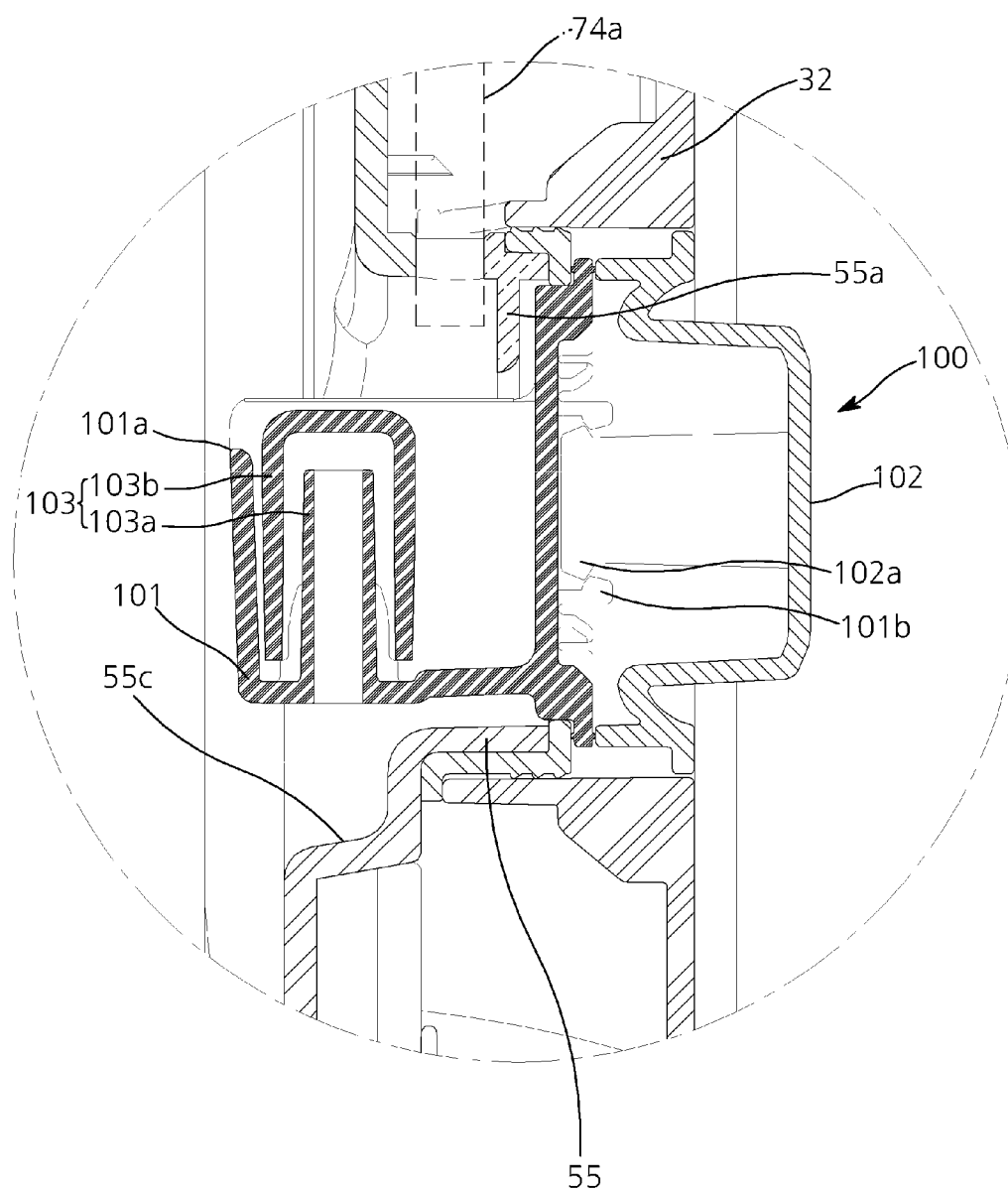
FIG. 23 is an expanded cross-sectional view of the conditioner box mounting structure of the wall-mounted drum washing machine in accordance with the embodiment of the present invention.
Figure 24:
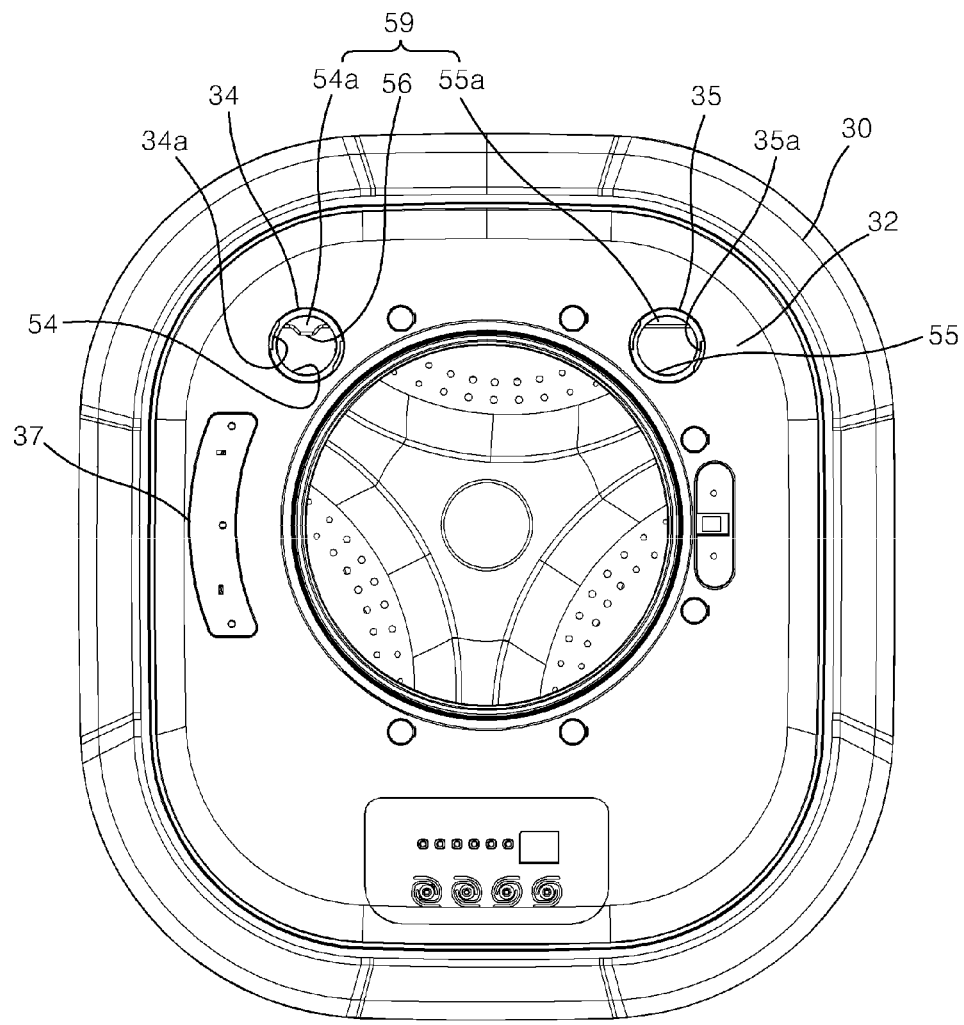
FIG. 24 is a diagram illustrating a misassembling prevention unit of the wall-mounted drum washing machine in accordance with the second embodiment of the present invention.

FIG. 22 is an expanded cross-sectional view of the detergent box mounting structure of the wall-mounted drum washing machine in accordance with the embodiment of the present invention. FIG. 23 is an expanded cross-sectional view of the conditioner box mounting structure of the wall-mounted drum washing machine in accordance with the embodiment of the present invention. FIG. 24 is a diagram illustrating a misassembling prevention unit of the wall-mounted drum washing machine in accordance with the second embodiment of the present invention.

Referring to FIGS. 18 to 24, the wall-mounted drum washing machine in accordance with the embodiment of the present invention further includes a detergent box 90 detachably installed in the front panel 50 through the cover unit 32.

Since the wall-mounted drum washing machine in accordance with the embodiment of the present invention is mounted on the wall surface W, a distance between the box unit 30 and the tub 20 using a small drum and a distance between the cover unit 32 and the front panel 50 are inevitably set to a small value.

Therefore, in the present embodiment, the detergent box 90 is not installed in the cover unit 32 or the box unit 30, but detachably installed in the rear panel 10 through the cover unit 32.

The front panel 50 has a first insertion hole portion 54 into which the detergent box 90 is inserted, and the first insertion hole portion 54 has a first water supply hole 54b connected to the water supply pipe 74a.

The first insertion hole portion 54 is formed to protrude to the front side from the front surface of the front panel 50, and the first water supply hole 54b into which the water supply pipe 74a is inserted is formed at the top of the circumferential surface of the first insertion hole portion 54.

Since the water supply pipe 74a is inserted and connected to the first water supply hole 54b, water leakage does not occur between the water supply pipe 74a and the first water supply hole 54b.

Furthermore, sine the detergent box 90 is detachably installed in the first insertion hole portion 54 and the water supply pipe 74a is connected to the first water supply hole 54b, a separate detergent box 90 is not installed in the box unit 30 or the cover unit 32, but detergent and wash water are mixed in the front panel 50 and then directly supplied into the tub 20.

The detergent box 90 includes a first housing portion 91 and a first handle 92. The first housing portion 91 is inserted into the first insertion hole portion 54. The first handle 92 is rotatably connected to the first housing portion 91, and detachably coupled to the front panel 50.

The first housing portion 91 is formed in a container shape of which the top surface is opened, and the first handle 92 is rotatably coupled to the front surface of the first housing portion 91.

Therefore, when the first handle 92 is rotated after the first housing portion 91 is inserted into the first insertion hole portion 54, a locking operation is performed between the first handle 92 and a first lock hole portion 34 of the cover unit 32.

When the first handle 92 is rotated, the first housing portion 91 and the first handle 92 run idle with respect to each other. Therefore, the first housing portion 91 is not rotated.

The first housing portion 91 has a remaining water hole 91a formed therein. Thus, wash water supplied to the tub 20 through the first housing portion 91 does not remain in the first housing portion 91, but is discharged toward the tub 20 through the remaining water hole 91a.

The remaining water hole 91a is formed at the internal bottom of the first housing portion 91, and inclined toward the inside of the tub 20.

Therefore, the wash water discharged along the remaining water hole 91a from the first housing portion 91 is collected into the tub 20.

The remaining water hole 91a has a backflow prevention protrusion 91c to prevent wash water from flowing backward.

Thus, the wash water discharged from the first housing portion 91 is prevented from flowing backward through the gap between the first housing portion 91 and the first insertion hole portion 54.

The backflow prevention protrusion 91c is formed to protrude downward from the bottom surface of the remaining water hole 91a.

Therefore, the wash water introduced through the gap between the first housing portion 91 and the first insertion hole portion 54 along the bottom surface of the first housing portion 91, that is, the bottom surface of the remaining water hole 91a stands on the backflow prevention protrusion 91c and then drops downward so as to be collected into the tub 20.

The first insertion hole portion 54 has a first step portion 54c to prevent wash water from being introduced through the gap between the first housing portion 91 and the first insertion hole portion 54.

The first step portion 54c is formed by expanding the lower portion of the first insertion hole portion 54 in the downward direction.

As the gap between the first housing portion 91 and the first insertion hole portion 54 increases, wash water introduced through the gap between the bottom surface of the first housing portion 91 and the first insertion hole portion 54 is discharged toward the tub.

The first housing portion 91 has a first induction panel 91b formed on the rear surface of the first housing portion 91 and having a smaller height than both side surfaces thereof. Thus, when wash water supplied to the first housing portion 91 overflows, the overflowing wash water is supplied toward the tub 20 over the first induction panel 91b.

The first induction panel 91b of the first housing portion 91 is formed to have a smaller height than both side panels of the first housing portion 91.

Thus, when wash water supplied along a first water supply hole 54b is stored in the first housing portion 91 and then overflows from first housing portion 91, the wash water drops toward the tub 20 over the top of the first induction panel 91b.

The wall-mounted drum washing machine in accordance with the embodiment of the present invention further includes a conditioner box 100 detachably installed in the second insertion hole portion 55 through the cover unit 32.

When a washing operation is performed in a state where a fabric conditioner is contained in the conditioner box 100, wash water is supplied to the conditioner box 100 during a rinsing process. Then, the conditioner and the wash water are supplied into the tub 20.

The conditioner box 100 includes a second housing portion 101 and a second handle 102. The second housing portion 101 is inserted into the second insertion hole portion 55 and has a siphon portion 103 formed therein. The second handle 102 is rotatably connected to the second housing portion 101 and detachably coupled to the front panel 50.

The second housing portion 101 is formed in a container shape of which the top surface is opened, and the second handle 102 is rotatably coupled to the front surface of the second housing portion 101.

Therefore, when the second handle 102 is rotated after the second housing portion 101 is inserted into the second insertion hole portion 55, a locking operation is performed between the second handle 102 and a second lock hole portion 35 of the cover unit 32.

When the second handle 102 is rotated, the second housing portion 101 and the second handle 102 run idle with respect to each other. Therefore, the second housing portion 101 is not rotated.

The second housing portion 101 has the siphon portion 103 installed therein. Therefore, when wash water is supplied to the second housing portion 101, the wash water and the fabric conditioner do not remain in the second housing portion 101 due to a siphon effect, but are discharged toward the tub 20.

The second insertion hole portion 55 has a second step portion 55c to discharge wash water introduced through a gap between the second housing portion 101 and the second insertion hole portion 55 toward the tub 20.

The second step portion 55c is formed by expanding the lower portion of the second insertion hole portion 55 in the downward direction.

As the gap between the second housing portion 101 and the second insertion hole portion 55 increases, wash water introduced to the gap between the bottom surface of the second housing portion 101 and the second insertion hole portion 55 does not remain, but is discharged toward the tub 20.

The second housing portion 101 includes a second induction panel 101a formed on the rear surface thereof and having a smaller height than both side surfaces thereof. Thus, when wash water supplied to the second housing portion 101 overflows, the overflowing wash water is supplied to the tub 20 over the second induction panel 101a.

The second induction panel 101a of the second housing portion 101 is formed to have a smaller height than both side surfaces of the second housing portion 101.

Therefore, when the wash water supplied along a second supply hole 55b is stored in the second housing portion 101 and then overflows from the second housing portion 101, the wash water drops toward the tub 20 over the top of the second induction panel 101a.

The bottom surface of the second housing portion 101 is inclined toward the siphon portion 103.

The wash water or fabric conditioner remaining on the bottom surface of the second housing portion 101 moves toward the siphon portion 103 along the inclined bottom surface. Therefore, the wash waster or fabric conditioner does not remain in the second housing portion 101 due to the operation of the siphon portion 103.

The siphon portion 103 includes a discharge pipe 103a and a cover portion 103b. The discharge pipe 103a protrudes upward from the bottom surface of the second housing portion 101. The cover portion 103b covers the top of the discharge pipe 103a while maintaining a predetermined interval from the discharge pipe 103a.

When wash water is supplied to the second housing portion 101 containing fabric conditioner, the wash water and the fabric conditioner are discharged toward the discharge pipe 103a along the gap between the discharge pipe 103a and the cover portion 103b due to the siphon effect.

Furthermore, the wall-mounted drum washing machine in accordance with the embodiment of the present invention includes the misassembling prevention unit 59 to prevent the detergent box 90 and the conditioner box 100 from being switched and inserted.

Since the first and second housing portions 91 and 101 have a similar shape and size to each other, a user may switch and insert the detergent box 90 and the conditioner box 100.

In the wall-mounted drum washing machine in accordance with the embodiment of the present invention, the misassembling prevention unit 59 prevents the detergent box 90 and the conditioner box 110 from being switched and inserted.

Therefore, it is possible to prevent a user's mistake. Specifically, it is possible to prevent a washing operation from being started in a state where the conditioner box 100 is inserted into the first insertion hole portion 54 and the detergent box 90 is inserted into the second insertion hole portion 55.

The first handle 92 has a first lock portion 92a formed thereon, and the first lock hole portion 34 of the cover unit 32 into which the first handle 92 is inserted has a first stopper 34a to restrict the rotation of the first lock portion 92a.

The first handle 92 has a first coupling groove 91d formed on the rear surface thereof, into which a first hook portion 92b of the first housing portion 91 is rotatably inserted. Thus, the first handle 92 and the first housing portion 91 are connected to run idle with respect to each other.

The first handle 92 has a pair of first lock portions 92a formed on the circumferential surface thereof, and the first lock hole portion 34 of the cover unit 32 has a pair of first stoppers 34a formed at a predetermined distance from each other such that the first lock portions 92a are locked to the first stoppers 34a.

The first stoppers 34a are formed in a protrusion shape to protrude to the center from the circumference of the first lock hole portion 34, and arranged at two positions of the first lock hole portion 34 so as to be spaced from each other.

When the first handle 92 is inserted into the first lock hole portion 34 and then rotated in a state where the first lock portions 92a and the first stoppers 34a are disposed to be spaced from each other, the first lock portions 92a and the first stoppers 34a are disposed to overlap each other.

Therefore, the first handle 92 is locked so as not to be separated from the first lock hole portion 34.

At this time, since the first handle 92 and the first housing portion 91 run idle with respect to each other, it is possible to prevent the detergent contained in the first housing portion 91 from pouring.

The second handle 102 has a pair of second lock portions 104 formed thereon, and the second lock hole portion 35 of the cover unit 32, into which the second handle 102 is inserted, has a pair of second stoppers 35a to restrict the rotation of the second lock portions 104.

The second handle 102 has a second coupling groove 101b formed on the rear surface thereof, into which a second hook portion 102a of the second housing portion 101 is rotatably inserted. Thus, the second handle 102 and the second housing portion 101 are connected to run idle with respect to each other.

The second handle 102 has the pair of second lock portions 104 formed on the circumferential surface thereof, and the second lock hole portion 35 of the cover unit 32 has the pair of second stoppers 35a formed at a predetermined distance from each other such that the second lock portions 104 are locked to the second stoppers 35a.

The second stoppers 35a are formed in a protrusion shape to protrude to the center from the circumference of the second lock hole portion 35, and are formed at two positions of the second lock hole portion 35 so as to be spaced at a predetermined distance from each other.

When the second handle 102 is inserted into the second lock hole portion 35 and then rotated in a state where the second lock portions 104 and the second stoppers 35a are disposed to be spaced from each other, the second lock portions 104 and the second stoppers 35a are disposed to overlap each other.

Therefore, the second handle 102 is locked so as not to be separated from the second lock hole portion 35.

At this time, since the second handle 102 and the second housing portion 101 are connected to run idle with respect to each other, it is possible to prevent the fabric conditioner contained in the second housing portion 101 from pouring.

The first lock hole portion 34 has a first blocking panel 54a extended from the top thereof toward the first housing portion 91, and the second lock hole portion 35 has a second blocking panel 55a extended from the top thereof toward the second housing portion 101.

The first blocking panel 54a is disposed at the top of the first housing portion 91 when the first housing portion 91 is inserted, and disposed close to the first handle 92 in a state where the first housing portion 91 is inserted into the first insertion hole portion 54.

Therefore, when wash water is supplied through the first water supply hole 54b, the wash water overflowing to the outside of the first housing portion 91 may be prevented from leaking toward the first handle 92.

The second blocking panel 55a is disposed at the top of the second housing portion 101 when the second housing portion 101 is inserted, and disposed close to the second handle 102 in a state where the second housing portion 101 is inserted into the second insertion hole portion 55.

When wash water is supplied through the second water supply hole 55b, the wash water overflowing to the outside of the second housing portion 101 may be prevented from leaking toward the second handle 102.

The misassembling prevention unit 59 includes a blocking portion 56 formed on the first blocking panel 54a extended from the first insertion hole portion 54 toward the first housing portion 91 and interfering with the siphon portion 103.

The siphon portion 103 formed in the second housing portion 101 is formed in an elongated shape to protrude toward the top of the second housing portion 101.

When the second housing portion 101 is inserted into the first insertion hole portion 54, the siphon portion 103 and the blocking portion 56 interfere with each other such that the second housing portion 101 cannot be inserted into the first insertion hole portion 54.

Thus, it is possible to prevent a user's mistake. For example, it is possible to prevent a washing operation from being started in a state where the detergent box 90 and the conditioner box 100 are switched and inserted.

Furthermore, the door 60 installed on the front panel 50 has sensing grooves 61 into which the first and second handles 92 and 102 are inserted (refer to FIG. 13).

When the door 60 is closed in a state where the first and second handles 92 and 102 are not completely locked, the first and second handles 92 and 102 are not inserted into the sensing groove portion 61.

Therefore, the user cannot close the door 60 in a state where the first and second handles 92 and 102 are not completely locked. As such, when the drum washing machine is not imperfectly set, a normal washing operation cannot be performed.

Figure 25:
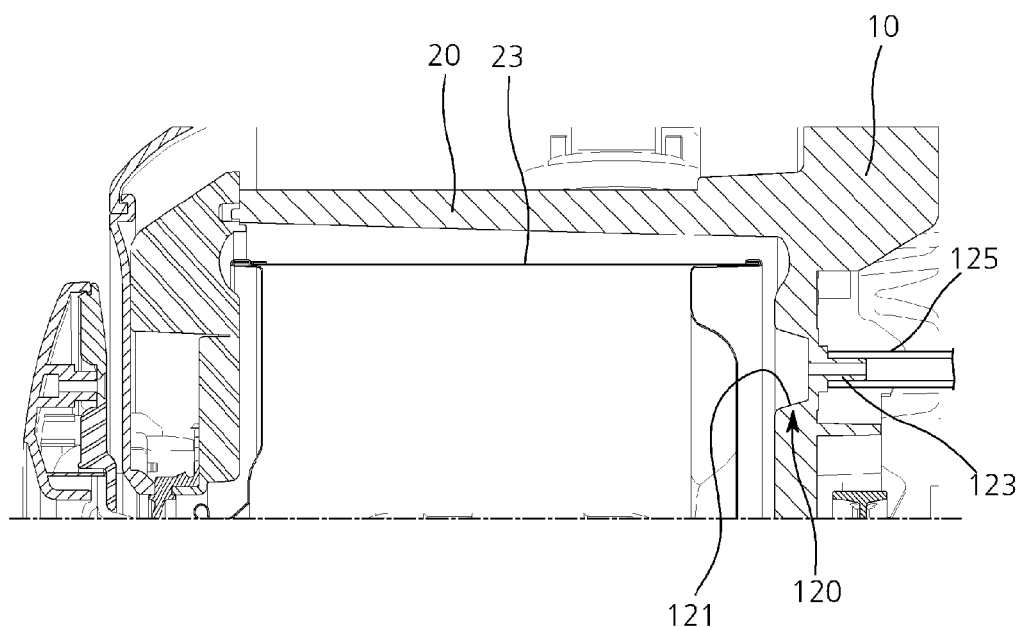
FIG. 25 is a cross-sectional view of an overflow prevention unit of the wall-mounted drum washing machine in accordance with the embodiment of the present invention.

FIG. 25 is a cross-sectional view of an overflow prevention unit of the wall-mounted drum washing machine in accordance with the embodiment of the present invention.

Referring to FIGS. 2 and 25, the wall-mounted drum washing machine in accordance with the embodiment of the present invention further includes an air discharge port 123 and a clogging prevention portion 120. The air discharge port 123 is formed in the rear panel 10 so as to discharge air filled in the tub 20. The clogging prevention portion 120 serves to prevent clogging of the air discharge port 123.

Through the air discharge port 123 formed at the top of the central portion of the rear panel 10, high-pressure air inside the tub 20 is discharged to the outside of the tub 20.

The air discharge port 123 includes a ventilation pipe 125 to guide the air discharged from the tub 20 to the outside, and the ventilation pipe 125 is extended toward the second through-groove 12c by the guide unit 1012.

The ventilation pipe 125 may be coupled to the installation hole portion 13a in a state where the cable member 13b is wound around the ventilation pipe 125, like the power line 11a.

The clogging prevention portion 120 includes a foaming portion 121 formed in the rear panel 10 so as to expand an end portion of the air discharge port 123.

Since the foaming portion 121 has a larger diameter than the air discharge port 123, the foaming portion 121 prevents the air discharge port 123 from clogging with foam formed in the tub 20.

The clogging prevention portion 120 further includes the guide unit 12 formed in the rear panel 10 such that the ventilation pipe 125 connected to the air discharge port 123 is extended toward a higher position than the air discharge port 123.

Both of the power line 11a and the ventilation pipe 125 may be inserted into the guide unit 12. When the cable member 13b wound around the ventilation pipe 125 is coupled to the installation hole portion 13a by the fastening member 16a, the ventilation pipe 125 may be prevented from coming off to the outside of the fixing portion 12a.

The ventilation pipe 125 extended to the inside of the fixing portion 12a is extended toward the bottom of the rear panel 10, and exposed to the outside of the rear panel 10 through the second through-groove 12c.

Figure 26:
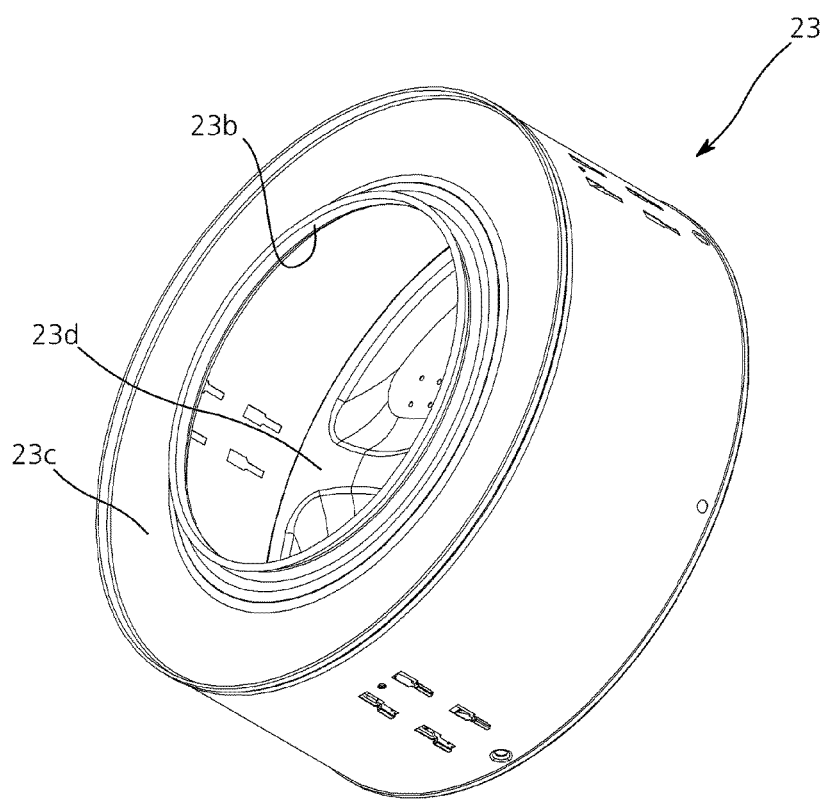
FIG. 26 is a front perspective view of a drum of the wall-mounted drum washing machine in accordance with the embodiment of the present invention.
Figure 27:
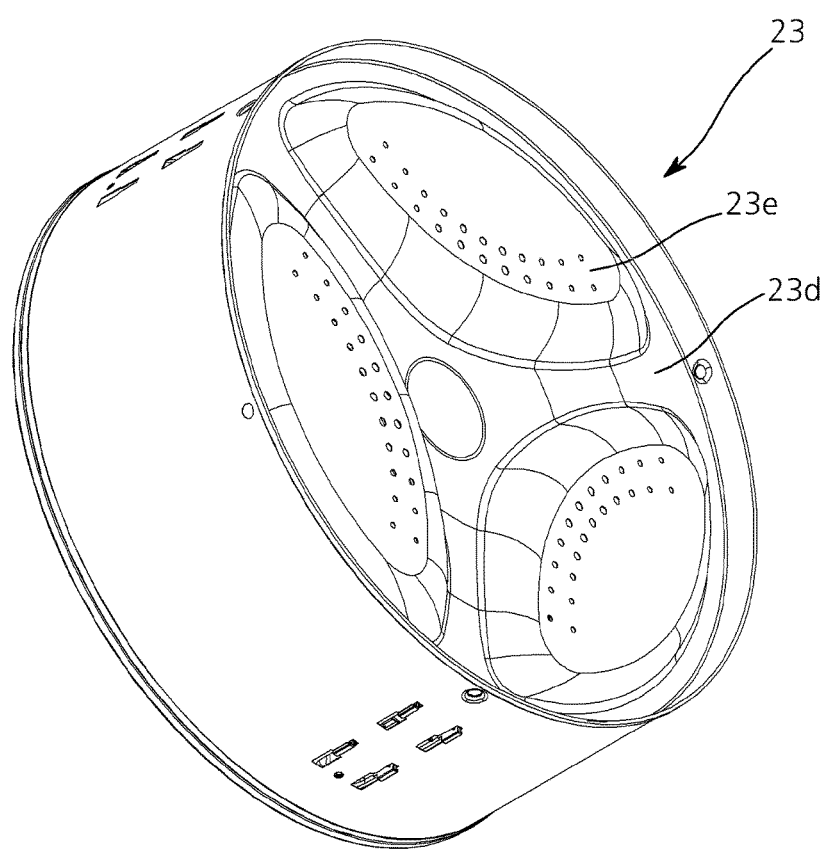
FIG. 27 is a rear perspective view of the drum of the wall-mounted drum washing machine in accordance with the embodiment of the present invention.
Figure 28:
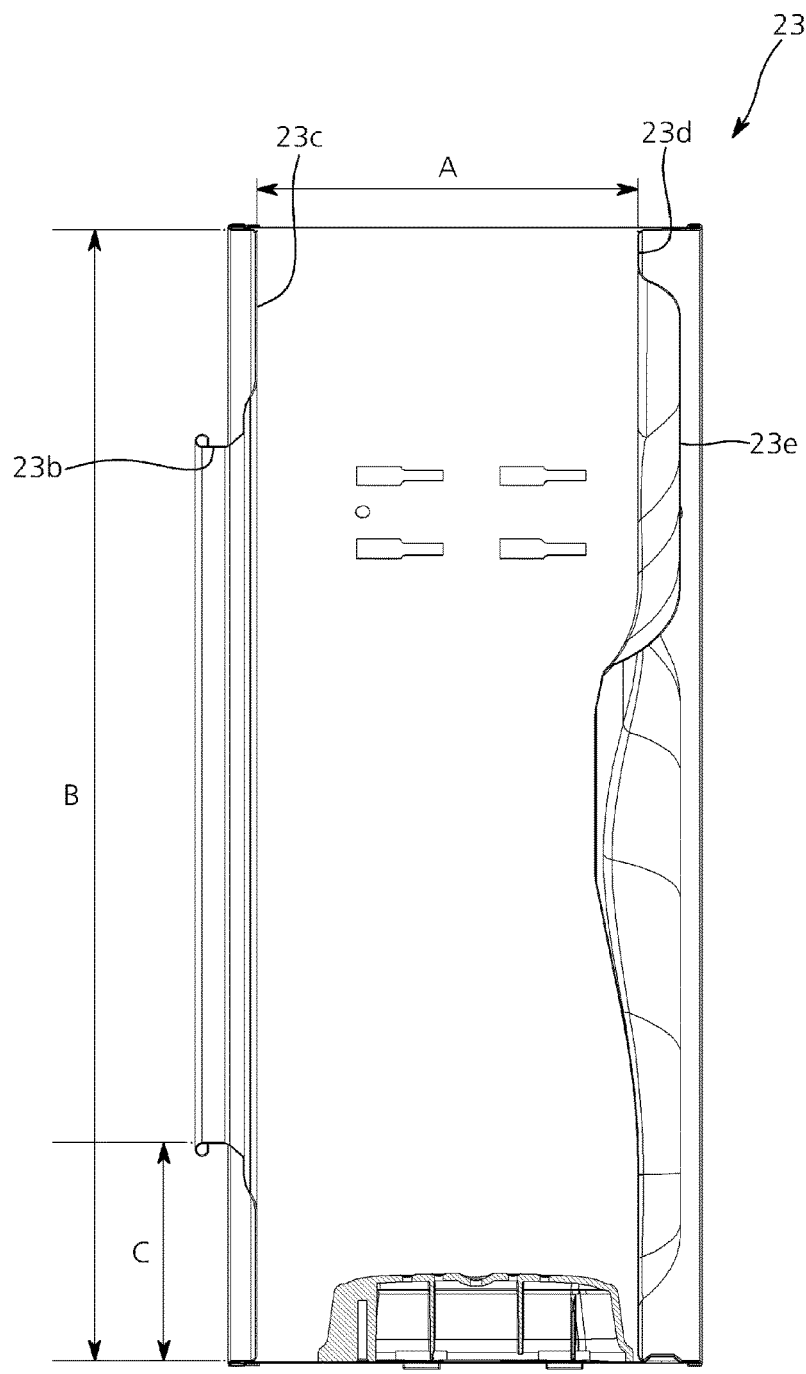
FIG. 28 is cross-sectional view of the drum of the wall-mounted drum washing machine in accordance with the embodiment of the present invention.

FIG. 26 is a front perspective view of the drum of the wall-mounted drum washing machine in accordance with the embodiment of the present invention. FIG. 27 is a rear perspective view of the drum of the wall-mounted drum washing machine in accordance with the embodiment of the present invention. FIG. 28 is cross-sectional view of the drum of the wall-mounted drum washing machine in accordance with the embodiment of the present invention.

Referring to FIGS. 26 to 28, the drum 23 of the wall-mounted drum washing machine in accordance with the embodiment of the present invention is formed to have a larger diameter B than the depth A of the drum 23. At this time, the depth A of the drum 23 indicates a distance from the front surface 23c to the rear surface 23d of the drum 23.

Since the diameter B of the drum 23 is larger than the depth A thereof, that is, the diameter B is set to a relatively large value and the depth A is set to a relatively small value, the front-to-rear length of the drum 23 may be reduced when the same capacity is intended to be realized.

Since the front-to-rear length of the wall-mounted drum washing machine is reduced, it is possible to reduce the protrusion of the drum washing machine from the wall surface W.

In accordance with the embodiment of the present invention, the depth A of the drum 23 is set to 120 to 130 mm. When the drum 23 is formed to have a depth of less than 120 mm, it may be difficult to house laundry between the front surface 23c and the rear surface 23d of the drum 23. Therefore, it becomes inconvenient to put the laundry.

Furthermore, when the drum 23 is formed to have a depth of more than 130 mm, the front-to-rear length of the drum washing machine may be increased so that the drum washing machine occupies a large installation space. Therefore, the exterior quality of the wall-mounted drum washing machine may be degraded, and the space occupied by the drum washing machine may be increased to reduce a user's action radius.

Therefore, when the depth A of the drum 23 is set to 120 to 130 mm, it may become easy to put the laundry, and the exterior quality of the drum washing machine may be improved. Furthermore, the protrusion of the drum washing machine may be reduced to increase a user's action radius.

The diameter B of the drum 23 may be set 3 to 3.2 times larger than the depth A of the drum 23.

When the diameter B of the drum 23 is less than a value which is three times larger than the depth A of the drum 23, the drum 23 has a relatively large depth. Thus, the protrusion of the drum washing machine from the wall surface W increases.

Therefore, as described above, the front-to-rear length of the drum washing machine is increased so that the drum washing machine occupies a large installation space. Thus, the exterior quality of the wall-mounted drum washing machine may be degraded, and the space occupied by the drum washing machine may be increased to reduce a user's action radius.

When the diameter B of the drum 23 is more than a value which is 3.2 times larger than the depth A of the drum 23, the horizontal and vertical sizes of the product are increased. Therefore, the area of the wall surface W required for mounting the drum washing machine may be increased to thereby make it difficult to install the drum washing machine.

Therefore, when the diameter B of the drum 23 is set 3 to 3.2 times larger than the depth A of the drum 23, it may become easy to put the laundry, the exterior quality of the drum washing machine may be improved, and the protrusion of the drum washing machine may be reduced to increase a user's action radius.

Furthermore, the shortest distance C from the circumference of the drum 23 to an input hole 23b is set 0.4 to 0.8 times smaller than the depth A of the drum 23.

When the shortest distance C from the circumference of the drum 23 to the input hole 23b is less than a value which is 0.4 times smaller than the depth A of the drum 23, the space required for housing laundry may be reduced to thereby make it inconvenient to put the laundry. In this case, the laundry put into the drum 23 may come out of the drum 23.

Furthermore, when the shortest distance C from the circumference of the drum 23 to the input hole 23b exceeds a value which is 0.8 times smaller than the depth A of the drum 23, the size of the input hole 23b may be reduced to thereby make it inconvenient to take out the laundry.

Therefore, when the shortest distance C from the circumference of the drum 23 to the input hole 23b is set 0.4~0.8 times smaller than the depth A of the drum 23, it may become easy to put laundry, and the exterior quality of the drum washing machine may be improved. Furthermore, the protrusion of the drum washing machine may be reduced to increase a user's action radius.

The drum 23 includes a plurality of protrusions 23e formed on the rear surface 23d thereof, and the protrusions 23e are arranged to be spaced at a predetermined distance from each other and connected to the driving unit 40.

The operation of the wall-mounted drum washing machine in accordance with the embodiment of the present invention will be described as follows.

First, when the wall-mounted drum washing machine is installed, four fastening members 16a are installed on the wall surface W, and the buffer member 16c is inserted into the fastening members 16a. Then, the rear panel 10 is mounted on the wall surface W such that the fastening members 16a are inserted into the through-holes 16 of the rear panel 10.

The fastening members 16a protruding toward the front surface 10a of the rear panel 10 through the through-holes 16 are coupled to the nut members 16b, and the nut members 16b are closely attached to the front surface 10a.

Then, when the cover unit 32 and the box unit 30 are assembled and the box unit 30 is put on the rear panel 10, the end portion of the box unit 30 is received on the receiving portion 15, and the guide protrusions 38 are inserted into the guide grooves 15a. Then, the box unit 30 is received at the precise position of the rear panel 10.

At this time, the end of the box unit 30 is disposed to be spaced at a predetermined interval from the receiving portion 15. While pressing the box unit 30 and the cover unit 32 toward the receiving portion 15, the operator inserts the coupling members 16a into the upper and lower parts of the box unit 30 such that the box unit 30 is coupled to the rear panel 10.

After the installation of the wall-mounted drum washing machine is completed, the box unit 30, the cover unit 32, and the rear panel 10 are fastened by an elastic force generated between the box unit 30 and the cover unit 32. Therefore, the coupling force among the respective parts may be improved.

When a user wants to perform a washing operation, the user opens the door 60, puts laundry into the drum 23, separates the detergent box 90 and the conditioner box 100, puts detergent and fabric conditioner into the first and second housings 91 and 101, and inserts the first and second housings 91 and 101 into the first and second insertion hole portions 54 and 55, respectively.

At this time, the first insertion hole portion 54 has the blocking portion 56 extended downward from the first blocking panel 54a. Thus, when the conditioner box 100 is inserted into the first insertion hole portion 54, the siphon portion 103 and the blocking portion 56 interfere with each other. Therefore, it is possible to prevent a user's mistake of switching and inserting the detergent box 90 and the conditioner box 100.

After the detergent box 90 and the conditioner box 100 are inserted into the first and second insertion hole portions 54 and 55, the user rotates the first and second handles 92 and 102 such that the first and second lock portions 92a and 104 overlap the first and second stoppers 34a and 35a, respectively. Then, the detergent box 90 and the conditioner box 100 are locked.

Then, when the user presses the manipulation unit to start a washing operation, the water supply valves are opened to supply wash water to the tub 20.

At this time, the wash water supplied to the detergent box 90 through the first water supply hole 54b along the water supply pipe 74a is stored in the first housing portion 91.

Then, when the wash water is continuously supplied, the wash water overflows from the top of the first induction panel 91b so as to be supplied into the tub 20.

When the supply of the wash water is completed, the motor 41 is driven according to an operation signal transmitted from the control block 22, and power transmitted along the belt 43 from the rotating shaft 41a of the motor 41 rotates the driving wheel 42 and the drum 23 to perform the washing operation.

In the present embodiment, since the tub 20, the rear panel 10, and the reinforcement portion 14 are integrally formed, it is possible to prevent the tub 20 from being moved by vibrations generated while the drum 23 is rotated. Furthermore, the buffer member 16c interposed between the rear panel 10 and the wall surface W may prevent the vibrations of the drum 23 from being transmitted to the wall surface W.

Thus, it is possible to provide the drum washing machine which may be installed on the wall surface and includes the power line 11a of which the extension direction may be varied.

Figure 29:
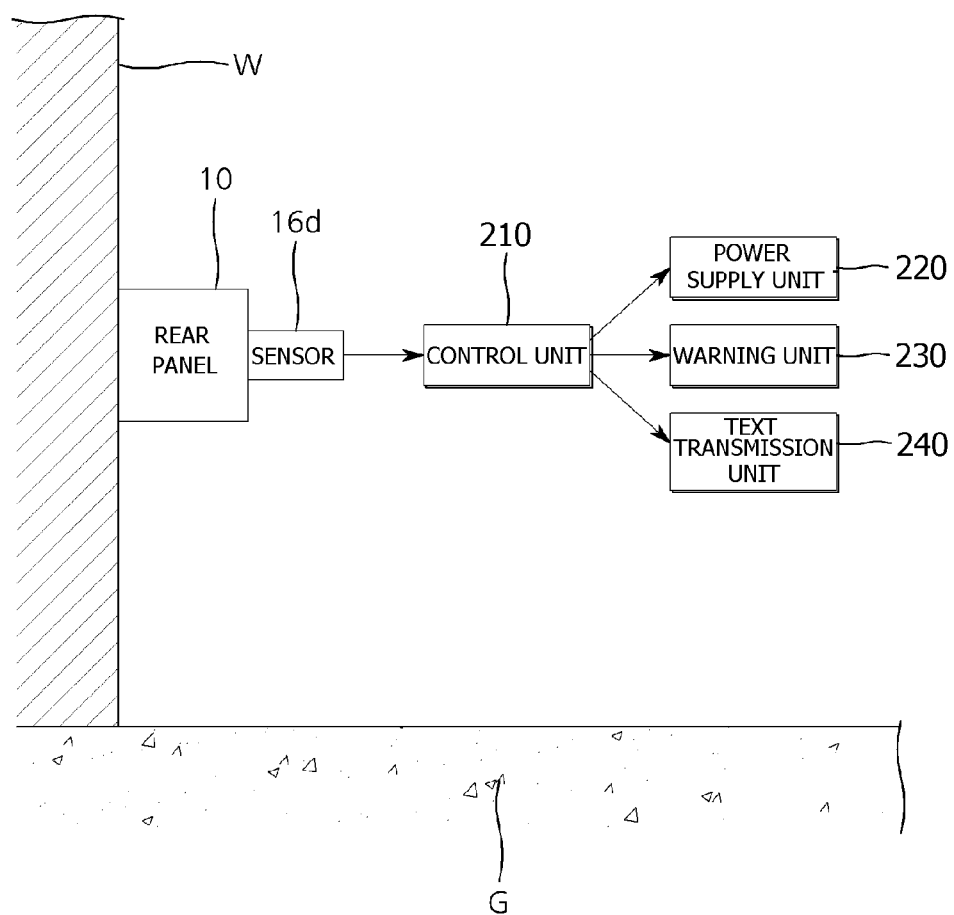
FIG. 29 is a block configuration diagram of a mounting abnormality sensing device of the wall-mounted drum washing machine in accordance with the embodiment of the present invention.
Figure 30:
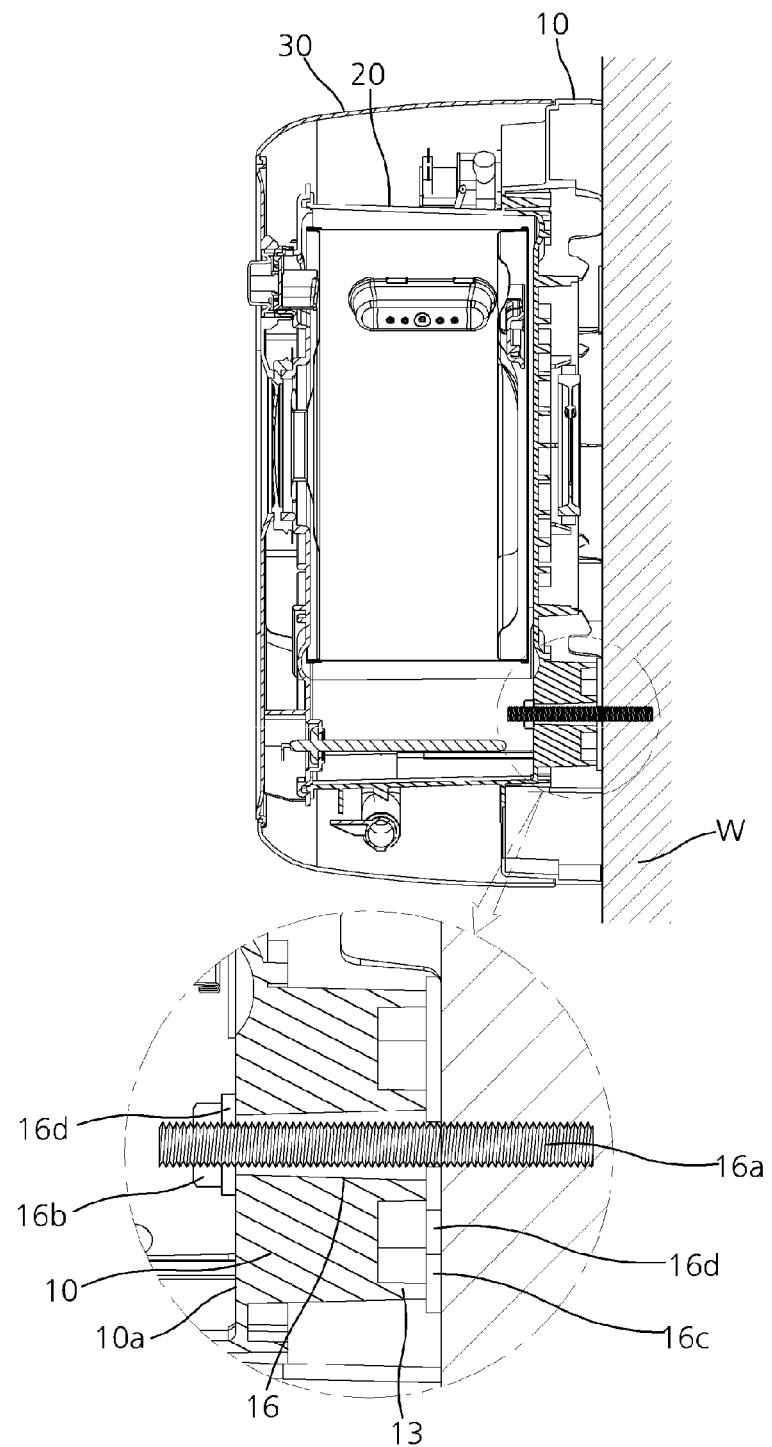
FIG. 30 is a cross-sectional view illustrating a state in which a sensor is installed in the mounting abnormality sensing device of the wall-mounted drum washing machine in accordance with the embodiment of the present invention.

FIG. 29 is a block configuration diagram of a mounting abnormality sensing device of the wall-mounted drum washing machine in accordance with the embodiment of the present invention. FIG. 30 is a cross-sectional view illustrating a state in which a sensor is installed in the mounting abnormality sensing device of the wall-mounted drum washing machine in accordance with the embodiment of the present invention.

Referring to FIGS. 29 and 30, the mounting abnormality sensing device of the wall-mounted drum washing machine, which includes the rear panel 10 having the buffer member 16c interposed between the through-hole 16 and the wall surface W and mounted on the wall surface W through the fastening member 16a inserted through the through-hole 16a, the tub 20 containing wash water and supported by the rear panel 10, and the box unit 30 coupled to the rear panel 10 so as to surround the tub 20, includes a sensor 16d, a control unit 210, a power supply unit 220, a warning unit 230, and a text transmission unit 240.

The sensor 16d serves to sense a contact state between the rear panel 10 and the wall surface W.

At this time, the sensor 16d provided on the rear panel 10 may sense an abnormality which may occur in the mounting state of the wall-mounted drum washing machine fixed to the wall surface W at a distance from a ground G, due to vibrations generated during a washing operation such as a spin-drying process.

Thus, when the nut member 16b coupled to the fastening member 16a for fixing the rear panel 10 to the wall surface W is loosened and moved, the sensor 16d my sense a contact state between the rear panel 10 and the wall surface W or a contact state between the wall surface W and the buffer member 16c positioned between the wall surface W and the rear panel 10 of the wall-mounted drum washing machine.

The control unit 210 determines that the wall-mounted drum washing machine is abnormally mounted, when the sensed contact state corresponds to a contact release state.

The power supply unit 220 controls power supply according to the determination result of the control unit 210.

At this time, the power supply unit 220 may forcibly turn off the power of the wall-mounted drum washing machine or temporarily stop the washing operation.

Furthermore, when it is determined that the contact between the rear panel 10 and the wall surface W is released, the warning unit 230 outputs a warning sound to the outside of the wall-mounted drum washing machine in response to a request for an output of warning sound from the control unit 210, and the text transmission unit 240 transmits a text to a contact number which is previously stored therein, in response to a request for text transmission from the control unit 240, and informs a user or operator of the mounting abnormality of the wall-mounted drum washing machine.

A method for sensing a mounting abnormality of the wall-mounted drum washing machine in accordance with the embodiment of the present invention will be described as follows.

Figure 31:
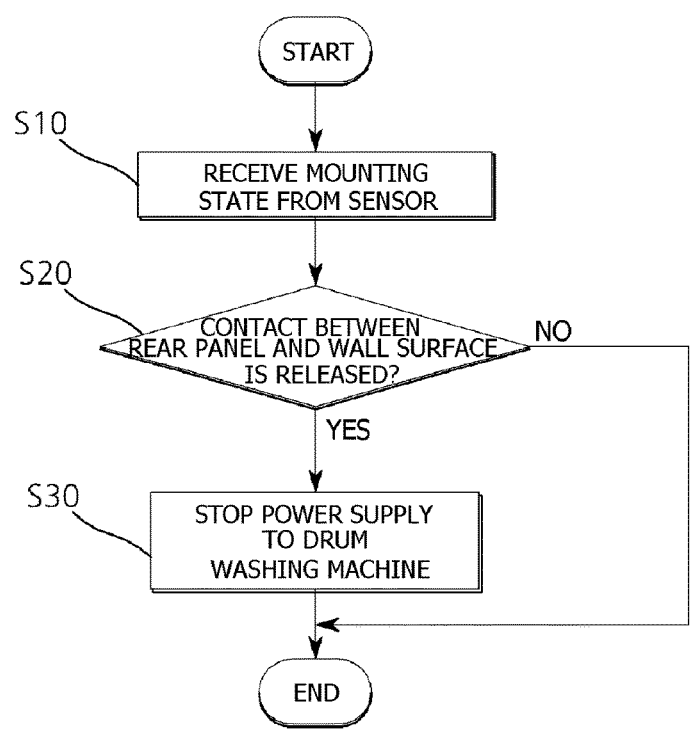
FIG. 31 is a flowchart for explaining a method for sensing a mounting abnormality of the wall-mounted drum washing machine in accordance with the embodiment of the present invention.

FIG. 31 is a flowchart for explaining the method for sensing a mounting abnormality of the wall-mounted drum washing machine in accordance with the embodiment of the present invention.

Referring to FIG. 31, the method for sensing a mounting abnormality of the wall-mounted drum washing machine, which includes the rear panel 10 having the buffer member 16c interposed between the through-hole 16 and the wall surface W and mounted on the wall surface W through the fastening member 16a inserted through the through-hole 16a, the tub 20 containing wash water and supported by the rear panel 10, and the box unit 30 coupled to the rear panel 10 so as to surround the tub 20, is performed as follows.

First, the control unit 210 receives a contact state between the rear panel 10 and the wall surface W from the sensor 16d provided on the rear panel 10 of the wall-mounted drum washing machine mounted on the wall surface W.

At this time, when an abnormality occurs in a mounting state of the drum washing machine fixed to the wall surface W due to vibrations generated during a washing operation such as a spin-drying process, the sensor 16d provided on the rear panel 10 senses the abnormality.

For example, the sensor 16d may sense that the contact between the rear panel 10 and the wall surface W is released, when the nut member 16b coupled to the fastening member 16a for fixing the rear panel 10 to the wall surface W is loosened and moved, or may sense that the contact between the wall surface W and the buffer member 16c positioned between the wall surface W and the rear panel 10 of the wall-mounted drum washing machine is released.

The control unit 210 determines whether or not the contact between the rear panel 10 and the wall surface W is released, based on the input contact state, at step S20.

Then, when determining that the contact between the rear panel 10 and the wall surface W is released, the control unit 210 determines that the wall-mounted drum washing machine is abnormally mounted, and stops power supply to the wall-mounted drum washing machine, at step S30.

At this time, the power supply unit 220 may forcibly turn off the power of the wall-mounted drum washing machine or temporarily stop the washing operation.

Furthermore, when it is determined that the contact between the rear panel 10 and the wall surface W is released, the warning unit 230 outputs a warning sound to the outside of the wall-mounted drum washing machine, and the text transmission unit 240 transmits a text to a contact number which is previously stored therein and informs a user or operator of the mounting abnormality of the wall-mounted drum washing machine.

In the method for sensing a mounting abnormality of the wall-mounted drum washing machine in accordance with the embodiment of the present invention, when the wall-mounted drum washing machine is not normally mounted on the wall surface or an abnormality occurs in the mounting state of the wall-mounted drum washing machine due to vibrations generated during a washing operation, the abnormality may be sensed, the power may be turned off to prevent an accident, and the abnormality may be immediately reported to a user or installation engineer. Thus, it is possible to not only prevent a fall and accident, but also immediately respond to the abnormality, thereby improving the reliability of the product.

Figure 32:
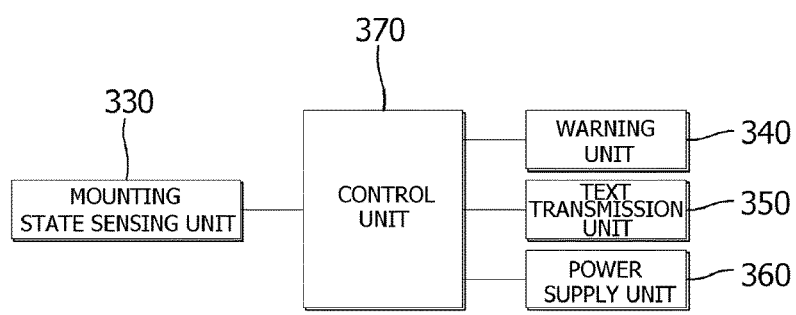
FIG. 32 is a block configuration diagram illustrating a wall-mounted drum washing machine in accordance with another embodiment of the present invention.
Figure 33:
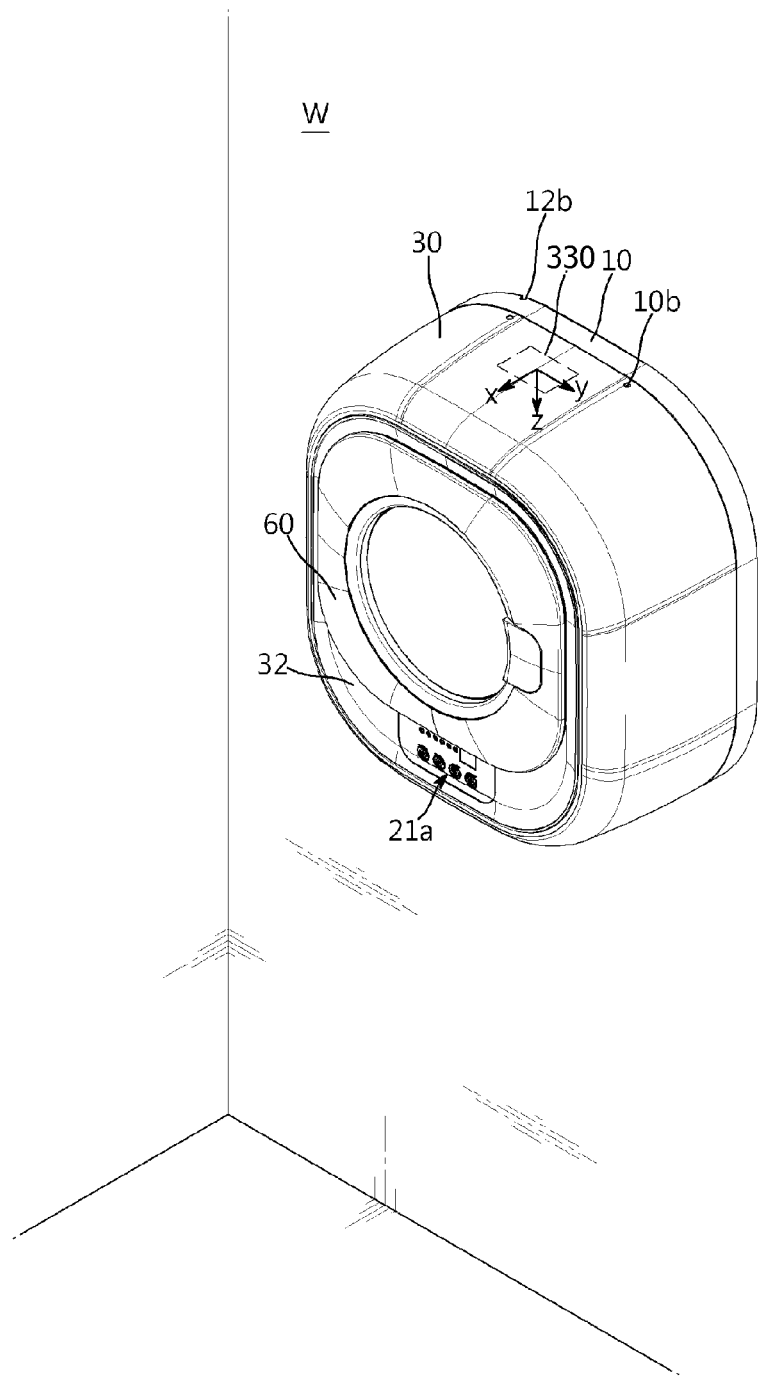
FIG. 33 is a perspective view illustrating a state in which the wall-mounted drum washing machine in accordance with the embodiment of the present invention is installed.

FIG. 32 is a block configuration diagram illustrating a wall-mounted drum washing machine in accordance with another embodiment of the present invention. FIG. 33 is a perspective view illustrating a state in which the wall-mounted drum washing machine in accordance with the embodiment of the present invention is installed.

Referring to FIG. 32, the mounting abnormality sensing device of the wall-mounted drum washing machine in accordance with the embodiment of the present invention includes a mounting state sensing unit 330, a warning unit 340, a text transmission unit 350, a power supply unit 360, and a control unit 370.

The mounting state sensing unit 330 is configured to sense a mounting state of the wall-mounted drum washing machine mounted on the wall surface W.

The mounting state sensing unit 330 may be installed at various positions where changes in mounting angle of the wall-mounted drum washing machine can be sensed. For example, the mounting state sensing unit 330 may be installed at the top or bottom surface of the box unit 30 as illustrated in FIG. 33.

The mounting state sensing unit 330 may be implemented with a three-axis acceleration sensor to measure acceleration in the x, y, and z-axis directions.

However, the mounting state sensing unit 330 may be implemented with a three-axis gyro sensor to measure angular velocity in the x, y, and z-axis directions, a tilt sensor to measure a tilt in the x, y, and z-axis directions, or a gravity sensor to measure an angle and angular velocity according to the gravity. Depending on cases, the mounting state sensing unit 330 may be implemented with a combination of a three-axis acceleration sensor and a two-axis gyro sensor.

The warning unit 340 is configured to warn a user or operator of a mounting abnormality of the wall-mounted drum washing machine.

The warning unit 340 may warn a user of a mounting abnormality by outputting a warning sound or voice message through a speaker (not illustrated) provided therein, or may warn a user of a mounting abnormality through a lamp or display panel (not illustrated) provided thereon.

The text transmission unit 350 is configured to transmit a message indicating a mounting abnormality of the wall-mounted drum washing machine to a user's terminal (not illustrated).

At this time, the text transmission unit 350 may transmit a message through a communication module (not illustrated) provided therein, using a short message service (SMS) or multi-media message service (MMS), or may access the wired or wireless Internet to provide the corresponding message to a user's terminal through a social network service (SNS) server (not illustrated).

The power supply unit 360 is configured to supply power for driving the wall-mounted drum washing machine.

The control unit 370 calculates a mounting angle of the wall-mounted drum washing machine based on the mounting state inputted from the mounting state sensing unit 330, and compares the calculated mounting angle to an initial mounting angle to determine whether or not the wall-mounted drum washing machine is normally mounted.

At this time, the control unit 370 checks whether or not the mounting angle belongs to a normal range based on the initial mounting angle. When the mounting angle deviates from the normal range, the control unit 370 may determine that the wall-mounted drum washing machine is abnormally mounted.

The initial mounting angle indicates a mounting angle at the time at which the wall-mounted drum washing machine was initially installed on the wall surface W, and is stored in a memory (not illustrated).

Furthermore, the normal range indicates an angle range into which a minute change in mounting angle, caused by normal vibration of the washing machine or a user's typical contact based on the initial mounting angle, is reflected. The normal range may be variously selected according to an applied product and a designer's intention.

When the mounting angle deviates from the normal range, the control unit 370 may control the warning unit 340 to warn the user of a mounting abnormality of the wall-mounted drum washing machine, and may control the text transmission unit 350 to transmit a message indicating the mounting abnormality to the user's terminal.

Since the mounting abnormality sensing device may sense a mounting abnormality based on the mounting angle of the wall-mounted drum washing machine and warn a user of the mounting abnormality, it is possible to prevent the wall-mounted drum washing machine from falling due to the mounting abnormality.

Furthermore, when the mounting angle deviates from the normal range, the control unit 370 may control the power supply unit 360 to cut off power supplied to the wall-mounted drum washing machine.

Thus, since the power supplied to the wall-mounted drum washing machine is automatically cut off even though the wall-mounted drum washing machine falls due to a mounting abnormality, it is possible to prevent a safety accident such as electric shock.

Figure 34:
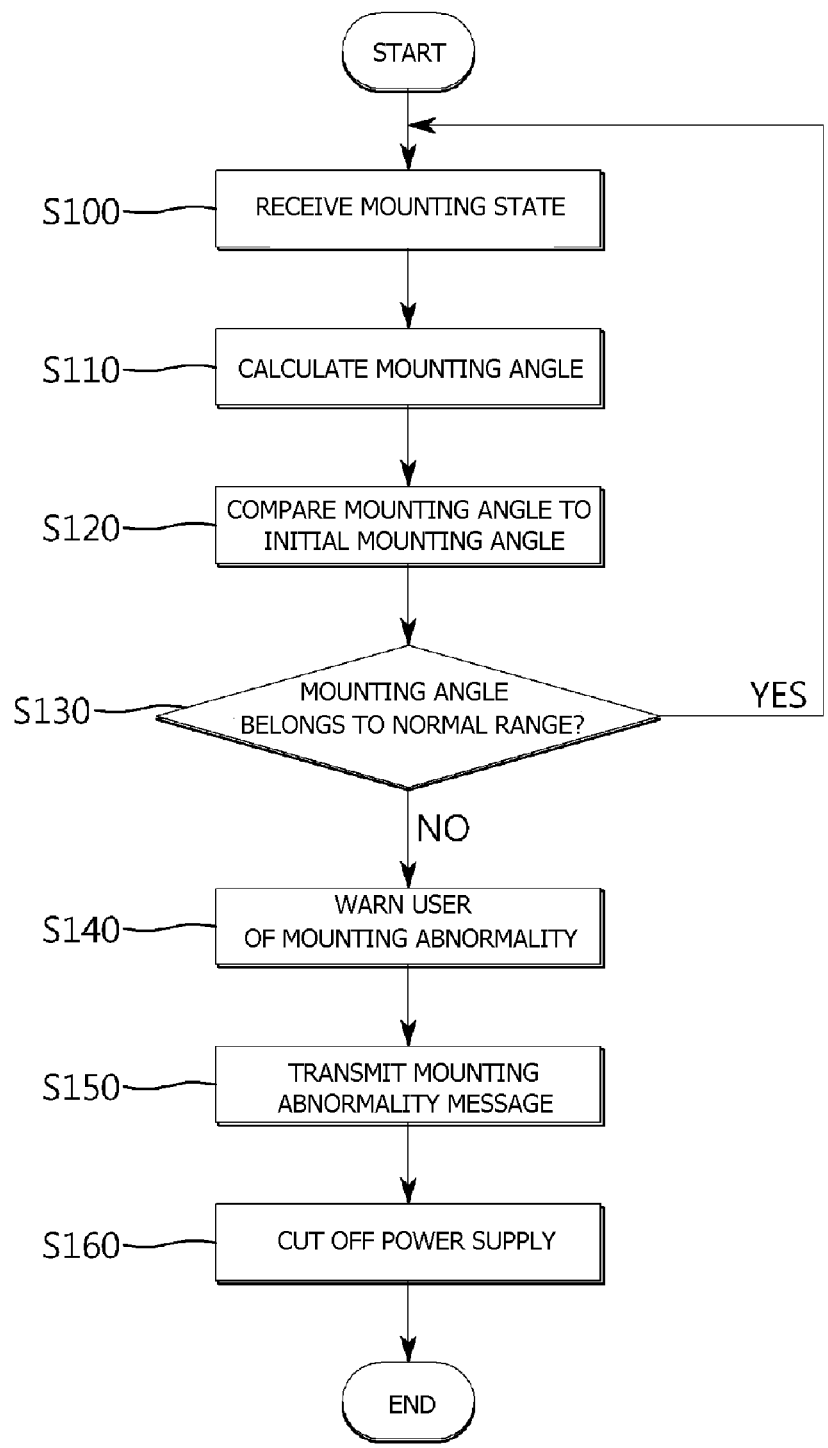
FIG. 34 is a flowchart illustrating a method for sensing a mounting abnormality of the wall-mounted drum washing machine in accordance with the embodiment of the present invention.
Figure 35:
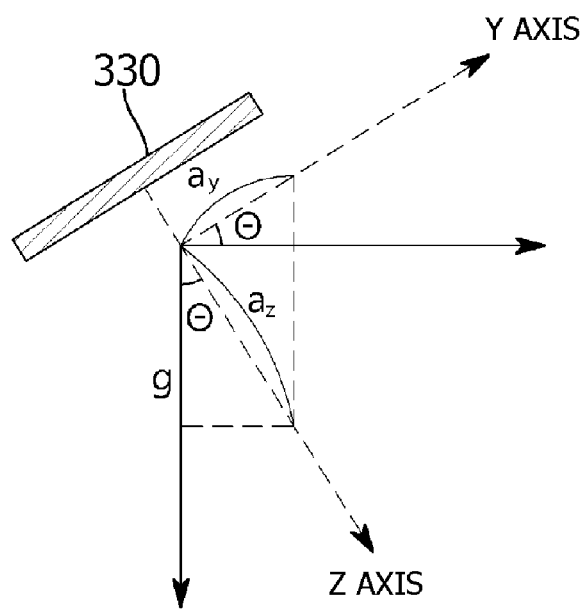
FIG. 35 is a diagram illustrating a process of calculating a mounting angle using measurement values of a three-axis acceleration sensor in the method for sensing a mounting abnormality of the wall-mounted drum washing machine in accordance with the embodiment of the present invention.

FIG. 34 is a flowchart illustrating a method for sensing a mounting abnormality of the wall-mounted drum washing machine in accordance with the embodiment of the present invention. FIG. 35 is a diagram illustrating a process of calculating a mounting angle using measurement values of a three-axis acceleration sensor in the method for sensing a mounting abnormality of the wall-mounted drum washing machine in accordance with the embodiment of the present invention.

Hereafter, the method for sensing a mounting abnormality of the wall-mounted drum washing machine in accordance with the embodiment of the present invention will be described in more detail with reference to FIGS. 34 and 35.

First, the control unit 370 receives a mounting state of the wall-mounted drum washing machine from the mounting state sensing unit 330 at step S100.

At this time, when the mounting state sensing unit 330 is implemented with a three-axis acceleration sensor, the control unit 370 receives x, y, and z-axis accelerations from the mounting state sensing unit 330.

The control unit 370 calculates the mounting angle of the wall-mounted drum washing machine based on the mounting state of the wall-mounted drum washing machine, inputted from the mounting state sensing unit 330, at step S110.

For example, as illustrated in FIG. 35, the control unit 370 may calculate the mounting angle of the wall-mounted drum washing machine, based on the y and z-axis accelerations, as expressed by Equation 1.

$$\theta = \tan^{-1}\left(\frac{a_y}{a_z}\right) \quad \text{[Equation 1]}$$

Here, $\theta$ represents the mounting angle, and $a_y$ and $a_z$ represent the y and z-axis accelerations.

Then, the control unit 370 compares the mounting angle of the wall-mounted drum washing machine to the initial mounting angle at step S120, and checks whether or not the mounting angle belongs to the normal range at step S130.

When it is determined that the mounting angle belongs to the normal range based on the initial mounting angle, the control unit 370 returns to the step S100 of receiving the mounting state, and repetitively monitors a change in mounting angle.

On the other hand, when it is determined that the mounting angle deviates from the normal range, the control unit 370 controls the warning unit 340 to warning a user of a mounting abnormality at step S140, and controls the text transmission unit 350 to transmit a message indicating the mounting abnormality to the user's terminal at step S150.

That is, when the mounting angle deviates from the normal range, it may be considered that the wall-mounted drum washing machine is tilted in a specific direction. Thus, the control unit 370 informs the user of the mounting abnormality.

Furthermore, when determining that the mounting angle deviates from the normal range, the control unit 370 controls the power supply unit 360 to cut off the power supplied to the wall-mounted drum washing machine at step S160.

In accordance with the embodiment of the present invention, the mounting abnormality sensing device and method of the wall-mounted drum washing machine may sense a mounting abnormality based on the mounting angle of the wall-mounted drum washing machine, and may warn a user of the mounting abnormality. Thus, it is possible to prevent the wall-mounted drum washing machine from falling due to the mounting abnormality.

Furthermore, since the power supplied to the wall-mounted drum washing machine is automatically cut off even though the wall-mounted drum washing machine falls due to a mounting abnormality, it is possible to prevent a safety accident such as an electric shock.

Figure 36:
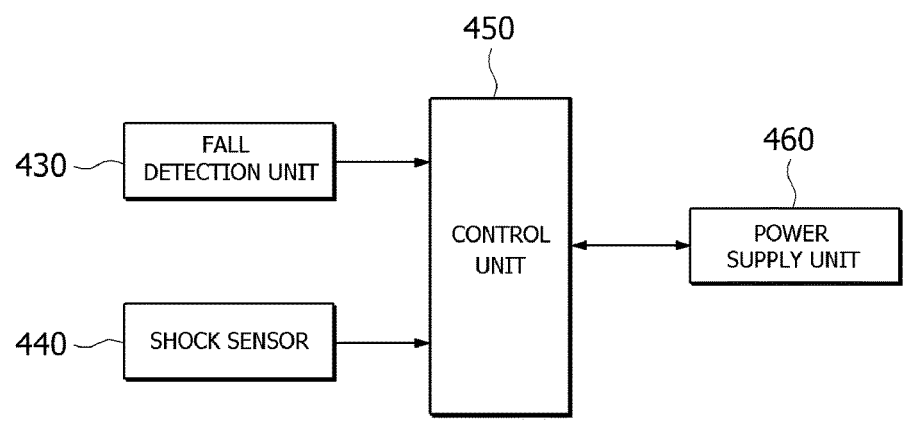
FIG. 36 is a block configuration diagram illustrating a fall sensing device of a wall-mounted drum washing machine in accordance with another embodiment of the present invention.
Figure 37:
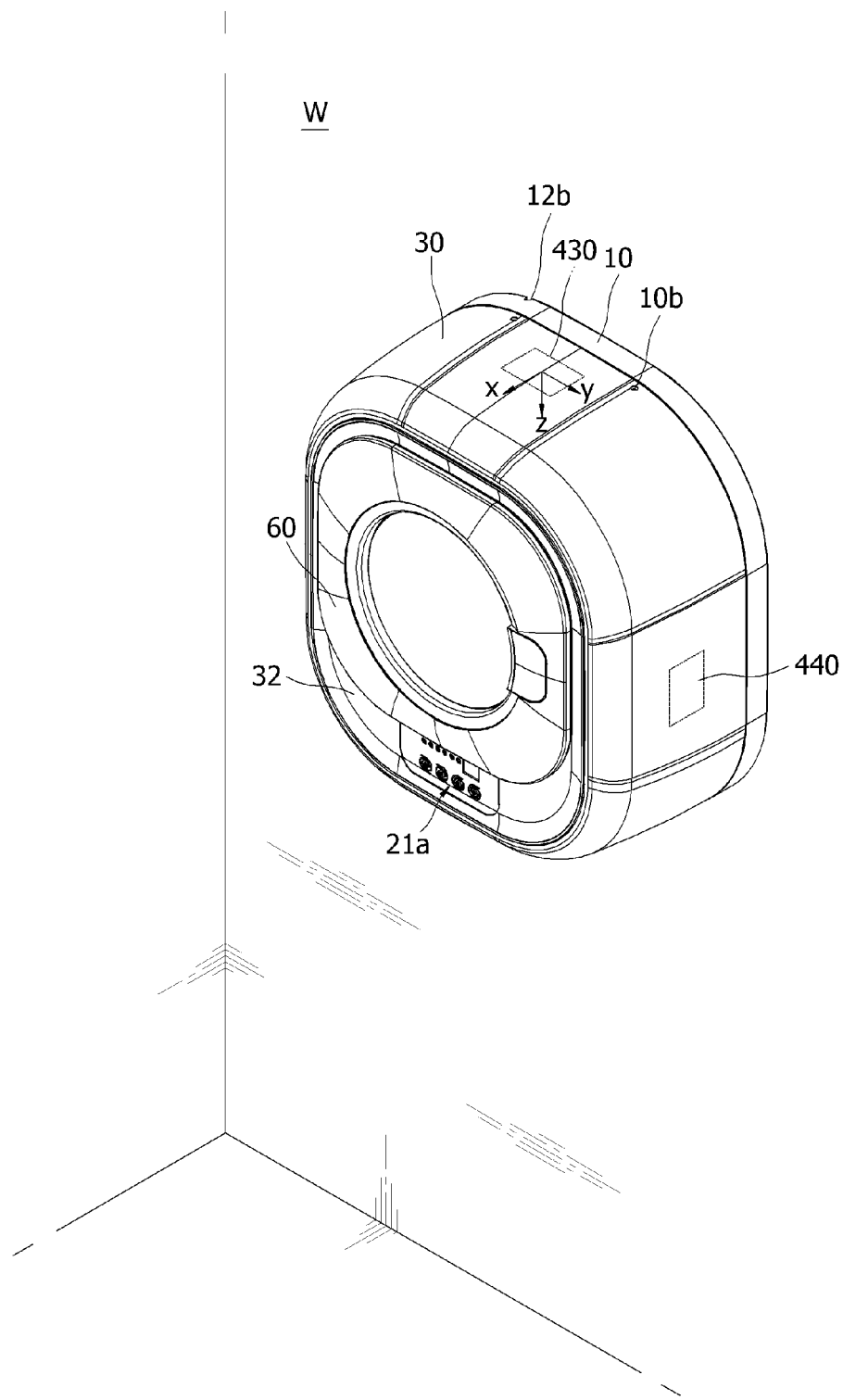
FIG. 37 is a diagram illustrating a state in which a fall sensing unit and a shock sensor are installed in the fall sensing device of the wall-mounted drum washing machine in accordance with the embodiment of the present invention.

FIG. 36 is a block configuration diagram illustrating a fall sensing device of a wall-mounted drum washing machine in accordance with another embodiment of the present invention. FIG. 37 is a diagram illustrating a state in which a fall sensing unit and a shock sensor are installed in the fall sensing device of the wall-mounted drum washing machine in accordance with the embodiment of the present invention.

Referring to FIGS. 36 and 37, the fall sensing device of the wall-mounted drum washing machine in accordance with the embodiment of the present invention includes a fall sensing unit 430, a shock sensor 440, a control unit 450, and a power supply unit 460.

The fall sensing unit 430 is configured to sense a displacement of the wall-mounted drum washing machine mounted on the wall surface W and transmit the sensed displacement to the control unit 450.

The fall sensing unit 430 may be installed at the top or bottom surface of the box unit 30, in order to sense a displacement of the wall-mounted drum washing machine.

At this time, the fall sensing unit 430 may be implemented with a three-axis acceleration sensor to measure acceleration in the x, y, and z-axis directions.

The fall sensing device may calculate a displacement in the z-axis direction using the three-axis acceleration sensor and determine a falling state. When the wall-mounted drum washing machine falls in a state where it is tilted, acceleration may be measured in the x, y, and z-axis directions. Then, the acceleration may be converted into a z-axis displacement so as to determine the falling state.

The shock sensor 440 is configured to sense an impulse applied to the wall-mounted drum washing machine.

That is, the shock sensor 440 senses an impulse applied to the wall-mounted drum washing machine when the wall-mounted drum washing machine falls on a floor, in order to determine the falling state.

The control unit 450 determines whether or not the wall-mounted drum washing machine fell, based on the z-axis displacement sensed by the fall sensing unit 430 and the impulse sensed by the shock sensor 440.

That is, the control unit 450 calculates a z-axis displacement through the displacement inputted from the fall sensing unit 430, compares the calculated displacement to a reference displacement, and compares the impulse inputted from the shock sensor 440 to a reference impulse to determine whether or not the wall-mounted drum washing machine fell on the floor from the wall surface.

The power supply unit 460 supplies power for driving the wall-mounted drum washing machine.

Thus, when determining that the wall-mounted drum washing machine fell on the floor, the control unit 450 controls the power supply unit 460 to cut off the power supplied to the wall-mounted drum washing machine, which makes it possible to prevent a safety accident such as electric shock.

Figure 38:
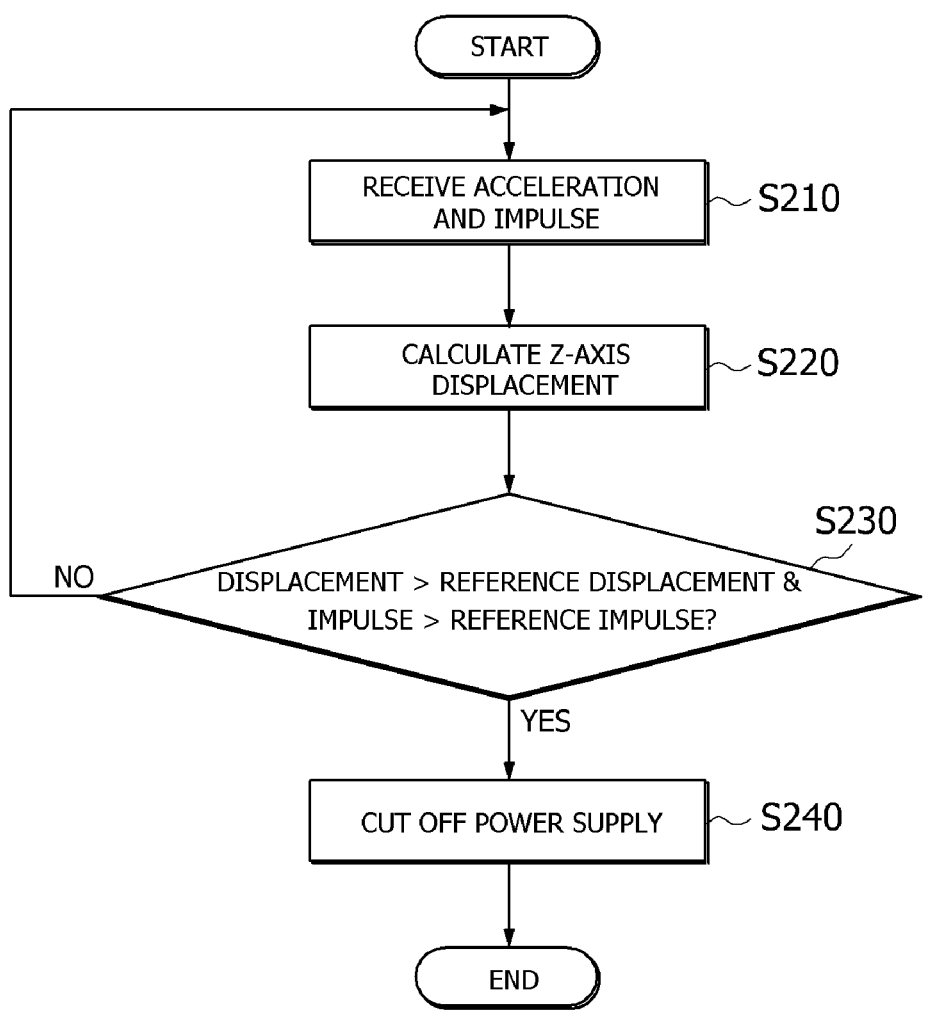
FIG. 38 is a flowchart for explaining a method for sensing a fall of a wall-mounted drum washing machine in accordance with another embodiment of the present invention.

FIG. 38 is a flowchart for explaining a method for sensing a fall of the wall-mounted drum washing machine in accordance with the embodiment of the present invention.

Referring to FIG. 38, the method for sensing a fall of the wall-mounted drum washing machine in accordance with the embodiment of the present invention is performed as follows. First, the control unit 450 receives a displacement and impulse of the wall-mounted drum washing machine from the fall sensing unit 430 and the shock sensor 440 at step S210.

The control unit 450 receives a displacement of the wall-mounted drum washing machine, in order to determine whether or not the z-axis position of the wall-mounted drum washing machine is rapidly changed as the wall-mounted drum washing machine falls, through the three-axis acceleration sensor installed at the top or bottom surface of the box unit 30.

Furthermore, the control unit 450 receives an impulse applied to the wall-mounted drum washing machine, in order to determine whether or not the wall-mounted drum washing machine fell on the floor.

Then, the control unit 450 calculates a z-axis displacement through the displacement at step S220.

That is, since the greatest change occurs in the z-axis direction when the wall-mounted drum washing machine falls, the control unit 450 calculates the z-axis displacement. When acceleration is measured in all of the x, y, and z-axis directions as the wall-mounted drum washing machine falls in a state where it is tilted, the acceleration may be converted into a z-axis displacement.

The control unit 450 compares the calculated z-axis displacement to a reference displacement, compares the impulse to a reference impulse, and determines whether or not the wall-mounted drum washing machine fell, at step S230.

At this time, when determining that the z-axis displacement exceeds the reference displacement and the impulse exceeds the reference impulse, the control unit 450 controls the power supply unit 460 to cut off power supply at step S240.

In accordance with the embodiment of the present invention, the fall sensing device and method of the wall-mounted drum washing machine may sense an acceleration change and impulse when the wall-mounted drum washing machine falls while being used, and may cut off power supply, thereby preventing a safety accident such as an electric shock. Furthermore, although the wall-mounted drum washing machine falls in a state where it is tilted, the acceleration change and the impulse may be simultaneously compared to precisely determine the falling state.

Figure 39:
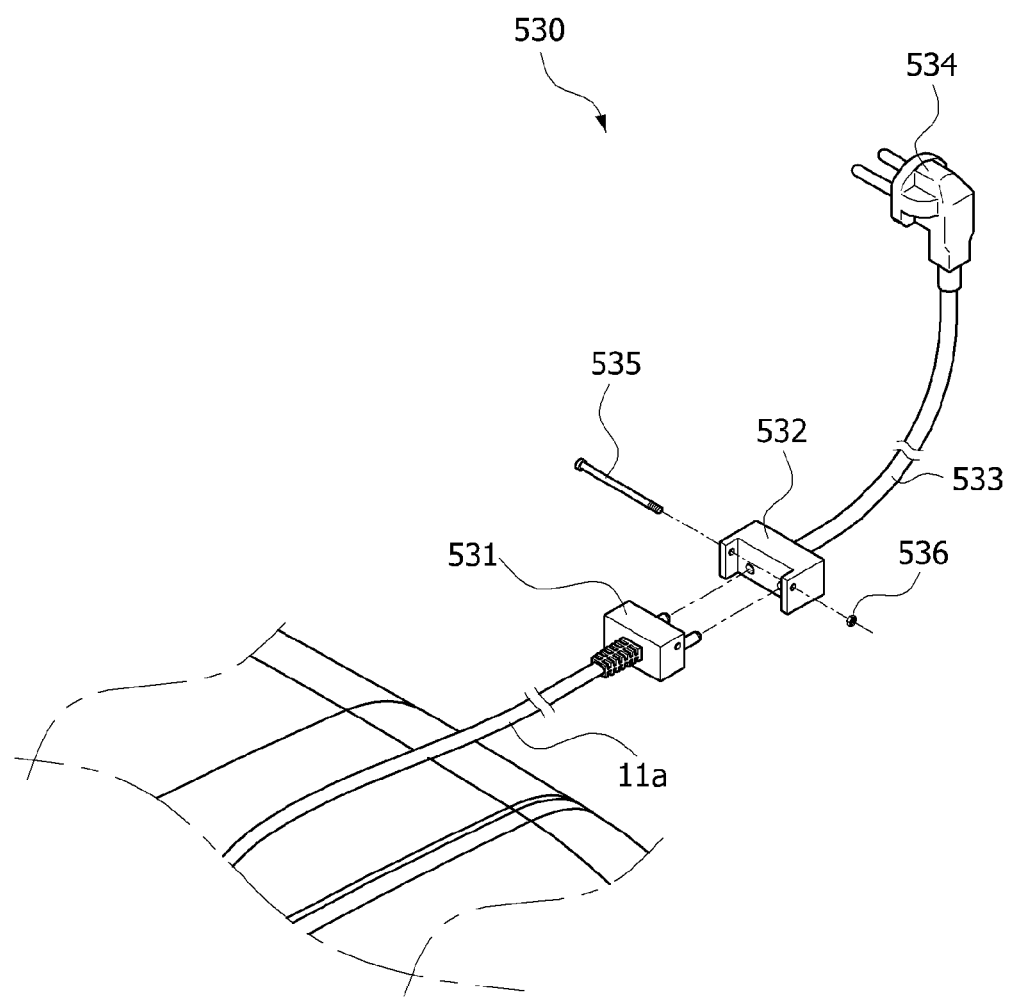
FIG. 39 is a diagram illustrating a state in which a power cutoff unit is disassembled in the wall-mounted drum washing machine in accordance with the embodiment of the present invention.
Figure 40:
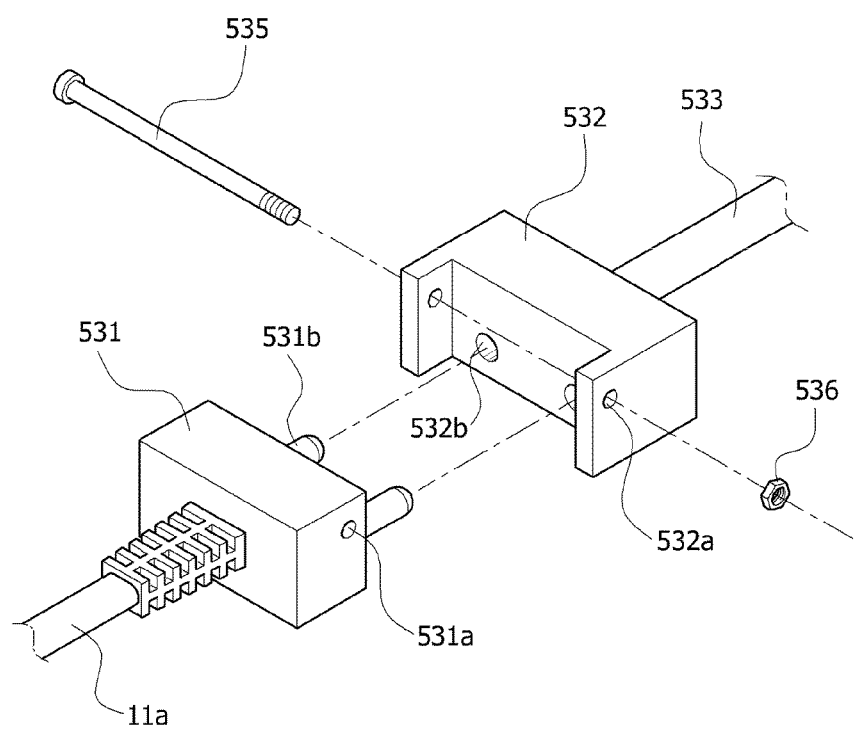
FIG. 40 is an expanded view of a part of FIG. 39.
Figure 41:
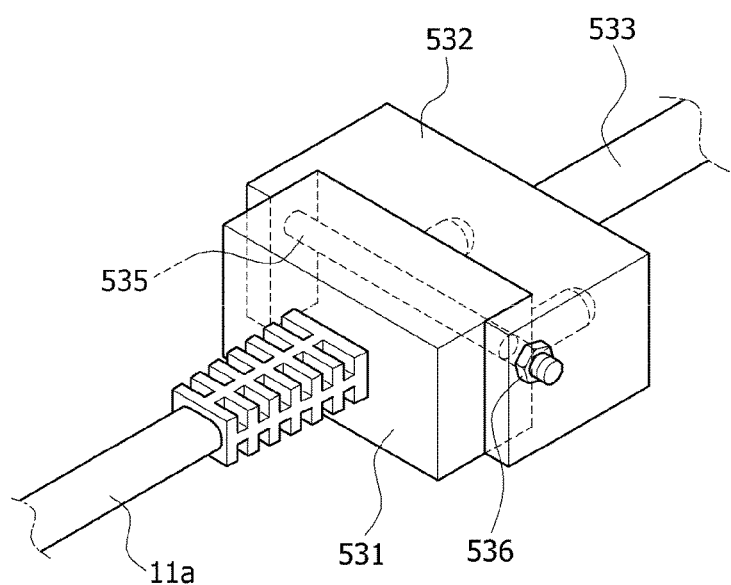
FIG. 41 is a perspective view illustrating a state in which a connection plug portion of the power cutoff unit is inserted into a connection socket portion in the wall-mounted drum washing machine in accordance with the embodiment of the present invention.
Figure 42:
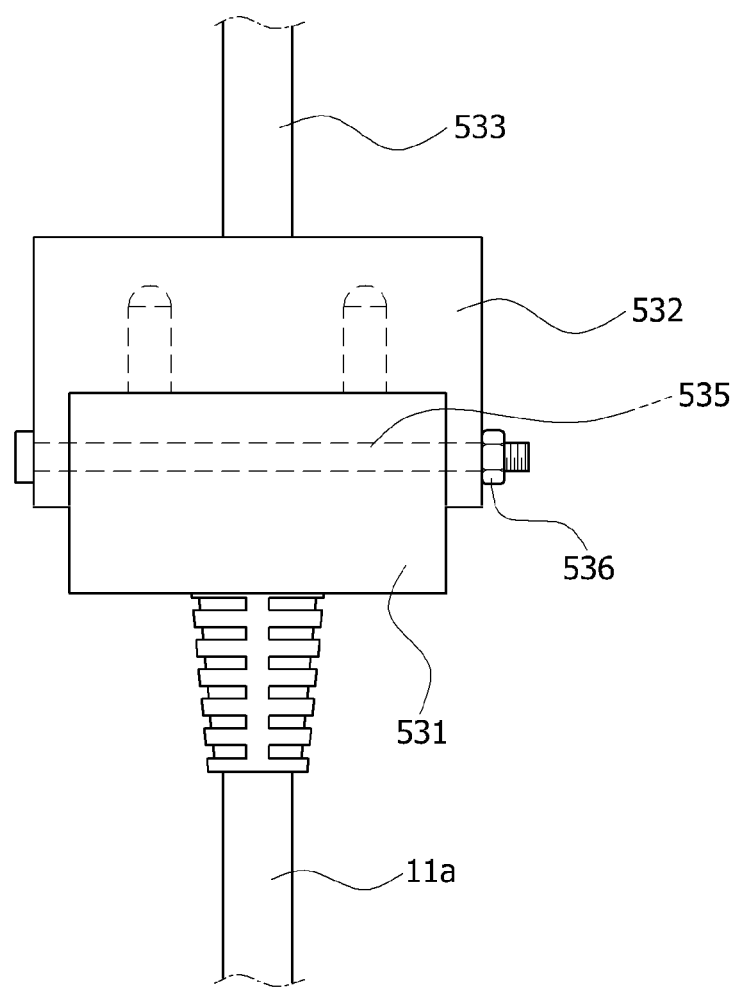
FIG. 42 is a side view illustrating a state in which the connection plug portion of the power cutoff unit is inserted into the connection socket portion in the wall-mounted drum washing machine in accordance with the embodiment of the present invention.
Figure 43:
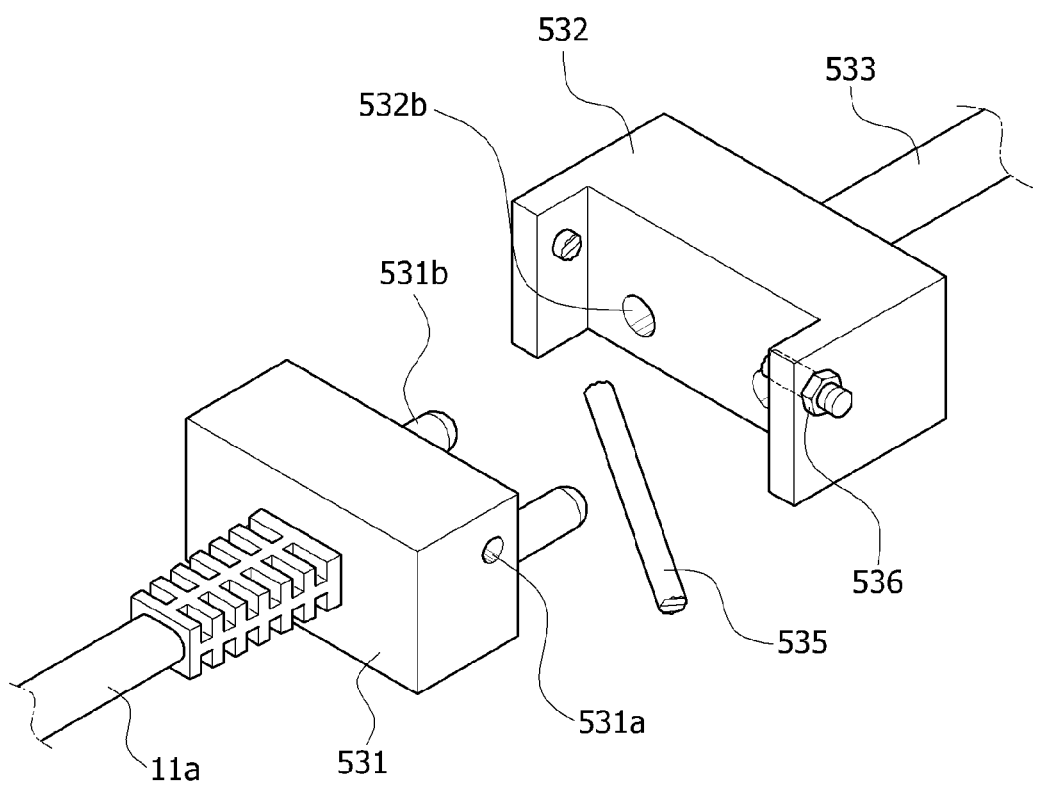
FIG. 43 is a perspective view illustrating a state in which the connection plug portion of the power cutoff unit is separated from the connection socket portion in the wall-mounted drum washing machine in accordance with the embodiment of the present invention.
Figure 44:
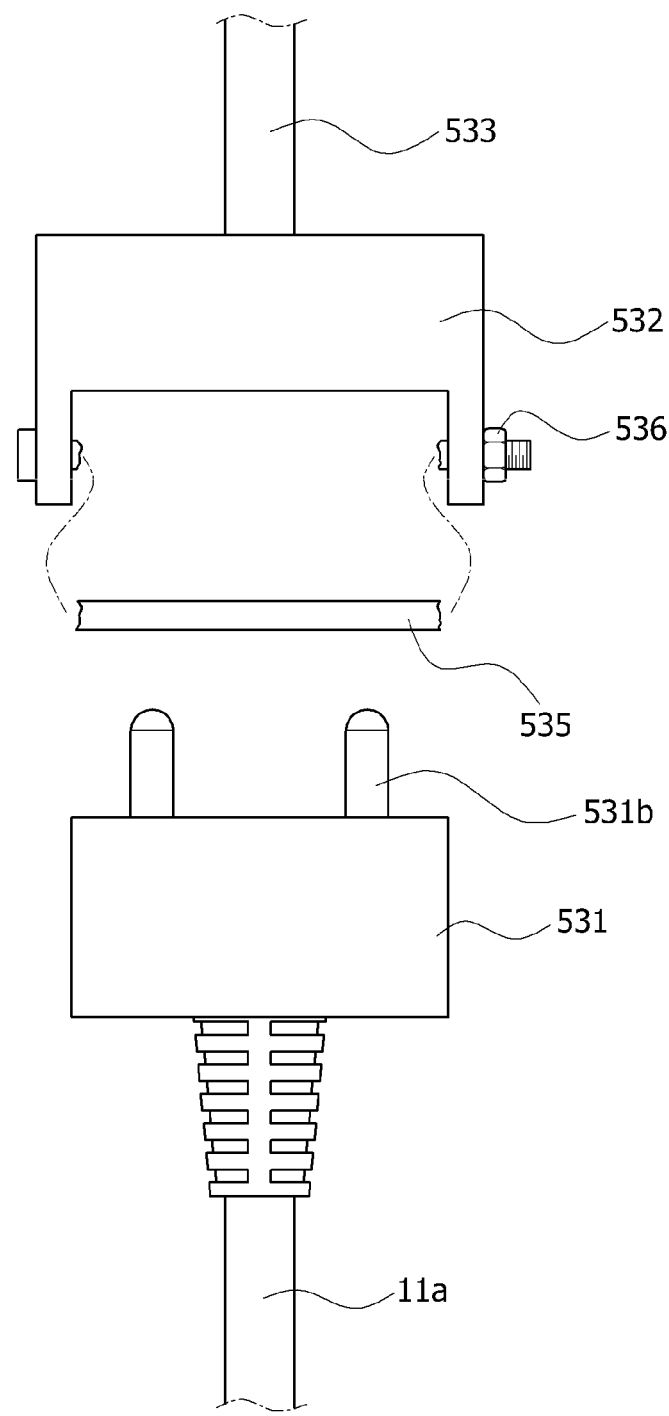
FIG. 44 is a side view illustrating a state in which the connection plug portion of the power cutoff unit is separated from the connection socket portion in the wall-mounted drum washing machine in accordance with the embodiment of the present invention.

FIG. 39 is a diagram illustrating a state in which a power cutoff unit is disassembled in a wall-mounted drum washing machine in accordance with another embodiment of the present invention. FIG. 40 is an expanded view of a part of FIG. 39. FIG. 41 is a perspective view illustrating a state in which a connection plug portion of the power cutoff unit is inserted into a connection socket portion in the wall-mounted drum washing machine in accordance with the embodiment of the present invention. FIG. 42 is a side view illustrating a state in which the connection plug portion of the power cutoff unit is inserted into the connection socket portion in the wall-mounted drum washing machine in accordance with the embodiment of the present invention. FIG. 43 is a perspective view illustrating a state in which the connection plug portion of the power cutoff unit is separated from the connection socket portion in the wall-mounted drum washing machine in accordance with the embodiment of the present invention. FIG. 44 is a side view illustrating a state in which the connection plug portion of the power cutoff unit is separated from the connection socket portion in the wall-mounted drum washing machine in accordance with the embodiment of the present invention.

Referring to FIGS. 39 to 44, the power cutoff unit 530 of the wall-mounted drum washing machine is connected to the power line 11a extended from the control block 22 mounted in the box unit 30, and cuts off power supply to the control block 22 when the tub 20 falls.

The fall of the tub 20 may mean that the wall-mounted drum washing machine falls. Specifically, the fall of the tub 20 may indicate that the wall-mounted drum washing machine installed on the wall surface W falls on the floor due to an installation defect or the like.

The power cutoff unit 530 cuts off power supply to the control block 22 when the wall-mounted drum washing machine falls, or particularly, when the wall-mounted drum washing machine falls while being used. Thus, even when the wall-mounted drum washing machine falls on the floor, for example, a floor of a bathroom, it is possible to prevent a safety accident such as electric shock.

The cutoff of power supply by the power cutoff unit 530 in accordance with the embodiment of the present invention is performed by physically separating components forming the power cutoff unit 530.

The power cutoff unit 530 includes a connection plug portion 531, a connection socket portion 532, a connection power line 533, a power plug portion 534, a safety pin 535, and a safety nut 536.

The connection plug portion 531 is connected to an end of the power line 11a. The connection plug portion 531 is inserted into the connection socket portion 532 and electrically connected to the connection socket portion 532.

The connection plug portion 531 in accordance with the embodiment of the present invention has the same shape as a typical plug. Thus, the connection plug portion 531 has a protrusion 531b formed on one surface thereof, and the protrusion 531b is inserted into the connection socket portion 532 so as to be electrically connected to the connection socket portion 532.

The connection plug portion 531 not only may be inserted into the connection socket portion 532, but also may be separated from the connection socket portion 532. Thus, when the connection plug portion 531 is inserted into the connection socket portion 532, the connection plug portion 531 and the connection socket portion 532 are electrically connected to each other. On the other hand, when the connection plug portion 531 is separated from the connection socket portion 532, the connection plug portion 531 and the connection socket portion 532 are electrically disconnected from each other.

The power plug portion 534 receives power from an external supply source. The external power supply source indicates equipment which includes a typical socket and is capable of supplying power to the power plug portion 534.

The power plug portion 534 is electrically connected as the power plug portion 534 is connected through the connection socket portion 532 and the connection power line 533.

The safety pin 535 is installed to pass through the connection plug portion 531 and the connection socket portion 532 when the connection plug portion 531 is inserted into the connection socket portion 532. Thus, the connection plug portion 531 is not separated from the connection socket portion 532 as long as a predetermined magnitude or more of force is not applied.

The connection plug portion 531 has a connection plug hole 531a formed therein, through which the safety pin 535 passes. Furthermore, the connection socket portion 532 has a connection socket hole 532a formed therein, through which the safety pin 535 passes.

When the connection plug portion 531 is inserted into the connection socket portion 532, the connection plug hole 531a and the connection socket hole 532a are positioned on the same line, thereby making it easy to install the safety pin 535 through the holes.

The safety nut 536 is fastened to an end of the safety pin 535, or specifically, an end of the safety pin 535 passing through the connection plug portion 531 and the connection socket portion 532. As the safety nut 536 is fastened to the end of the safety pin 535, the safety pin 535 is restricted from moving in the side-to-side direction.

Thus, it is possible to not only prevent a loss of the safety pin 535 which may occur when the safety pin 535 unexpectedly moves in the side-to-side direction, but also continuously maintain the installation state of the safety pin 535.

When the wall-mounted drum washing machine falls, the safety pin 535 is broken to separate the connection plug portion 531 from the connection socket portion 532.

That is, the strength of the safety pint 535 is set to such a level as not to bear the load of the wall-mounted drum washing machine. Thus, when the wall-mounted drum washing machine falls, the safety pin 535 is broken to separate the connection plug portion 531 from the connection socket portion 532. Then, the electrical connection between the connection plug portion 531 and the connection socket portion 532 is released.

In other words, as the connection plug portion 531 falls with the wall-mounted drum washing machine, the connection plug portion 531 and the connection socket portion 532 are physically separated from each other and electrically disconnected.

Since the power supply to the control block 22 is cut off before the wall-mounted drum washing machine falls on the floor, it is possible to prevent a safety accident such as electric shock, which may occur when the wall-mounted drum washing machine falls.

In accordance with the embodiments of the present invention, when the wall-mounted drum washing machine is not normally mounted on the wall surface or an abnormality occurs in the mounting state of the wall-mounted drum washing machine due to vibrations generated during a washing operation, the abnormality may be immediately sensed. Thus, as the power supply is cut off when the wall-mounted drum washing machine is abnormally mounted, it is possible to prevent a safety accident such as electric shock, which may occur when the wall-mounted drum washing machine falls.

Furthermore, since the mounting abnormality sensing device may sense a mounting abnormality based on the mounting angle of the wall-mounted drum washing machine and warn a user of the mounting abnormality, it is possible to prevent the wall-mounted drum washing machine from falling due to the mounting abnormality.

Furthermore, since the power supplied to the wall-mounted drum washing machine is automatically cut off even though the wall-mounted drum washing machine falls due to a mounting abnormality, it is possible to prevent a safety accident such as electric shock.

Furthermore, the fall sensing device may sense an acceleration change and impulse when the wall-mounted drum washing machine falls while being used, and may cut off power supply, thereby preventing a safety accident such as electric shock.

Furthermore, although the wall-mounted drum washing machine falls in a state where it is tilted, the acceleration change and the impulse are simultaneously compared, which makes it possible to precisely determine the falling state of the wall-mounted drum washing machine.

Furthermore, when the wall-mounted drum washing machine falls, power supply may be automatically cut off to prevent a safety accident such as electric shock.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A wall-mounted drum washing machine which includes a buffer member interposed between a through-hole and a wall surface, a rear panel mounted on the wall surface through a fastening member inserted through the through-hole, a tub containing wash water and supported by the rear panel, and a box unit coupled to the rear panel and surrounding the tub, comprising:
    a sensor configured to sense a contact state between the rear panel and the wall surface;
    a control unit configured to determine a mounting abnormality of the drum washing machine, based on the sensed contact state;
    a power supply unit configured to control power supply according to the determination result of the control unit; and
    a nut member coupled to the fastening member for fixing the rear panel to the wall surface,
    wherein the sensor is configured to sense the contact state between the rear panel and the wall surface when the nut member is loosened and moved.

2. The wall-mounted drum washing machine of claim 1, wherein the sensor is further configured to sense a contact state between the buffer member and the wall surface.

3. The wall mounted drum washing machine of claim 1, further comprising a warning unit configured to output a warning sound, when it is determined, by the control unit, that the contact between the rear panel and the wall surface is released.

4. The wall mounted drum washing machine of claim 1, further comprising a text transmission unit configured to transmit a text to a previously-stored contact number, when it is determined, by the control unit, that the contact between the rear panel and the wall surface is released.

5. A method for sensing a mounting abnormality of a wall-mounted drum washing machine which includes a buffer member interposed between a through-hole and a wall surface, a rear panel mounted on the wall surface through a fastening member inserted through the through-hole, a tub containing wash water and supported by the rear panel, a box unit coupled to the rear panel and surrounding the tub and a nut member coupled to the fastening member for fixing the rear panel to the wall surface, the method comprising:
    receiving, by a control unit, a contact state between the rear panel and the wall surface from a sensor provided on a rear panel of the wall-mounted drum washing machine, wherein the sensor is configured to sense the contact state when the nut member coupled to the fastening member for fixing the rear panel to the wall surface is loosened and moved;
    determining whether or not a contact between the rear panel and the wall surface is released, based on the received contact state; and
    stopping power supply to the drum washing machine, when it is determined that the contact between the rear panel and the wall surface is released.

6. The method of claim 5, wherein the sensor further senses a contact between the buffer member and the wall surface.

7. The method of claim 5, further comprising outputting a warning sound or transmitting a text to a previously-stored contact number, when it is determined that the contact between the rear panel and the wall surface is released.

* * * * *